United States Patent
Hajjar et al.

(10) Patent No.: US 8,232,957 B2
(45) Date of Patent: *Jul. 31, 2012

(54) LASER DISPLAYS USING PHOSPHOR SCREENS EMITTING VISIBLE COLORED LIGHT

(75) Inventors: Roger A. Hajjar, San Jose, CA (US);
David Kent, Framingham, MA (US);
Phillip Malyak, Canton, MA (US)

(73) Assignee: Prysm, Inc., San Jose, CA (US)

( * ) Notice: Subject to any disclaimer, the term of this patent is extended or adjusted under 35 U.S.C. 154(b) by 613 days.

This patent is subject to a terminal disclaimer.

(21) Appl. No.: 12/349,489

(22) Filed: Jan. 6, 2009

(65) Prior Publication Data

US 2009/0174632 A1    Jul. 9, 2009

Related U.S. Application Data

(63) Continuation of application No. 11/116,998, filed on Apr. 27, 2005, now Pat. No. 7,474,286.

(60) Provisional application No. 60/667,839, filed on Apr. 1, 2005.

(51) Int. Cl.
*G09G 3/36* (2006.01)
*G09G 3/30* (2006.01)
*G09G 5/10* (2006.01)
*G03B 21/00* (2006.01)
*G06K 9/00* (2006.01)

(52) U.S. Cl. .............. 345/102; 345/81; 345/88; 345/98; 345/690; 353/122; 382/187

(58) Field of Classification Search ............ 345/81, 345/102

See application file for complete search history.

(56) References Cited

U.S. PATENT DOCUMENTS

| | | | |
|---|---|---|---|
| 2,439,181 A | 5/1946 | Nicoll |
| 3,025,161 A | 3/1962 | Thaddeus |
| 3,556,637 A | 1/1971 | Palmquist |
| 3,624,273 A | 11/1971 | Gale |
| 3,652,956 A | 3/1972 | Pinnow et al. |
| 3,691,482 A | 9/1972 | Pinnow et al. |
| 3,750,189 A | 7/1973 | Fleischer |
| 3,868,167 A | 2/1975 | Schreiber |
| 4,165,154 A | 8/1979 | Takahashi |
| 4,166,233 A | 8/1979 | Stanley |

(Continued)

FOREIGN PATENT DOCUMENTS

DE    10044603    4/2001

(Continued)

OTHER PUBLICATIONS

Withnall et al., "Studies of UV stimulated luminesence from phosphors of commerical importance," Central Laser Facility Annual Report 2004/2005 http://www.clf.rl.ac.uk/Reports/2004-2005/pdf/64.pdf [accessed on May 23, 2008], 2 pages.

(Continued)

*Primary Examiner* — Alexander S Beck
*Assistant Examiner* — Charles V Hicks
(74) *Attorney, Agent, or Firm* — Fish & Richardson P.C.

(57) ABSTRACT

Laser display systems using at least one scanning laser beam to excite one or more fluorescent materials on a screen which emit light to form images. The fluorescent materials may include phosphor materials.

17 Claims, 20 Drawing Sheets

U.S. PATENT DOCUMENTS

| | | | |
|---|---|---|---|
| 4,295,093 A | 10/1981 | Middleton |
| 4,305,646 A | 12/1981 | Bechtold |
| 4,307,320 A | 12/1981 | Kotera et al. |
| 4,401,362 A | 8/1983 | Maeda |
| 4,512,911 A | 4/1985 | Kotera et al. |
| 4,613,201 A | 9/1986 | Shortle et al. |
| 4,624,528 A | 11/1986 | Brueggemann |
| 4,661,419 A | 4/1987 | Nakamura |
| 4,707,093 A | 11/1987 | Testa |
| 4,713,577 A | 12/1987 | Gualtieri et al. |
| 4,737,840 A | 4/1988 | Morishita |
| 4,799,050 A | 1/1989 | Prince et al. |
| 4,808,804 A | 2/1989 | Krichever et al. |
| 4,816,920 A | 3/1989 | Paulsen |
| 4,872,750 A | 10/1989 | Morishita |
| 4,897,715 A | 1/1990 | Beamon |
| 4,923,262 A | 5/1990 | Clay |
| 4,932,734 A | 6/1990 | Sakuma et al. |
| 4,978,202 A | 12/1990 | Yang |
| 4,979,030 A | 12/1990 | Murata |
| 5,054,866 A | 10/1991 | Tomita et al. |
| 5,080,467 A | 1/1992 | Kahn et al. |
| 5,089,907 A | 2/1992 | Yoshikawa et al. |
| 5,094,788 A | 3/1992 | Schrenk et al. |
| 5,122,905 A | 6/1992 | Wheatley et al. |
| 5,136,426 A | 8/1992 | Linden et al. |
| 5,138,441 A | 8/1992 | Tanaka |
| 5,140,604 A | 8/1992 | Alablanche et al. |
| 5,146,355 A | 9/1992 | Prince et al. |
| 5,166,944 A | 11/1992 | Conemac |
| 5,170,181 A | 12/1992 | Tamada |
| 5,175,637 A | 12/1992 | Jones et al. |
| 5,182,659 A | 1/1993 | Clay et al. |
| 5,198,679 A | 3/1993 | Katoh et al. |
| 5,255,113 A | 10/1993 | Yoshikawa et al. |
| 5,269,995 A | 12/1993 | Ramanathan et al. |
| 5,270,842 A | 12/1993 | Clay et al. |
| 5,296,922 A | 3/1994 | Mitani et al. |
| 5,365,288 A | 11/1994 | Dewald et al. |
| 5,389,324 A | 2/1995 | Lewis et al. |
| 5,414,521 A | 5/1995 | Ansley |
| 5,422,693 A * | 6/1995 | Vogeley et al. ............... 353/122 |
| 5,442,254 A | 8/1995 | Jaskie |
| 5,473,396 A * | 12/1995 | Okajima et al. ............. 353/122 |
| 5,475,524 A | 12/1995 | Harris |
| 5,477,285 A | 12/1995 | Riddle et al. |
| 5,477,330 A | 12/1995 | Dorr |
| 5,491,578 A | 2/1996 | Harris |
| 5,521,986 A * | 5/1996 | Curtin et al. .................. 382/187 |
| 5,526,166 A | 6/1996 | Genovese |
| 5,541,731 A | 7/1996 | Freedenberg et al. |
| 5,550,667 A | 8/1996 | Krimmel et al. |
| 5,587,818 A | 12/1996 | Lee |
| 5,594,556 A | 1/1997 | Vronsky et al. |
| 5,598,292 A | 1/1997 | Yoshikawa et al. |
| 5,602,445 A | 2/1997 | Solanki et al. |
| 5,614,961 A | 3/1997 | Gibeau et al. |
| 5,633,736 A | 5/1997 | Griffith et al. |
| 5,646,766 A | 7/1997 | Conemac |
| 5,648,181 A | 7/1997 | Watanabe |
| 5,666,174 A | 9/1997 | Cupolo, III |
| 5,668,662 A | 9/1997 | Magocs et al. |
| 5,670,209 A | 9/1997 | Wyckoff |
| 5,684,552 A | 11/1997 | Miyamoto et al. |
| 5,693,254 A | 12/1997 | Sieber et al. |
| 5,698,857 A | 12/1997 | Lambert et al. |
| 5,715,021 A | 2/1998 | Gibeau et al. |
| 5,716,118 A | 2/1998 | Sato et al. |
| 5,870,224 A | 2/1999 | Saitoh et al. |
| 5,882,774 A | 3/1999 | Jonza et al. |
| 5,907,312 A | 5/1999 | Sato et al. |
| 5,920,361 A | 7/1999 | Gibeau et al. |
| 5,959,296 A | 9/1999 | Cyr et al. |
| 5,973,813 A | 10/1999 | Takeuchi |
| 5,976,424 A | 11/1999 | Weber et al. |
| 5,978,142 A | 11/1999 | Blackham et al. |
| 5,994,722 A | 11/1999 | Averbeck et al. |
| 5,998,918 A | 12/1999 | Do et al. |
| 5,998,925 A | 12/1999 | Shimizu et al. |
| 6,008,925 A | 12/1999 | Conemac |
| 6,010,751 A | 1/2000 | Shaw et al. |
| 6,057,953 A | 5/2000 | Ang |
| 6,064,417 A | 5/2000 | Harrigan et al. |
| 6,066,861 A | 5/2000 | Hohn et al. |
| 6,069,599 A | 5/2000 | Py et al. |
| 6,080,467 A | 6/2000 | Weber et al. |
| 6,088,163 A | 7/2000 | Gilbert et al. |
| 6,101,032 A | 8/2000 | Wortman et al. |
| 6,117,530 A | 9/2000 | Jonza et al. |
| 6,118,516 A | 9/2000 | Irie et al. |
| 6,128,131 A | 10/2000 | Tang |
| 6,134,050 A | 10/2000 | Conemac |
| 6,154,259 A | 11/2000 | Hargis et al. |
| 6,157,490 A | 12/2000 | Wheatley et al. |
| 6,172,810 B1 | 1/2001 | Fleming et al. |
| 6,175,440 B1 | 1/2001 | Conemac |
| 6,219,168 B1 | 4/2001 | Wang |
| 6,224,216 B1 | 5/2001 | Parker |
| 6,226,126 B1 | 5/2001 | Conemac |
| 6,236,160 B1 | 5/2001 | Komaki et al. |
| 6,252,254 B1 | 6/2001 | Soules et al. |
| 6,255,670 B1 | 7/2001 | Srivastava et al. |
| 6,276,802 B1 | 8/2001 | Naito |
| 6,288,817 B2 | 9/2001 | Rowe |
| 6,292,285 B1 | 9/2001 | Wang et al. |
| 6,329,966 B1 | 12/2001 | Someya et al. |
| 6,333,724 B1 | 12/2001 | Taira et al. |
| 6,417,019 B1 | 7/2002 | Mueller et al. |
| 6,429,583 B1 | 8/2002 | Levinson et al. |
| 6,429,584 B2 | 8/2002 | Kubota |
| 6,463,585 B1 | 10/2002 | Hendricks et al. |
| 6,531,230 B1 | 3/2003 | Weber et al. |
| 6,576,156 B1 | 6/2003 | Ratna et al. |
| 6,621,593 B1 | 9/2003 | Wang et al. |
| 6,621,609 B1 | 9/2003 | Conemac |
| 6,627,060 B1 | 9/2003 | Yum et al. |
| 6,628,248 B2 | 9/2003 | Masumoto et al. |
| 6,678,081 B2 | 1/2004 | Nishihata et al. |
| 6,717,704 B2 | 4/2004 | Nakai |
| 6,765,237 B1 | 7/2004 | Doxsee et al. |
| 6,777,861 B2 | 8/2004 | Russ et al. |
| 6,785,028 B1 | 8/2004 | Atsuumi et al. |
| 6,809,347 B2 | 10/2004 | Tasch et al. |
| 6,809,781 B2 | 10/2004 | Setlur et al. |
| 6,839,042 B2 | 1/2005 | Conemac et al. |
| 6,853,131 B2 | 2/2005 | Srivastava et al. |
| 6,900,916 B2 | 5/2005 | Okazaki et al. |
| 6,905,220 B2 | 6/2005 | Wortman et al. |
| 6,937,221 B2 | 8/2005 | Lippert et al. |
| 6,937,383 B2 | 8/2005 | Morikawa et al. |
| 6,947,198 B2 | 9/2005 | Morikawa et al. |
| 6,956,684 B2 | 10/2005 | Orcutt |
| 6,986,581 B2 | 1/2006 | Sun et al. |
| 6,987,610 B2 | 1/2006 | Piehl |
| 7,068,406 B2 | 6/2006 | Shimomura |
| 7,088,335 B2 | 8/2006 | Hunter et al. |
| 7,090,355 B2 | 8/2006 | Liu et al. |
| 7,147,802 B2 | 12/2006 | Sugimoto et al. |
| 7,181,417 B1 | 2/2007 | Langseth et al. |
| 7,206,041 B2 | 4/2007 | Kashima |
| 7,213,923 B2 | 5/2007 | Liu et al. |
| 7,230,767 B2 | 6/2007 | Walck et al. |
| 7,239,436 B2 | 7/2007 | Orttinger et al. |
| 7,283,301 B2 | 10/2007 | Peeters et al. |
| 7,302,174 B2 | 11/2007 | Tan et al. |
| 7,357,512 B2 | 4/2008 | Tan et al. |
| 7,474,286 B2 | 1/2009 | Hajjar et al. |
| 7,697,183 B2 | 4/2010 | Malyak et al. |
| 7,728,845 B2 * | 6/2010 | Holub ........................... 345/589 |
| 7,994,702 B2 | 8/2011 | Bukesov et al. |
| 8,000,005 B2 | 8/2011 | Kindler et al. |
| 2001/0019240 A1 | 9/2001 | Takahashi |
| 2001/0024086 A1 | 9/2001 | Fox et al. |
| 2001/0050371 A1 | 12/2001 | Odaki et al. |
| 2001/0054871 A1 | 12/2001 | Tadaki et al. |
| 2002/0003233 A1 | 1/2002 | Mueller-Mach et al. |
| 2002/0008854 A1 | 1/2002 | Leigh Travis |

| | | | | | |
|---|---|---|---|---|---|
| 2002/0024495 A1* | 2/2002 | Lippert et al. ............... 345/98 | JP | 59-155826 | 9/1984 |
| 2002/0050963 A1 | 5/2002 | Conemac et al. | JP | 02-157790 | 6/1990 |
| 2002/0122260 A1 | 9/2002 | Okazaki et al. | JP | 2-199975 | 8/1990 |
| 2002/0124250 A1 | 9/2002 | Proehl et al. | JP | 5232583 | 9/1993 |
| 2002/0139945 A1 | 10/2002 | Takahashi et al. | JP | 6-46461 | 2/1994 |
| 2002/0145685 A1 | 10/2002 | Mueller-Mach et al. | JP | 9114397 | 5/1997 |
| 2002/0163702 A1 | 11/2002 | Hori et al. | JP | 2000-49380 | 2/2000 |
| 2002/0185965 A1 | 12/2002 | Collins, III et al. | JP | 2001-210122 | 8/2001 |
| 2003/0015692 A1 | 1/2003 | Teng et al. | JP | 2001-316664 | 11/2001 |
| 2003/0094893 A1 | 5/2003 | Ellens et al. | JP | 2002-83549 | 3/2002 |
| 2003/0184209 A1 | 10/2003 | Russ et al. | JP | 2005181831 | 7/2005 |
| 2003/0184531 A1 | 10/2003 | Morikawa et al. | JP | 2006-323391 | 11/2006 |
| 2003/0184613 A1 | 10/2003 | Nakamura et al. | JP | 2008-509067 | 3/2008 |
| 2003/0184842 A1 | 10/2003 | Morikawa et al. | KR | 10-2001-0097415 | 11/2001 |
| 2003/0231161 A1* | 12/2003 | Yamaguchi ............... 345/102 | KR | 2002-0024425 | 3/2002 |
| 2004/0027465 A1 | 2/2004 | Smith et al. | KR | 2003-0068589 | 8/2003 |
| 2004/0070551 A1 | 4/2004 | Walck et al. | KR | 2004-0037267 | 5/2004 |
| 2004/0136204 A1 | 7/2004 | Asao | WO | WO 90/12387 | 10/1990 |
| 2004/0141220 A1 | 7/2004 | Hama et al. | WO | WO 92/22109 | 12/1992 |
| 2004/0145312 A1 | 7/2004 | Ouderkirk et al. | WO | WO 00/20912 | 4/2000 |
| 2004/0156079 A1 | 8/2004 | Marshall et al. | WO | WO 00/33389 | 6/2000 |
| 2004/0160516 A1 | 8/2004 | Ford | WO | WO 01/24229 | 4/2001 |
| 2004/0164927 A1 | 8/2004 | Suyama et al. | WO | WO 01/88609 | 11/2001 |
| 2004/0165642 A1 | 8/2004 | Lamont | WO | WO 02/11173 | 2/2002 |
| 2004/0184123 A1 | 9/2004 | Moikawa et al. | WO | WO 02/23962 | 3/2002 |
| 2004/0223100 A1 | 11/2004 | Kotchick et al. | WO | WO 02/29772 A2 | 4/2002 |
| 2004/0227465 A1 | 11/2004 | Menkara et al. | WO | WO 02/33970 | 4/2002 |
| 2004/0263074 A1 | 12/2004 | Baroky et al. | WO | WO 02/057838 | 7/2002 |
| 2005/0001225 A1 | 1/2005 | Yoshimura et al. | WO | WO 02/059693 A1 | 8/2002 |
| 2005/0012446 A1 | 1/2005 | Jermann et al. | WO | WO 02/071148 | 9/2002 |
| 2005/0023962 A1 | 2/2005 | Menkara et al. | WO | 2004003880 | 1/2004 |
| 2005/0023963 A1 | 2/2005 | Menkara et al. | WO | WO 2005/043232 A2 | 5/2005 |
| 2005/0051790 A1 | 3/2005 | Ueda | WO | WO 2005/119797 | 12/2005 |
| 2005/0093818 A1 | 5/2005 | Hatam-Tabrizi et al. | WO | WO 2006/097876 | 9/2006 |
| 2005/0094266 A1 | 5/2005 | Liu et al. | WO | WO 2007/050662 | 5/2007 |
| 2006/0050015 A1 | 3/2006 | Kusunoki et al. | WO | WO 2007/095329 | 8/2007 |
| 2006/0066508 A1 | 3/2006 | Walck et al. | WO | WO 2007/114918 | 10/2007 |
| 2006/0081793 A1 | 4/2006 | Nestorovic et al. | WO | WO 2007/131195 | 11/2007 |
| 2006/0082873 A1 | 4/2006 | Allen et al. | WO | WO 2007/134329 | 11/2007 |
| 2006/0088951 A1 | 4/2006 | Hayashi et al. | WO | WO 2008/116123 | 9/2008 |
| 2006/0132021 A1 | 6/2006 | Naberhuis et al. | WO | WO 2008/124707 | 10/2008 |
| 2006/0139580 A1 | 6/2006 | Conner | WO | WO 2008/144673 | 11/2008 |
| 2006/0197922 A1 | 9/2006 | Liu et al. | WO | WO 2009/003192 | 12/2008 |
| 2006/0221021 A1 | 10/2006 | Hajjar et al. | | | |
| 2006/0221022 A1 | 10/2006 | Hajjar | | | |
| 2006/0227087 A1 | 10/2006 | Hajjar et al. | | | |
| 2006/0262243 A1 | 11/2006 | Lester et al. | | | |
| 2006/0266958 A1 | 11/2006 | Shimizu et al. | | | |
| 2006/0290898 A1 | 12/2006 | Liu et al. | | | |
| 2007/0014318 A1 | 1/2007 | Hajjar et al. | | | |
| 2007/0081239 A1 | 4/2007 | May et al. | | | |
| 2007/0085977 A1 | 4/2007 | Fricke et al. | | | |
| 2007/0183466 A1 | 8/2007 | Son et al. | | | |
| 2007/0187580 A1 | 8/2007 | Kykta et al. | | | |
| 2007/0187616 A1 | 8/2007 | Burroughs et al. | | | |
| 2007/0188417 A1 | 8/2007 | Hajjar et al. | | | |
| 2007/0206258 A1 | 9/2007 | Malyak et al. | | | |
| 2007/0228927 A1 | 10/2007 | Kindler et al. | | | |
| 2007/0229946 A1 | 10/2007 | Okada et al. | | | |
| 2008/0018558 A1 | 1/2008 | Kykta et al. | | | |
| 2008/0066107 A1 | 3/2008 | Moonka et al. | | | |
| 2008/0068295 A1 | 3/2008 | Hajjar | | | |
| 2008/0235749 A1 | 9/2008 | Jain et al. | | | |
| 2008/0247020 A1 | 10/2008 | Malyak et al. | | | |
| 2008/0291140 A1 | 11/2008 | Kent et al. | | | |
| 2009/0001272 A1 | 1/2009 | Hajjar | | | |
| 2009/0021461 A1* | 1/2009 | Hu et al. ............... 345/88 | | | |
| 2009/0116107 A1 | 5/2009 | Kindler et al. | | | |
| 2009/0153582 A1 | 6/2009 | Hajjar et al. | | | |
| 2010/0020377 A1 | 1/2010 | Borchers | | | |
| 2010/0097678 A1 | 4/2010 | Hajjar | | | |

FOREIGN PATENT DOCUMENTS

| | | |
|---|---|---|
| EP | 0196862 | 10/1986 |
| EP | 0271650 | 6/1988 |
| EP | 0618472 | 10/1994 |
| EP | 1150361 | 10/2001 |
| JP | 56164826 | 12/1981 |
| JP | 58-093147 | 6/1983 |

OTHER PUBLICATIONS

"Fuji Film Color Mosaic Excellent for Image Sensor CM-EXIS," http://www.fujifilm-ffem.com/downloads/Product%20Spotlight%20Color%20Mosaic.pdf (1 page) [accessed May 27, 2008].

"Quantum Dots Explained," http://www.evidenttech.com/quantum-dots-explained.html (1 page) [accessed May 27, 2008].

"Fuji Film Color Mosaic Excellent for Image Sensor CM-EXIS," http://www.fujifilm-ffem.com/downloads/Product%20Spotlight%20Color%20Mosaic.pdf (1 page) [accessed May 27, 2008].

"Reflection and retroreflection," Delta Technical Note—RS 101 http://www.delta.dk/C1256ED600446B80/sysOakFil/roadsensors%20techn%20info%20RS101/$File/RS101.pdf, revised: Jul. 10, 2004, 7 pages [accessed Oct. 23, 2008].

Collins et al., "Process Control of the Chlorobenzene Single-Step Liftoff Process with a Diazo-Type Resist," IBM J. Res. Develop. 26(5): 596-604 (Sep. 1982).

Cusano, D.A., "Cathodo-, Photo-, and D.C.-Electroluminescence in Zinc Sulfide Layers," Luminescence of Organic and Inorganic Materials, Kallman, H.P. and G.M. Spruch (Eds.), New York University, pp. 494-522 (1962).

Daud, A. et al., "Transparent Y2O2S:Eu3+ phosphor thin films grown by reactive evaporation and their luminescent properties," Journal of the Society for Information Display (SID), vol. 4, No. 3, pp. 193-196 (1996).

Donofrio, R. L. and C.H. Rehkopf, "Screen Weight Optimization," Journal of the Electrochemical Society, vol. 126, No. 9, pp. 1563-1567 (Sep. 1979).

Greer, J.A. et al., "38.4: P-53 Thin Film Phosphors Prepared by Pulsed-Laser Deposition," 1994 SID International Symposium Digest of Technical Papers (SID '94 Digest) vol. XXV, pp. 827-830 (May 1994).

Hopkinson, R. G., "An Examination of Cathode-Ray-Tube Characteristics," The Journal of the Institute of Electrical Engineers, vol. 93, Part IIIa (Radiolocation), No. 5, pp. 779-794 (1946).
USPTO Final Office acton in U.S. App. No. 11/335,813, mailed Mar. 15, 2010 (17 pages).
USPTO Non-Final Action in U.S. Appl. No. 11/116,998, mailed Aug. 5, 2008, 25 pages.
USPTO Non-Final Action in U.S. Appl. No. 11/337,170, mailed Jun. 12, 2009, 50 pages.
International Search Report and Written Opinion dated Aug. 29, 2008, for PCT/US2008/059603, filed Apr. 7, 2008, entitled: "Post-Objective Scanning Beam Systems".
Supplementary European Search Report dated Jul. 29, 2009 for European Patent Application No. 06836510.5 (6 pages).
Supplementary European Search Report dated Mar. 25, 2009 for European Patent Application No. 06740108.3 (7 pages).
The Korean Intellectual Property Office, Office Action dated Mar. 31, 2009 for Korean Patent Application No. 10-2007-7025455 (4 pages).
English language translation of The Korean Intellectual Property Office, Office Action dated Mar. 31, 2009 for Korean Patent Application No. 10-2007-7025455 (5 pages).
International Search Report and Written Opinion dated Jul. 20, 2006 and International Preliminary Report on Patentability for dated Oct. 3, 2007 for PCT/US2006/11757, now WO 2006/107720, published on Oct. 12, 2006, entitled: "Display Systems and Devices Having Screens with Optical Fluorescent Materials".
International Search Report and Written Opinion dated Jun. 27, 2008 for PCT/US2008/057763, filed Mar. 20, 2008, entitled: "Delivering and Displaying Advertisement or Other Application Data to Display Systems".
International Search Report and Written Opinion dated Mar. 13, 2008 and International Preliminary Report on Patentability for dated Aug. 19, 2008 for PCT/US2007/004004, now WO 2007/095329, published on Aug. 23, 2007, entitled: "Servo-Assisted Scanning Beam Display Systems Using Fluorescent Screens".
International Search Report and Written Opinion dated May 28, 2008 for PCT/US06/41584, now WO 2007/050662, published on May 3, 2007, entitled: "Optical Designs for Scanning Beam Display Systems Using Fluorescent Screens," 9 pages.
International Search Report and Written Opinion dated Nov. 24, 2008 for PCT/US07/68989, now WO 2007/134329, published on Nov. 22, 2007 and entitled: "Multilayered Fluorescent Screens for Scanning Beam Display Systems" 9 pages.
International Search Report and Written Opinion dated Nov. 28, 2008 for PCT/US2008/064169, now WO 2008/144673, published on Nov. 27, 2007 and entitled: "Multilayered Screens with Light-Emitting Stripes for Scanning Beam Display Systems" 9 pages.
International Search Report and Written Opinion dated Nov. 26, 2008 for PCT/US2008/068679, now WO 2009/003192, published on Dec. 31, 2008 and entitled: "Servo Feedback Control Based on Designated Scanning Servo Beam in Scanning Beam Display Systems With Light-Emitting Screens" 11 pages.
International Search Report and Written Opinion dated Jan. 28, 2010 for PCT/US2009/051878, now WO 2010/012003, 11 pages.
Kalkhoran, N.M. et al., "LP-E: *Late News Poster*: Luminescence Study of Ion-Implanted ZnGa2O4 Thin Films on Flexible Organic Substrates," 1997 SID International Symposium Digest of Technical Papers (SID '97 Digest), vol. XXVIII, pp. 623-626 (May 1997).
Kim, J M et al. "6.3: Development of 4-in. Full Color FED, Devices," 1997 SID International Symposium Digest of Technical Papers ( SID '97 Digest), vol. XVIII, pp. 56-59 (May 1997).
Kramer, C.J., "Hologon deflectors for graphic arts applications: an overview," SPIE Proceedings on Beam Deflection and Scanning Technologies 1454: 68-100 (1991).
Kramer, C.J., "Hologon deflectors incorporating dispersive optical elements for scan line bow correction," SPIE Proceedings on Holographic Optics: Design and Applications, 883: 230-244 (1988).
Loewen, E.G. et al., "Grating efficiency theory as it applies to blazed and holographic gratings," Applied Optics, vol. 16, No. 10, p. 2711-2721 (Oct. 1977).
McDonald, L. W. and A. C. Lowe (Eds.), *Display Systems, Design Applications*, John Wiley & Sons: Chichester, England, pp. 195-196 (1997).
Mezner, L.Z. et al., "P-23: Centrifugal Settling of High Resolution 1-in CRT Screens," 1994 SID International Symposium Digest of Technical Papers (SID '94 Digest), vol. XXV, pp. 520-522 (May 1994).
Morikawa, M. et al., "S11-3 Study to Improve the Flood-Beam CRT for Giant Screen Display," Proceedings of the Twelfth International Display Research Conference, Japan Display '92, Oct. 12-14, 1992, International Conference Center, Hiroshima, Japan pp. 385-388.
Mueller-Mach, R. et al., "High-Power Phosphor-Converted Light Emitting Diodes Based on III-Nitrides," IEEE Journal on Selected Topics in Quantum Electronics 8(2): 339-345 (Mar./Apr. 2002).
Nonogaki, S. et al., "Dry Process for Phosphor Screen Fabrication of Multicolored Cathode Ray Tubes," Research & Development in Japan, pp. 50-55 (1984).
Oki, K. and L. Ozawa, "A phosphor screen for high-resolution CRTs," Journal of the SID, vol. 3, No. 2, pp. 51-57 (Sep. 1995).
Pringsheim, P. and M. Vogel, *Luminescence of Liquids and Solids and its Practical Applications*, Interscience Publishers, Inc.: New York, N.Y., pp. 144-145 (1946).
Rowe, D.M., "Developments in holographic-based scanner designs," Proc. SPIE, Optical Scanning Systems: Design and Applications, Leo Beiser and Stephen F. Sagan, Eds. vol. 3131: 52-58 (1997).
Rynearson, R.L. et al., "Low-cost, mechanically rigid, high-aspect-ratio mirrors," SPIE Proceedings on Design, Fabrication, and Applications of Precision Plastic Optics 2600: 137-143 (1995).
Schermerhorn, J.D. et al., "15.5: A Grooved Structure for a Large High-Resolution Color ACPDP," 1997 SID International Symposium Digest of Technical Papers ( SID '97 Digest), vol. XVII, pp. 229-232 (May 1997).
Schlesinger et al., "Screening," Design, Development, and Fabrication of Ultra-High-Resolution Cathode Ray tube. Technical Report ECOM-00476, pp. 64-72, Feb. 1969.
Smith, D.C. et. al., "32.5: Late-News Paper: Crystalline-As-Deposited CaGa2S4:Ce via Low Temperature Metal Organic Chemical Vapor Deposition," 1995 SID International Symposium Digest of Technical Papers (SID '95 Digest), vol. XXVI, pp. 728-731 (May 1995).
Smith, W.J., "Scanner/f-0 and Laser Disk Collimator Lenses," Chapter 22 in Modern Lens Design: A Resource Manual, pp. 411-430, Boston, Mass.: McGraw-Hill, Inc., 1992.
Yocom, P. N., "Future requirements of display phosphors from an historical perspective," Journal of the Society for Information Display (SID), Special Section: Papers from the First International Conference on the Science and Technology of Display Phosphors, vol. 4, No. 3, pp. 149-152 (Oct. 1996).
Yocom, P. N., "New green phosphors for plasma displays," Journal of the Society for Information Display (SID), Special Section: Papers from the First International Conference on the Science and Technology of Display Phosphors, vol. 4, No. 3, pp. 169-172 (Oct. 1996).
Županc-Mežnar, L. and M. Žumer, "26.4:Preparation of P43 Suspension and Screen-Quality Evaluation in 1—in. CRTs", 1997 SID International Symposium Digest of Technical Papers ( SID '97 Digest), vol. XVIII, pp. 440-443 (May 1997).
Extended European Search Report for Application No. EP 07783797, dated Dec. 10, 2009, 5 pages.
Official Action for Application No. 2009146834, dated Apr. 12, 2011, 7 pages.

* cited by examiner

PULSE WIDTH MODULATION FOR 128 GREY LEVELS

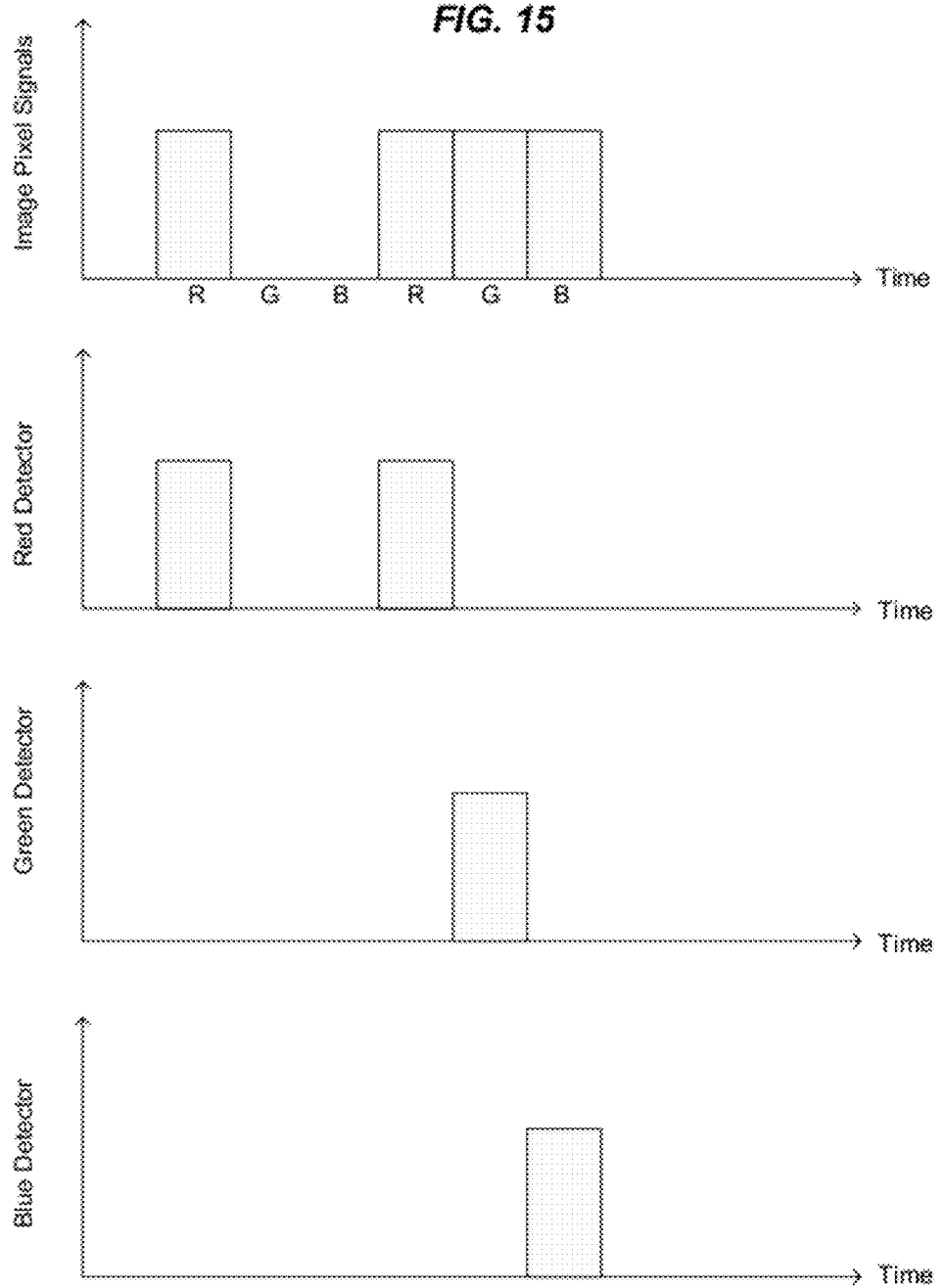

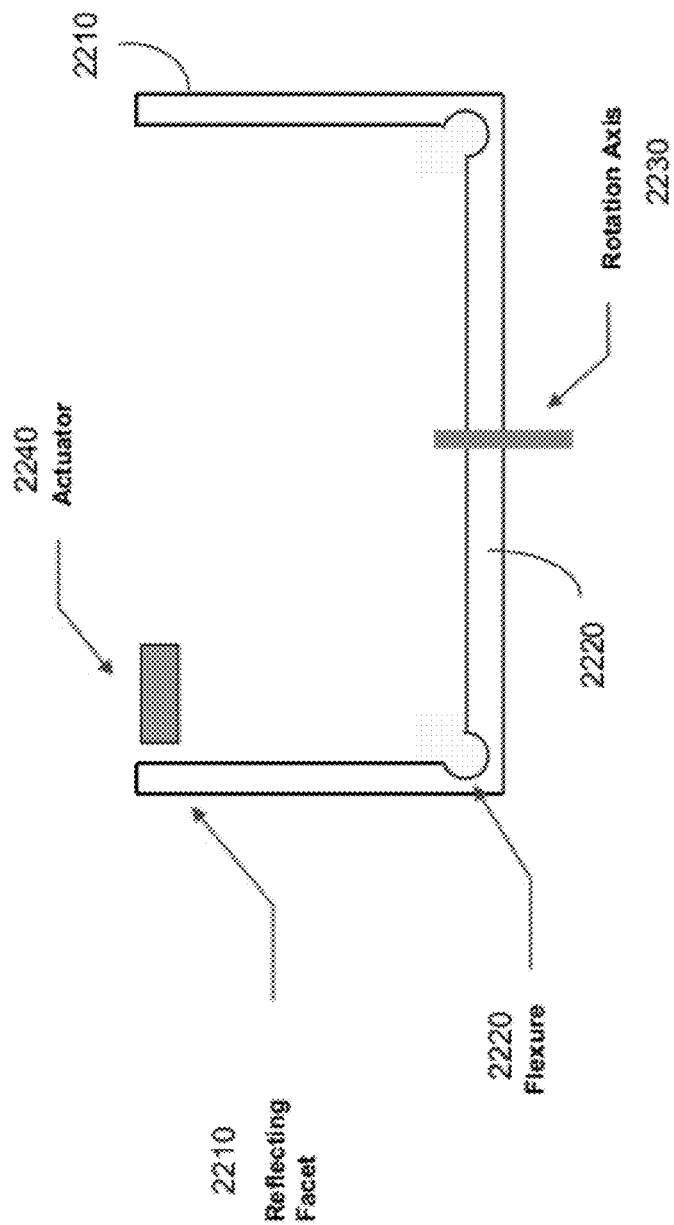

LASER DISPLAYS USING PHOSPHOR SCREENS EMITTING VISIBLE COLORED LIGHT

This application is a continuation application of U.S. patent application Ser. No. 11/116,998 entitled "LASER DISPLAYS USING UV-EXCITABLE PHOSPHORS EMITTING VISIBLE COLORED LIGHT" and filed Apr. 27, 2005 now U.S. Pat. No. 7,474,286. The application Ser. No. 11/116,998 claims the benefit of U.S. Provisional Application No. 60/667,839 entitled "Laser Displays" and filed Apr. 1, 2005. The entire disclosures of the above two patent applications are incorporated herein by reference as part of the specification of this application.

BACKGROUND

This application relates to laser-based image and video displays.

Many image and video displays are designed to directly produce color images in red, green and blue and then project the color images on a screen. Such systems are often referred to as "projection displays" where the screen is simply a surface to make the color images visible to a viewer. Such projection displays may use white light sources where white beams are filtered and modulated to produce images in red, green and blue colors. Alternatively, three light sources in red, green and blue may be used to directly produce three beams in red, green and blue colors and the three beams are modulated to produce images in red, green and blue. Examples of such projection displays include digital light processing (DLP) displays, liquid crystal on silicon (LCoS) displays, and grating light valve (GLV) displays. Notably, GLV displays use three grating light valves to modulate red, green and blue laser beams, respectively, and use a beam scanner to produce the color images on a screen. Another example of laser-based projection displays is described in U.S. Pat. No. 5,920,361 entitled "Methods and apparatus for image projection" which is incorporated herein by reference as part of the disclosure of this application. Projection displays use optical lens systems to image and project the color images on the screen.

Some other image and video displays use a "direct" configuration where the screen itself includes light-producing color pixels to directly form color images in the screen. Such direct displays eliminate the optical lens systems for projecting the images and therefore can be made relatively smaller than projection displays with the same screen sizes. Examples of direct display systems include plasma displays, liquid crystal displays (LCDs), light-emitting-diode (LED) displays (e.g., organic LED displays), and field-emission displays (FEDs). Each color pixel in such direct displays includes three adjacent color pixels which produce light in red, green and blue, respectively, by either directly emit colored light as in LED displays and FEDs or by filtering white light such as the LCDs.

These and other displays are replacing cathode-ray tube (CRT) displays which dominated the display markets for decades since its inception. CRT displays use scanning electron beams in a vacuum tube to excite color phosphors in red, green and blue colors on the screen to emit colored light to produce color images. Although CRT displays can produce vivid colors and bright images with high resolutions, the use of cathode-ray tubes places severe technical limitations on the CRT displays and leads to dramatic decline in demand for CRT displays in recent years.

SUMMARY

The laser display systems and techniques described in this application use at least one screen with a fluorescent material to receive a laser beam and to produce at least one monochromatic image. A screen with three or more different fluorescent materials that absorb laser light to emit colored light at different wavelengths may be used as the screen to produce the final images for viewing. Alternatively, a screen with only one fluorescent material may be used as a monochromatic projector to produce only one of monochromatic images of different colors and this one monochromatic image is combined with other monochromatic images to produce the final images for viewing at a final viewing screen.

For example, a laser display system is described to include a screen comprising a substrate on which a plurality of parallel phosphor stripes are formed, wherein at least three adjacent phosphor stripes are made of three different phosphors: a first phosphor to absorb light at an excitation wavelength to emit light of a first color, a second phosphor to absorb light at the excitation wavelength to emit light of a second color, and a third phosphor to absorb light at the excitation wavelength to emit light of a third color. The system also includes a laser module to project and scan a laser beam at the excitation wavelength onto the screen to convert an image carried by the laser beam via an optical modulation into a color image produced by the phosphor stripes on the screen.

In one implementation, the screen in the above system may include phosphor stripes that comprise a fourth phosphor to absorb light at the excitation wavelength to emit light of a fourth color.

In another implementation, the display system may include optical sensors positioned to receive and detect light from the phosphor stripes, where one optical sensor receives only one of colors emitted by the phosphor stripes on the screen. A feedback mechanism is included to direct outputs of the phosphor sensors to the laser module and an alignment control mechanism in the laser module is further included to control a timing of image data modulated on the laser beam to correct an alignment of the laser beam respect to the phosphor stripes.

In yet another implementation, the laser module may include a modulation control which combines a pulse code modulation and a pulse width modulation in the optical modulation of the laser beam to produce image grey scales.

In yet another implementation, the laser module may be configured to project and scan at least a second laser beam on the screen simultaneously with the scanning of the laser beam to produce two different spatial parts of an image on different locations of the screen.

In yet another implementation, the laser module may be configured to include a mechanism to monitor image data bits to be modulated on the laser beam to produce a black pixel monitor signal, at least a diode laser to produce the laser beam, and a laser control coupled to receive the black pixel monitor signal and to operate the diode laser at a driving current below a laser threshold current without turning off the driving current to produce a virtue black color on the screen when the black pixel monitor signal indicates a length of black pixels is less than a threshold and turn off the driving current to produce a true black color on the screen when the black pixel monitor signal indicates a length of black pixels is greater than a threshold.

Laser display systems with three or more monochromatic laser display projection modules are also described. In one example, such a system includes first, second, and third laser display modules to produce first, second and third monochromatic image components of a final image in first, second, and third different colors, respectively, and to project the first, second and third monochromatic image components on a display screen to produce the final image. In this example, the first laser display module includes: (1) a first screen comprising a first phosphor to absorb light at an excitation wavelength to emit light at a first wavelength different from the excitation wavelength; (2) a first laser module to project and scan at least one laser beam at the excitation wavelength onto the first screen to convert an image in the first color carried by the laser beam into the first monochromatic image component produced by the first phosphor on the first screen; and (3) a first projection optical unit to project the first monochromatic image component from the first screen to the display screen.

In one implementation, the third laser display module may include (1) a third screen which does not have a phosphor; (2) a third laser module to project and scan at least one laser beam of the third color onto the third screen to directly produce the third monochromatic image component on the third screen; and (3) a third projection optical unit to project the third monochromatic image component from the third screen to the display screen.

In another implementation, the third laser display module directly projects and scans at least one laser beam of the third color onto the display screen to directly produce the third monochromatic image component on the display screen.

Another example for laser display systems with three or more monochromatic laser display projection modules uses a first laser display module which comprises: (1) a first screen comprising a first phosphor to absorb light at an excitation wavelength to emit light at a first wavelength different from the excitation wavelength; (2) a first laser module to project and scan at least one laser beam at the excitation wavelength onto the first screen to convert an image carried by the laser beam into a first image produced by the first phosphor on the first screen. A second laser display module is also used in this system and includes: (1) a second screen comprising a second phosphor to absorb light at an excitation wavelength to emit light at a second wavelength different from the excitation wavelength; (2) a second laser module to project and scan at least one laser beam at the excitation wavelength onto the second screen to convert an image carried by the laser beam into a second image produced by the second phosphor on the second screen. In addition, a third laser display module is used and includes: (1) a third screen which does not have a phosphor; (2) a third laser module to project and scan at least one laser beam at a third wavelength different from the first and second wavelengths onto the third screen to directly produce a third image on the third screen in a color of the third wavelength. Furthermore, first, second and third projection optical units are used to respectively project the first image, second image and third image on a display screen to produce a final image.

A further example for laser display systems is a system with at least three monochromatic laser display projection modules each with a phosphor projection screen. The first laser display module includes (1) a first screen comprising a first phosphor to absorb light at an excitation wavelength to emit light at a first wavelength different from the excitation wavelength; and (2) a first laser module to project and scan at least one laser beam at the excitation wavelength onto the first screen to convert an image carried by the laser beam into a first image produced by the first phosphor on the first screen. The second laser display module includes (1) a second screen comprising a second phosphor to absorb light at an excitation wavelength to emit light at a second wavelength different from the excitation wavelength; and (2) a second laser module to project and scan at least one laser beam at the excitation wavelength onto the second screen to convert an image carried by the laser beam into a second image produced by the second phosphor on the second screen. The third laser display module includes (1) a third screen comprising a third phosphor to absorb light at an excitation wavelength to emit light at a third wavelength different from the excitation wavelength; and (2) a third laser module to project and scan at least one laser beam at the excitation wavelength onto the third screen to convert an image carried by the laser beam into a third image produced by the third phosphor on the third screen. In addition, this system includes first, second and third projection optical units to project the first image, second image and third image to spatially overlap on a display screen to produce a final image.

The above and other laser display systems may use various phosphor materials on the screen. Suitable phosphor materials may include the following:

an Eu-doped photoluminescent metal sulfide in form of MS:Eu where M is at least one of Ca, Sr, Ba, Mg and Zn;

a metal thiometallate photoluminescent material in form of $M^*N^*_2S_4$:Eu, Ce where $M^*$ is at least one of Ca, Sr, Ba, Mg and Zn, and $N^*$ is at least one of Al, Ga, In, Y, La and Gd;

$Sr_{1-u-v-x}Mg_uCa_vBa_x)$ $(Ga_{2-y-z}AlIn_zS_4)$:$Eu^{2+}$ or $(Sr_{1-u-v-x}Mg_uCa_vBa_x)(Ga_{2-y-z}Al_yIn_zS_4)$:$Eu^{2+}$;

$(Y, Gd)_3Al_5O_{12}$:Ce;

a rare earth doped CaS, SrS or a thiogallates;

one of SrS:$Eu^{2+}$; CaS:$Eu^{2+}$; CaS:$Eu^2$,$Mn^{2+}$; (Zn, Cd)S:$Ag^+$; $Mg_4GeO_{5.5}F$:$Mn^{4+}$; $Y_2O_2S$:$Eu^{2+}$, ZnS:$Mn^{2+}$, $SrGa_2S_4$:$Eu^{2+}$; ZnS:Cu,Al; $BaMg_2Al_{16}O_{27}$:$Eu^{2+}$,Mg; and $(Y,Gd)_3Al_5O_{12}$:Ce,Pr;

at least one of $Ba_2MgSi_2O_7$:$Eu^{2+}$; $Ba_2SiO_4$:$Eu^{2+}$; and (Sr, Ca,Ba) $(Al,Ga)_2S_4$:$Eu^{2+}$;

$AEu_{(1-x)}Ln_xB_2O_8$ where A is an element selected from the group consisting of Li, K, Na and Ag; Ln is an element selected from a group consisting of Y, La and Gd; and B is W or Mo; and x is number equal to or larger than 0, but smaller than 1;

at least one of $YBO_3$:$Ce^{3+}$,$Tb^{3+}$; $BaMgAl_{10}O_{17}$:$Eu^{2+}$, $Mn^{2+}$; (Sr, Ca, Ba) (Al, $Ga)_2S_4$:$Eu^{2+}$; $Y_3Al_5O_{12}$:$Ce^{3+}$; $Y_2O_2S$:$Eu^{3+}$,$Bi^{3+}$; $YVO_4$:$Eu^{3+}$,$Bi^{3+}$; SrS:$Eu^{2+}$; $SrY_2S_4$:$Eu^{2+}$; SrS:$Eu^{2+}$,$Ce^{3+}$,$K^+$; (Ca,Sr)S:$Eu^{2+}$; and $CaLa_2S_4$:$Ce^{3+}$;

a host material selected from Yttrium-Aluminum-Garnet, monoklinic YalO and YalO-perovskite, (Y,Ln)AlO, and (Y,Ln)(Al,Ga)O, wherein the host is doped with at least one of Cerium (Ce), Praseodymium (Pr), Holmium (Ho), Ytterbium (Yb), and Europium (Eu);

$Me_xSi_{12-(m+n)}Al_{(m+n)}OnN_{16-n}$:$Re1_yRe2_z$, where Me is one or more of Li, Ca, Mg, Y and lanthanide metals except for La and Ce, Re1 and Re2 are lanthanide metals;

an oxide nitride phosphor that includes α-sialon and is doped with a rare-earth element;

a cerium ion doped lanthanum silicon nitride phosphor: $La_{1-x}Si_3N_5$:xCe (0<x<1);

a garnet fluorescent material comprising 1) at least one element selected from the group consisting of Y, Lu, Sc, La, Gd and Sm, and 2) at least one element selected from the group consisting of Al, Ga and In, and being activated with cerium;

a phosphor blend comprising $BaMg_2Al_{16}O_{27}$:$Eu^{2+}$ (BAM) and $(Tb_{1-x-y}A_xRE_y)_3D_zO_{12}$(TAG), where A is a member selected from the group consisting of Y, La, Gd, and Sm; RE is a member selected from the group consisting of Ce, Pr, Nd, Sm, Eu, Gd, Dy, Ho, Er, Tm, Yb, and Lu; D is a member selected from the group consisting of Al, Ga, and In; x, y and z are positive numbers;

a phosphor blend comprising $Tb_3Al_{4.9}O_{12}$:Ce and at least one of $BaMg_2Al_{16}O_{27}$:$Eu^{2+}$ (BAM) and $(Sr,Ba, Ca,Mg)_5(PO_4)_3Cl$:$Eu^{2+}$;

$BaF_2.a BaX_2.bMgF_2.cBeF_2.dMe^{II}F_2$:eLn, where X is at least one halogen selected from the group consisting of chlorine, bromine and iodine; $Me^{II}$ is at least one divalent metal selected from the group consisting of: calcium and strontium; Ln is at least one rare earth element selected from the group consisting of: divalent europium ($Eu^{2+}$), cerium ($Ce^{3+}$) and terbium ($Tb^{3+}$), and a, b, c, and d are positive numbers;

a cerium activated rare earth halophosphate phosphor: $LnPO_4.aLnX_3:xCe^{3+}$ in which Ln is at least one rare earth element selected from the group consisting of Y, La, Gd and Lu; X is at least one halogen selected from the group consisting of F, Cl, Br and I; and a and x are positive numbers;

$Sr_xLn1_{y1}Ln2_{y2}Ln3_{y3}M_zA_aB_bO_{19-k(I)}$, where Ln1 represents at least one trivalent element selected from lanthanum, gadolinium and yttrium; Ln2 represents at least one trivalent element selected from neodymium, praseodymium, erbium, holmium and thulium; Ln3 represents an element selected from bivalent europium or trivalent cerium with retention of electric neutrality by virtue of oxygen holes; M represents at least one bivalent metal selected from magnesium, manganese, and zinc; A represents at least one trivalent metal selected from aluminum and gallium; B represents at least one trivalent transition metal selected from chromium and titanium; x, y1, y2, y3, z, a, b and k are positive numbers;

$M^{II}X_2.aM^{II}X'_2.bSiO:xEu^{2+}$, where $M^{II}$ is at least one alkaline earth metal selected from the group consisting of Ba, Sr and Ca; each of X and X' is at least one halogen selected from the group consisting of Cl, Br and I, and X is not the same as X'; a, b and x are positive numbers;

an alkaline-based halide as a host material and a rare earth as a dopant;

$(Ba_{1-q}M_q)(Hf_{1-z-e}Zr_zMg_e):yT$ wherein M is selected from the group consisting of Ca and Sr and combinations thereof; T is Cu; and q is, z, e and y are positive numbers;

$A_3B_5X_{12}:M$, where A is an element selected from the group consisting of Y, Ca, Sr; B is an element selected from the group consisting of Al, Ga, Si; X is an element selected from the group consisting of O and S; and M is an element selected from the group consisting of Ce and Tb;

$Ba_2(Mg, Zn)Si_2O_7:Eu^{2+}$ or $(Ba_{1-x-y-z}, Ca_x, Sr_y, Eu_z)_2(Mg_{1-w}, Znw)Si_2O_7$;

$Sr_xBa_yCa_zSiO_4:Eu^2$ in which x, y, and z are each independently any value between and including 0 and 2;

$ZnS_xSe_y:Cu,A$ in which x and y are each independently any value between 0 and 1 and A is at least one of Ag, Al, Ce, Tb, Cl, I, Mg, and Mn;

$MA_2(S_xSe_y)_4:B$ in which x and y are each independently any value between about 0.01 and about 1; M is at least one of Be, Mg, Ca, Sr, Ba, Zn; and A is at least one of Al, Ga, In, Y, La, and Gd; and the activator B is at least one of Eu, Ce, Cu, Ag, Al, Tb, Cl, F, Br, I, Pr, Na, K, Mg, and Mn;

$M_2A_4(S_xSe_y)_7:B$ in which x and y are each independently any value between about 0.01 and about 1, M is at least one of Be, Mg, Ca, Sr, Ba, Zn; and A is at least one of Al, Ga, In, Y, La, and Gd; and B is at least one of Eu, Ce, Cu, Ag, Al, Tb, Cl, Br, F, I, Pr, K, Na, Mg, and Mn;

$(M1)_m(M2)_nA_2(S_xSe_y)_4:B$ in which: M1 comprises an element selected from the group consisting of: Be, Mg, Ca, Sr, Ba, Zn; M2 comprises an element selected from the group consisting of: Be, Mg, Ca, Sr, Ba, Zn; A comprises one or more elements selected from the group consisting of: Al, Ga, In, Y, La, and Gd; and B comprises one or more elements selected from the group consisting of: Eu, Ce, Cu, Ag, Al, Tb, Cl, Br, F, I, Mg, Pr, K, Na, and Mn;

$(M1)_m(M2)_nA_4(S_xSe_y)_7:B$ in which M1 comprises an element selected from the group consisting of: Be, Mg, Ca, Sr, Ba, Zn; M2 comprises an element selected from the group consisting of: Be, Mg, Ca, Sr, Ba, Zn; A comprises one or more elements selected from the group consisting of: Al, Ga, In, Y, La, and Gd; and B comprises one or more elements selected from the group consisting of: Eu, Ce, Cu, Ag, Al, Tb, Cl, Br, F, I, Mg, Pr, K, Na, and Mn;

These and other laser display systems, display techniques, and fluorescent materials are described in greater detail in the attached drawings, the textual description, and the claims.

BRIEF DESCRIPTION OF THE DRAWINGS

FIGS. 14A and 15 show the design and operation of one exemplary implementation of the on-screen pixel sensor unit and control in FIG. 14.

FIG. 22 shows an exemplary beam scanner with multiple reflecting facets for the laser display systems in FIGS. 1 and 2 where the reflecting facets are connected to a rotating platform via flexures to allow for adjustable tilting of the reflecting facets.

DETAILED DESCRIPTION

This application describes, among others, implementations of laser-based display techniques and systems that use at least one scanning laser beam to excite color light-emitting materials deposited on a screen to produce color images. The at least one scanning laser beam is modulated to carry images in red, green and blue colors and is controlled in such a way that it excites the color light-emitting materials in red, green and blue colors with the images in red, green and blue colors, respectively. Hence, the at least one scanning laser beam itself does not directly produce the light in red, green and blue that is seen by a viewer but instead the color light-emitting materials on the screen absorb the energy of the laser beam and emit light in red, green and blue in generating the color images seen by the viewer.

The color light-emitting materials on the screen may be implemented with various materials. In one implementation, for example, three different quantum dots can be designed and engineered to be optically excited by the scanning laser beam as the optical pump to produce light in red, green, and blue colors suitable for forming color images. Such quantum dots may be formed on the screen as pixel dots arranged in parallel lines (e.g., repetitive sequential red pixel dot line, green pixel dot line and blue pixel dot line). In another implementation, three different color phosphors that are optically excitable by the laser beam to respectively produce light in red, green, and blue colors suitable for forming color images may be formed on the screen as pixel dots or repetitive red, green and blue phosphor stripes in parallel. For ease of description, the examples described in this application use screens with parallel color phosphor stripes for emitting light in red, green, and blue to illustrate various features of the laser-based displays. Various described features in these examples are applicable to displays with screens made of other color light-emitting materials.

Figure 1:
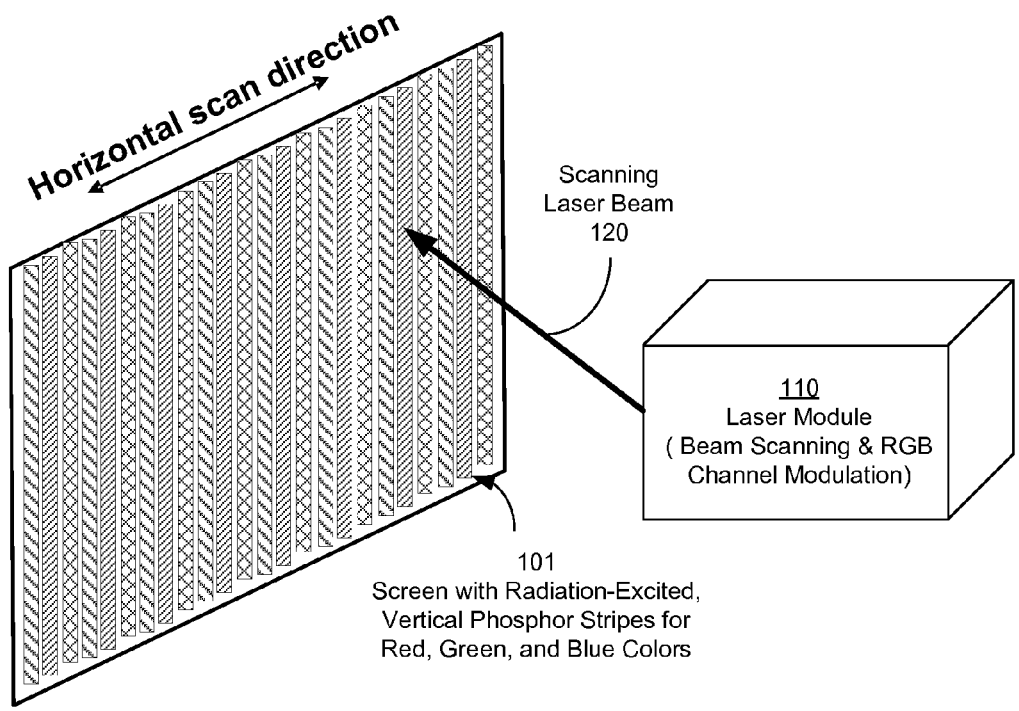
FIGS. 1 and 2 shows two examples of laser display systems where screens are made of laser-excitable phosphors emitting colored lights under excitation of a scanning laser beam that carries the image information to be displayed.
Figure 2:
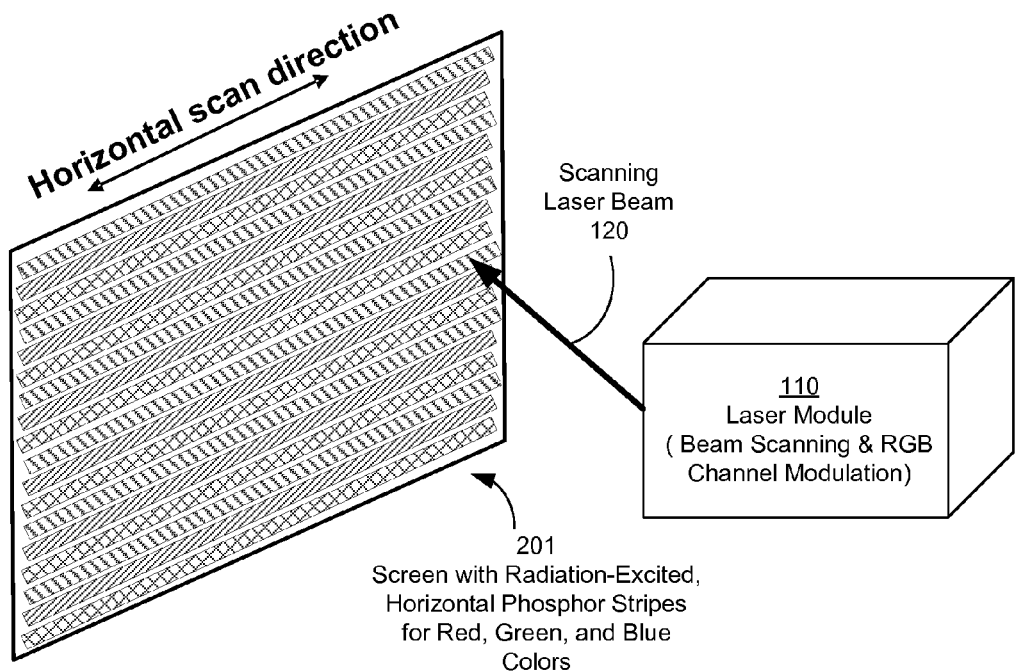

FIGS. 1 and 2 illustrate two laser-based display systems using screens having color phosphor stripes. Alternatively, color phosphor dots may also be used to define the image pixels on the screen. The system in FIG. 1 includes a laser module 110 to produce and project at least one scanning laser beam 120 onto a screen 101. The screen 101 has parallel color phosphor stripes in the vertical direction where red phosphor absorbs the laser light to emit light in red, green phosphor absorbs the laser light to emit light in green and blue phosphor absorbs the laser light to emit light in blue. Adjacent three color phosphor stripes are in three different colors. One particular spatial color sequence of the stripes is shown in FIG. 1 as red, green and blue. Other color sequences may also be used. The laser beam 120 is at the wavelength within the optical absorption bandwidth of the color phosphors and thus is usually at a wavelength shorter than the visible blue and the green and red colors for the color images. As an example, the color phosphors may be phosphors that absorb UV light in the spectral range from about 380 nm to about 420 nm to produce desired red, green and blue light. The laser module 110 may include one or more lasers such as UV diode lasers to produce the beam 120, a beam scanning mechanism to scan the beam 120 horizontally and vertically to render one image frame at a time on the screen, and a signal modulation mechanism to modulate the beam 120 to carry the information for image channels for red, green and blue colors. FIG. 2 shows an alternative design where the color phosphor stripes are parallel to the horizontal direction of the screen 102. Such display systems may be configured as rear projection systems where the viewer and the laser module 101 are on the opposite sides of the screen 101.

Figure 3A:
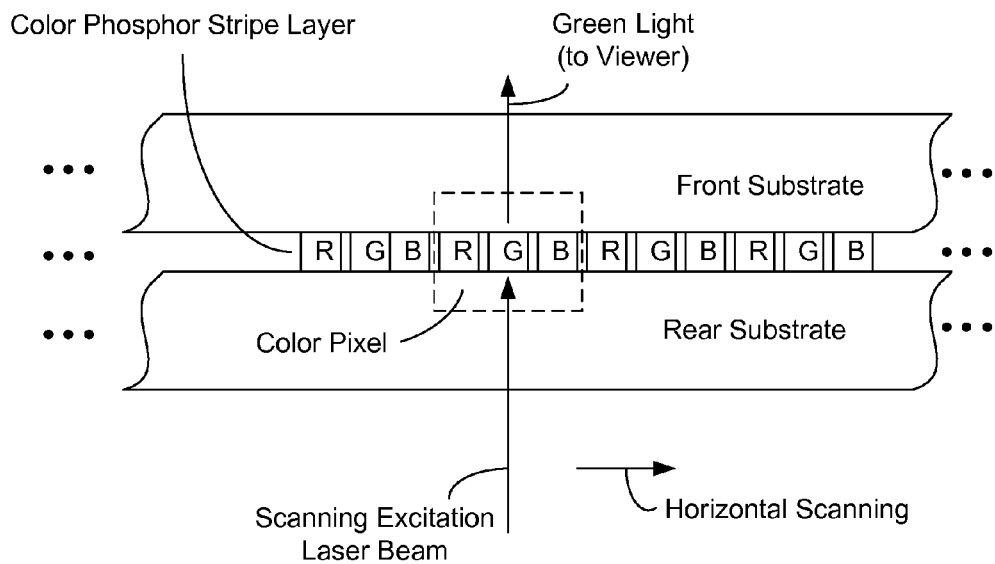
FIGS. 3A and 3B show one exemplary of a screen structure and the structure of color pixels on the screen.

FIG. 3A shows an exemplary design of the screen 101 in FIG. 1. The screen 101 may include a rear substrate which is transparent to the scanning laser beam 120 and faces the laser module 110 to receive the scanning laser beam 120. The color phosphor stripes represented by "R", "G" and "B" for red, green and blue colors are formed on the rear substrate. A second substrate, the front substrate, is formed on top of the phosphor stripes and is transparent to the red, green and blue colors emitted by the phosphor stripes. The substrate may be made of various materials, including glass or polycarbonate panels. Each color pixel includes three adjacent color phosphor stripes in the horizontal direction and its vertical dimension is defined by the beam spread of the laser beam in the vertical direction. The laser module 110 scans the laser beam 120 one horizontal line at a time, e.g., from left to right and from top to bottom to fill the screen 101. The laser module 110 is fixed in position relative to the screen 101 so that the scanning of the beam 120 can be controlled in a predetermined manner to ensure proper alignment between the laser beam 120 and each pixel position on the screen 101.

Figure 3B:
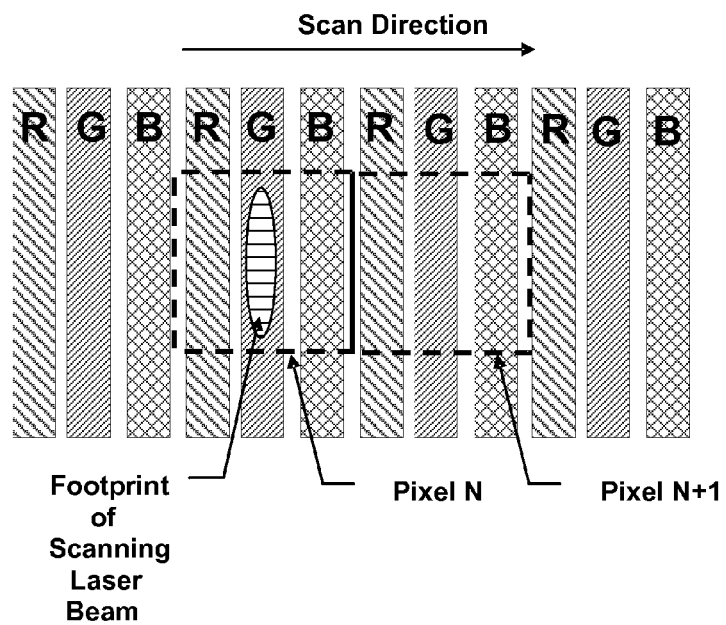

FIG. 3A shows the scanning laser beam 120 is directed at the green phosphor stripe in a pixel to produce green light from that pixel. FIG. 3B further shows the operation of the screen 101 from a view along the direction perpendicular to the screen 101. Since each color stripe is longitudinal in shape, the cross section of the beam 120 may be shaped to be elongated along the direction of the stripe to maximize the fill factor of the beam within each color stripe for a pixel. This may be achieved by using a beam shaping optical element in the laser module 110.

Figure 4:
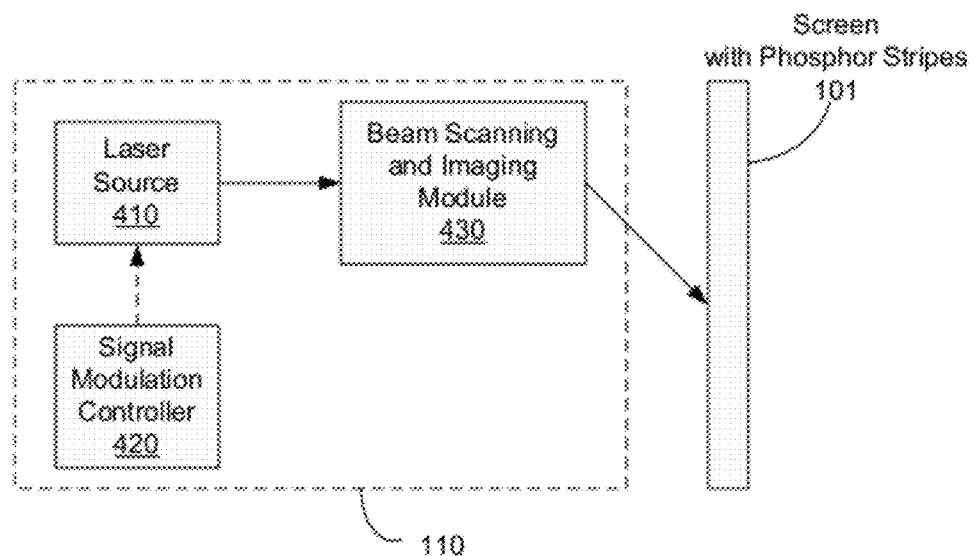
FIGS. 4 and 5 show two examples of optical modulation designs for the laser display systems in FIGS. 1 and 2.
Figure 5:
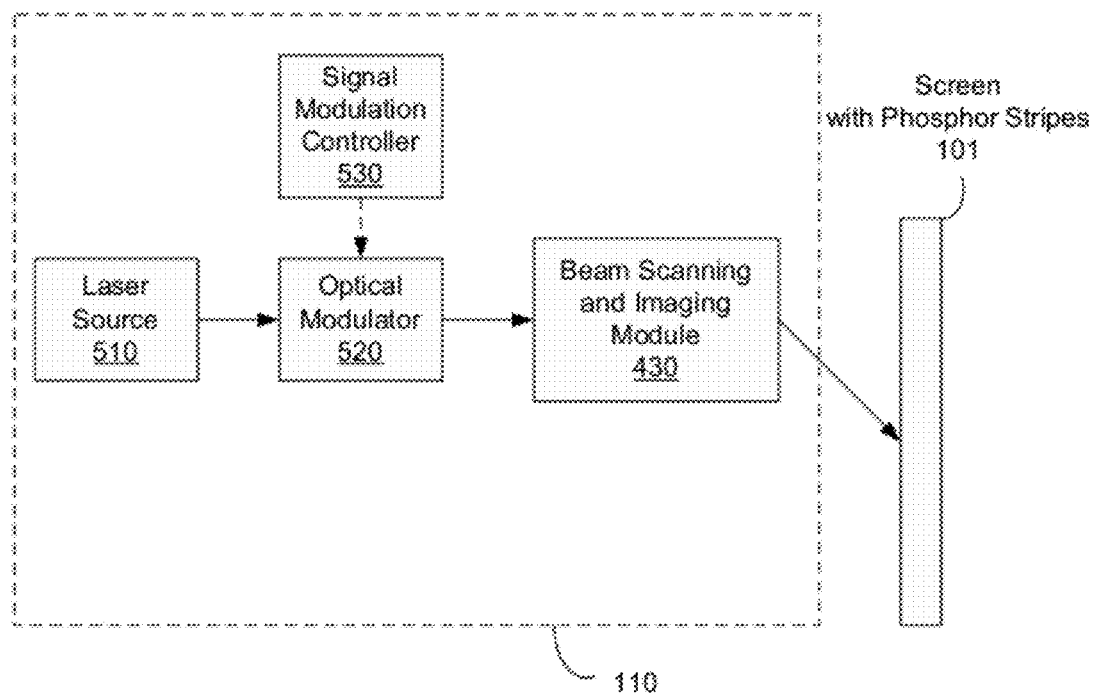

The optical modulation in the laser module 110 may be achieved in two different configurations. FIG. 4 shows an implementation of the display in FIG. 1 where a laser source 410 producing the laser beam 120 is directly modulated to carry the image signals in red, green and blue. The laser module 110 in this implementation includes a signal modulation controller 420 which modulates the laser source 410 directly. For example, the signal modulation controller 420 may control the driving current of a laser diode as the laser source 410. A beam scanning and imaging module 430 is then project the modulated beam 120 to the screen 101 to excite the color phosphors. Alternatively, FIG. 5 shows another implementation of the display in FIG. 1 where a laser source 510 is used to generate a CW unmodulated laser beam and an optical modulator 520 is used to modulate the laser beam with the image signals in red, green and blue. A signal modulation controller 530 is used to control the optical modulator 520. For example, an acousto-optic modulator or an electro-optic modulator may be used as the optical modulator 520. The modulated beam from the optical modulator 520 is then projected onto the screen 101 by the beam scanning and imaging module 430.

Figure 6:
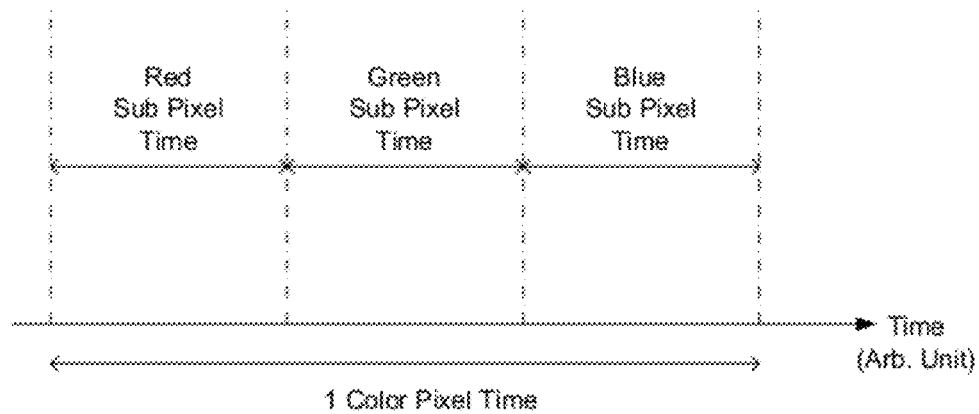
FIG. 6 shows time divisions of the scanning laser beam in the systems in FIGS. 1 and 2 where the screen uses red, green and blue light-emitting phosphor stripes for color pixels.

The laser beam 120 is scanned spatially across the screen 101 to hit different color pixels at different times. Accordingly, the modulated beam 120 carries the image signals for the red, green and blue for each pixel at different times and for different pixels at different times. Hence, the modulation of the beam 120 is coded with image information for different pixels at different times to map the timely coded image signals in the beam 120 to the spatial pixels on the screen 101 via the beam scanning. FIG. 6 shows one example for time division on the modulated laser beam 120 where each color pixel time is equally divided into three sequential time slots for the three color channels. The modulation of the beam 120 may use pulse modulation techniques to produce desired grey scales in each color, proper color combination in each pixel, and desired image brightness.

Figure 7:
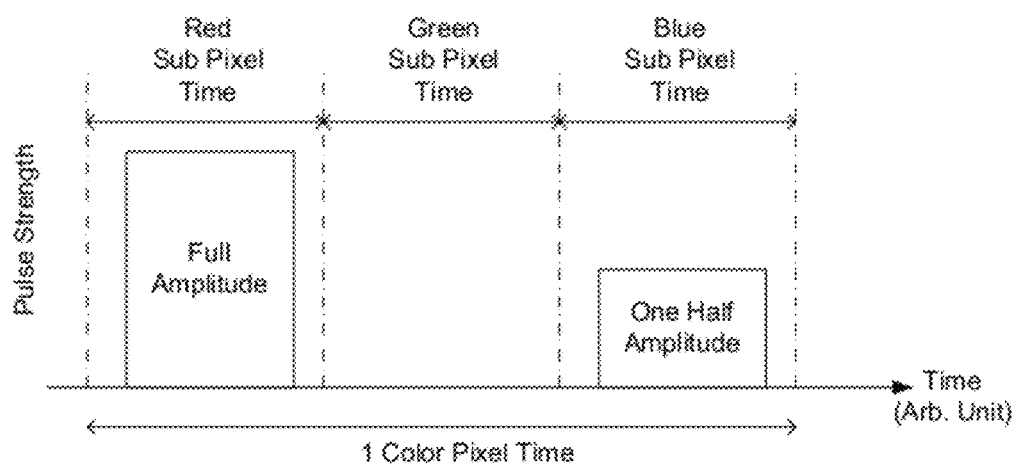
FIG. 7 shows an example of pulse amplitude modulation for modulating the scanning laser beam in the systems in FIGS. 1 and 2.

FIGS. 7, 8, 9, 10A and 10B illustrate examples of some pulse modulation techniques. FIG. 7 shows an example of a pulse amplitude modulation (PAM) where the amplitude of the optical pulse in each time slot produces the desired grey scale and color when combined with other two colors within the same pixel. In the illustrated example, the pulse during the red sub pixel time is at its full amplitude, the pulse during the green sub pixel time is zero, and the pulse during the blue sub pixel time is one half of the full amplitude. PAM is sensitive to noise. As an improvement to PAM, a pulse code modulation (PCM) may be used where the amplitude values of the pulse are digitized. PCM is widely used in various applications.

Figure 8:
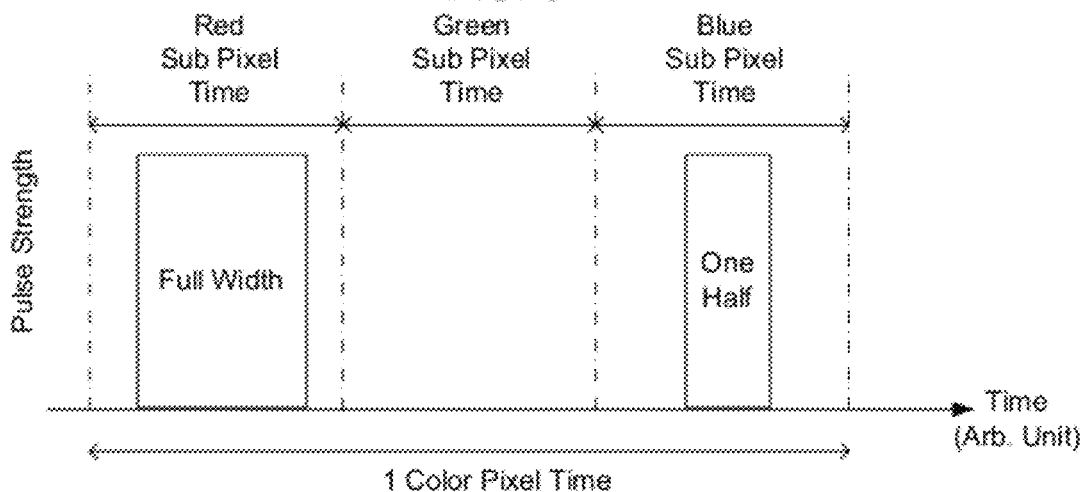
FIGS. 8 and 9 illustrate implementations of pulse width modulation for modulating the scanning laser beam in the systems in FIGS. 1 and 2.
Figure 9:
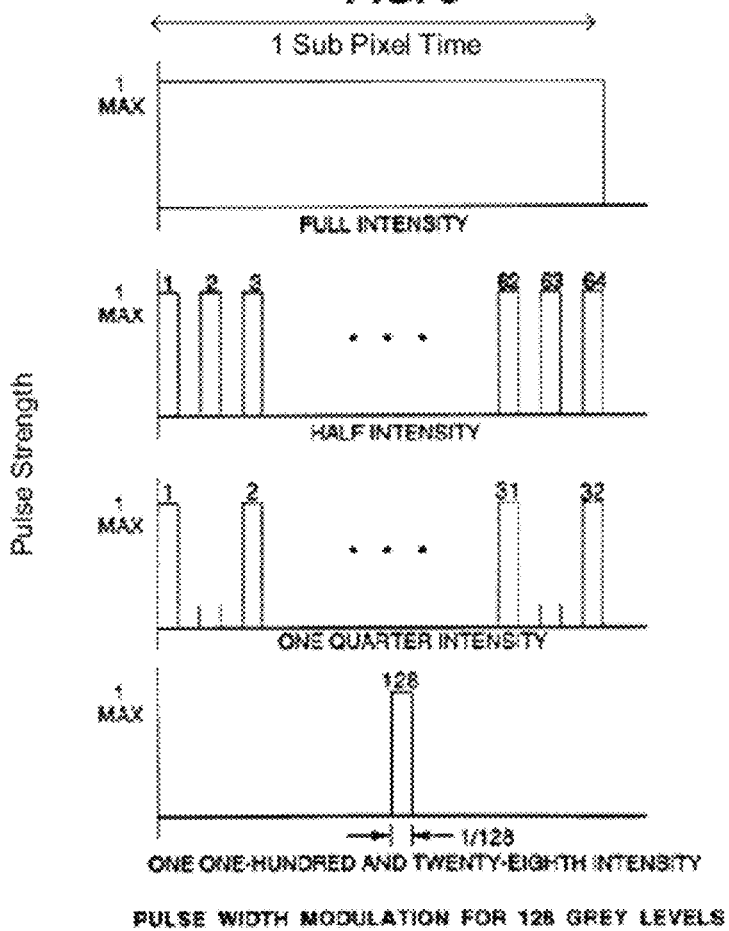

FIG. 8 shows another pulse modulation technique where each pulse is at a fixed amplitude but the pulse width or duration is changed or modulated to change the total energy of light in each color sub pixel. The illustrated example in FIG. 8 for the pulse width modulation (PWM) shows a full width pulse in red, no pulse in green and a pulse with one half of the full width in blue. FIG. 9 illustrates another example of the PWM for producing N (e.g., N=128) grey scales in each color sub pixel. Each pixel time is equally divided into N time slots. At the full intensity, the a single pulse for the entire duration of the sub pixel time at the full amplitude is produced. To generate the one half intensity, only 64 pulses with the full amplitude in alternating time slots, 1, 3, 5, 7, . . . , 127 are generated with the sub pixel time. This method of using equally spaced pulses with a duration of 1/N of the sub pixel time can be used to generate a total of 128 different grey levels. For practical applications, the N may be set at 256 or greater to achieve higher grey levels.

Figure 10A:
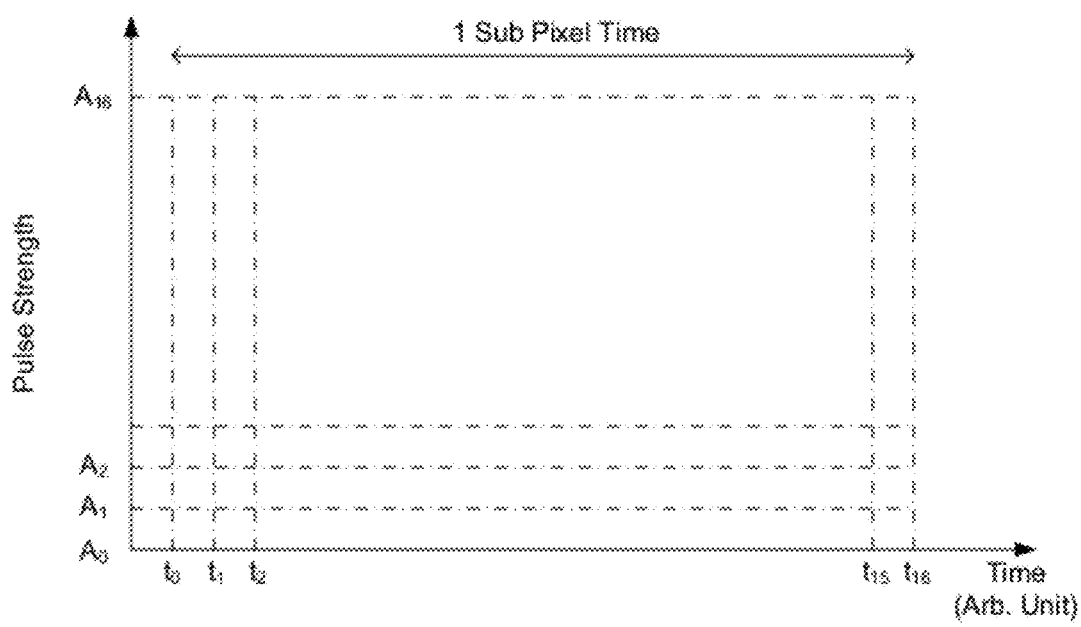
FIGS. 10A and 10B illustrate one implementation of combining pulse amplitude modulation and pulse width modulation for modulating the scanning laser beam in the systems in FIGS. 1 and 2.
Figure 10B:
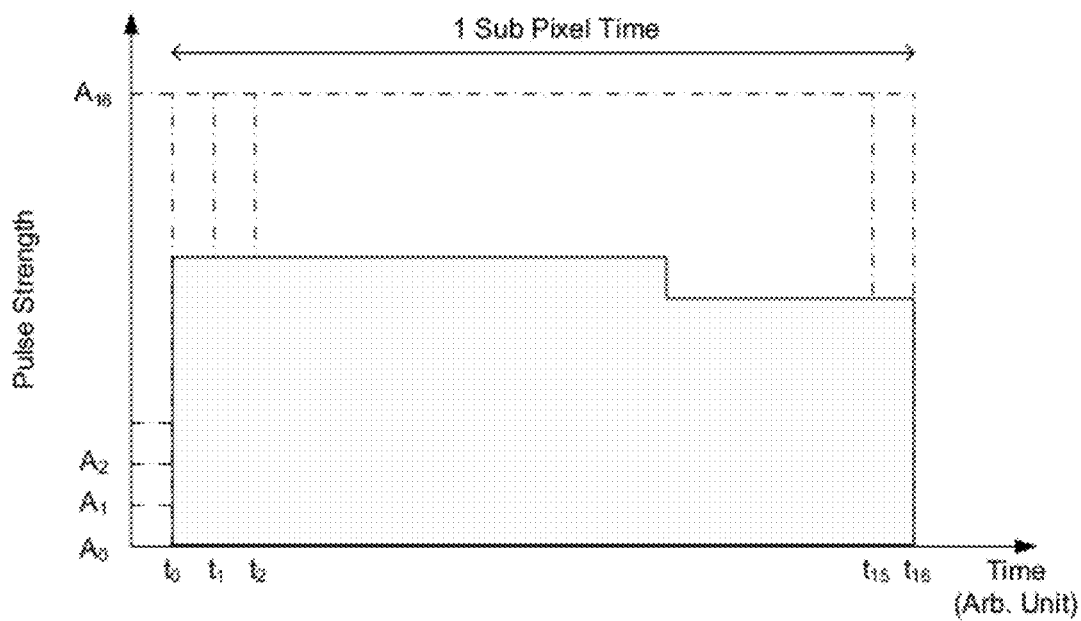

FIGS. 10A and 10B illustrate another example of a pulse modulation technique that combines both the PCM and PWM to produce N grey scales. In the PCM part of this modulation scheme, the full amplitude of the pulse is divided into M digital levels and the full sub pixel time is divided into M sub pulse durations. The combination of the PCM and PWD is N=M×M grey scales in each color sub pixel. As an example, FIG. 10A shows that a PCM with 16 digital levels and a PWM with 16 digital levels. In implementation, a grey scale may be achieved by first filling the pulse positions at the lowest amplitude level A1. When all 16 time slots are used up, the amplitude level is increased by one level to A2 and then the time slots sequentially filled up. FIG. 10B shows one example of a color sub pixel signal according to this hybrid modulation based on PCM and PWM. The above hybrid modulation has a number of advantages. For example, the total number of the grey levels is no longer limited by the operating speed of the electronics for PCM or PWM alone.

One important technical parameter for displays is the contrast ratio. The light level of the black color is usually the dominating factor for the contrast ratio. For a given system, the lower the light level of the black color the better the contrast of the display system. Many display systems can achieve a virtue black color by reducing the light levels in all three color sub pixels of a color pixel to their minimum levels without being able to completely shut off the light. The laser-based display systems described here, however, can be designed to completely shut off light in each color sub pixel to produce the true black color. This technique is now described with a specific reference to a diode laser as the light source as an example and it is understood that the technique can also be used in other laser sources.

Figure 11:
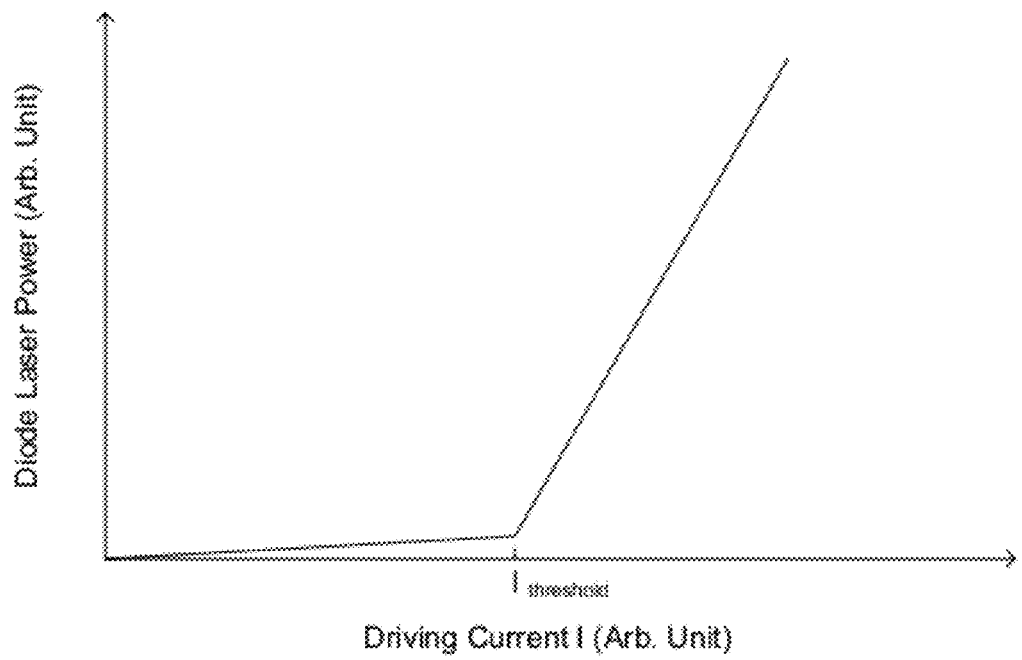
FIG. 11 illustrates an example of the diode laser output power as a function of the driving current of the diode laser with a threshold behavior.

A diode laser has a threshold behavior where the laser action starts when the forward driving current is greater than a threshold value and the diode laser emits spontaneously without lasing when the driving current is below the threshold. FIG. 11 shows an illustrative optical power as a function of the driving current to a typical diode laser. At a current just below the threshold current, the diode laser emits at a low light level. Hence, the diode laser can be operated at this current level just below the threshold current to produce a virtue black. When a true black is needed, the driving current to the diode laser can be shut off so no light is generated by the laser and no light is generated on the corresponding phosphor stripe in a pixel on the screen. Many diode lasers show a delay behavior where there is a time delay between the optical output and the driving current so that when the driving current is switched on to a value greater than the threshold value, the laser action lags behind the current for a delay time. This delay is essentially negligible if the initial current is biased just below the threshold current. Accordingly, the diode laser may be operated to produce either the virtual back or the true black depending on the black color distribution in a particular image frame.

When an image frame does not have contiguous black pixels in time less than the delay time of the diode laser, the diode laser is controlled to operate at a bias current just below the threshold current to produce a virtual black in these black pixels. When an image frame has contiguous black pixels in time greater than the delay time of the diode laser, the diode laser is turned off by shutting off the driving current at the beginning of the black pixels to produce the true black in these pixels. At the end of the this block of contiguous black pixels, the driving current of the diode laser is tuned back on to a value just below the threshold current to produce the virtue black for the remaining black pixels so that the first non-black pixel following the block of the contiguous pixels can be timely generated. In this example, a part of the black pixels is true black and a part of the black pixels is virtue black. On average, the light level for the black pixels is better than the virtue black. For a diode laser with a delay time in tens of nanoseconds, two or more sequential black pixels with a pixel duration of 50 nsec would be sufficient to operate the diode laser to generate the true black.

Figure 12:
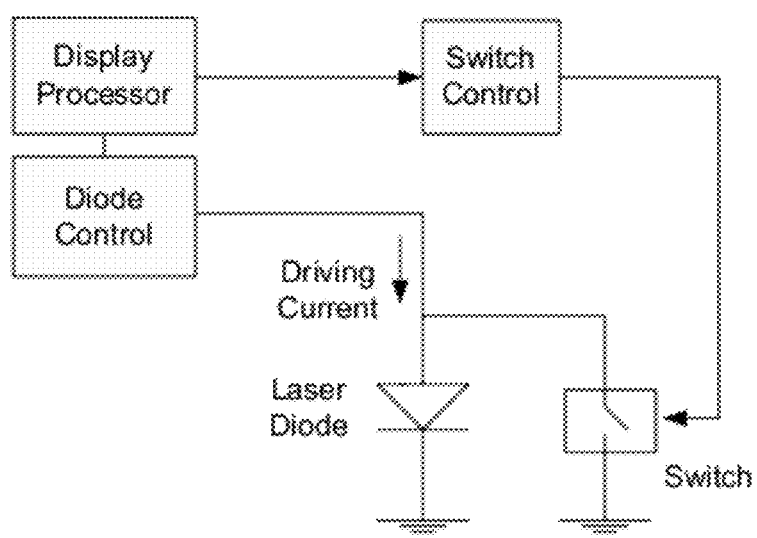
FIGS. 12 and 13 show an implementation of an image control mechanism for controlling a diode laser that generates the scanning laser beam in the systems in FIGS. 1 and 2 to produce true black pixels.

FIG. 12 shows a bypass current path for implementing the above technique for generating the true black. The bypass current path includes a switch which is normally open so all driving current flow into the laser diode. A diode control circuit generates the driving current. A display processor, which processes the image frames to be displayed and produces the proper control signals for driving the diode laser, sends the control signals based on he image frames to the diode control circuit. The display processor is further connected to a switch control which controls the switch in the current bypass path to turn on the switch when the driving current to the diode laser is to be shut off to generate a true black.

Figure 13:
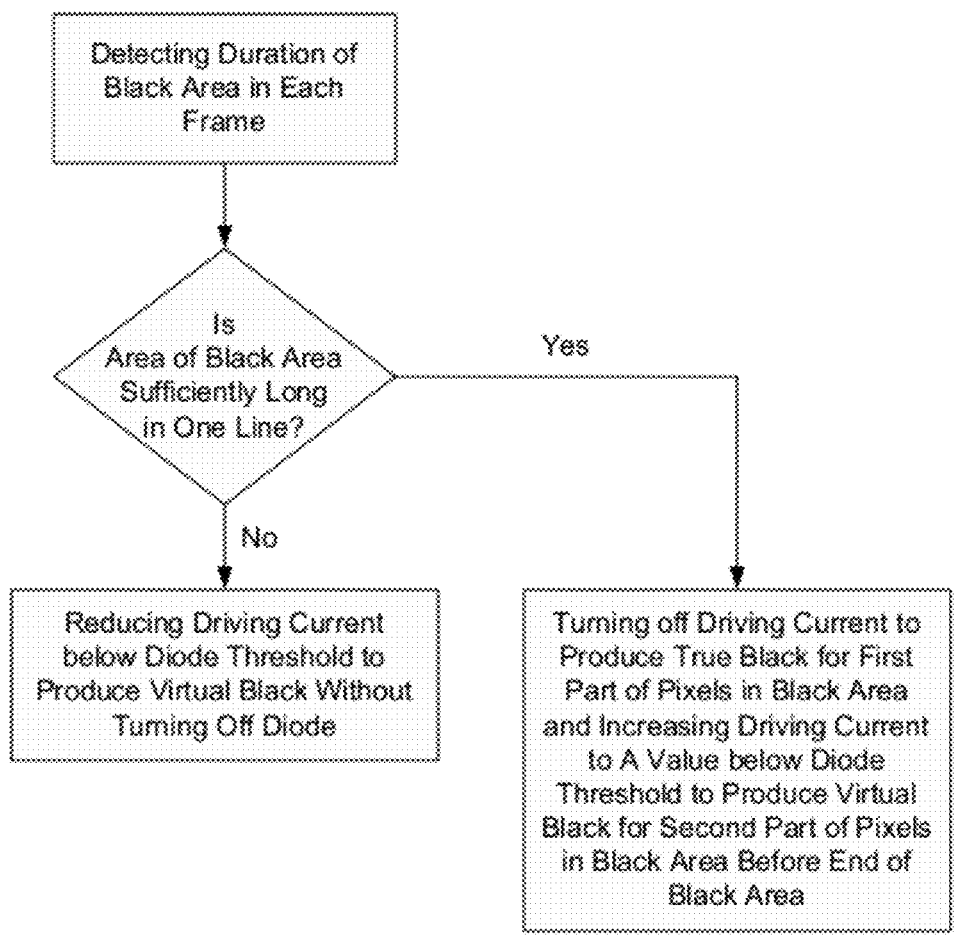

In operation, the display processor monitors the pixels in each image frame to be displayed. This monitoring process can be achieved in the digital domain where the data bits for the pixels in a memory buffer of the processor are monitored. Depending on the length of the contiguous black pixels in time to be displayed, the display processor operates to keep the switch open to produce the virtue black to close the switch to produce the true black. FIG. 13 shows the operation of the display processor.

Referring back to FIG. 1, the laser module 110 is fixed in position relative to the screen 101. More specifically, the relative position of the laser module 110 and the screen 101 is predetermined and pre-calibrated to achieve the pixel registration of the scanning positions of the laser beam 120 on the screen 101 and the pixel positions on the screen 101. This spatial alignment between the laser module 110 and the screen 101 may change. For the screen 101 with parallel color phosphor stripes perpendicular to the horizontal scanning direction, the alignment along the vertical direction is less important than the alignment along the horizontal direction because the former shift the entire image frame without changing color registration and the latter, on the contrary, changes the color registration and hence degrades the entire image.

Figure 14:
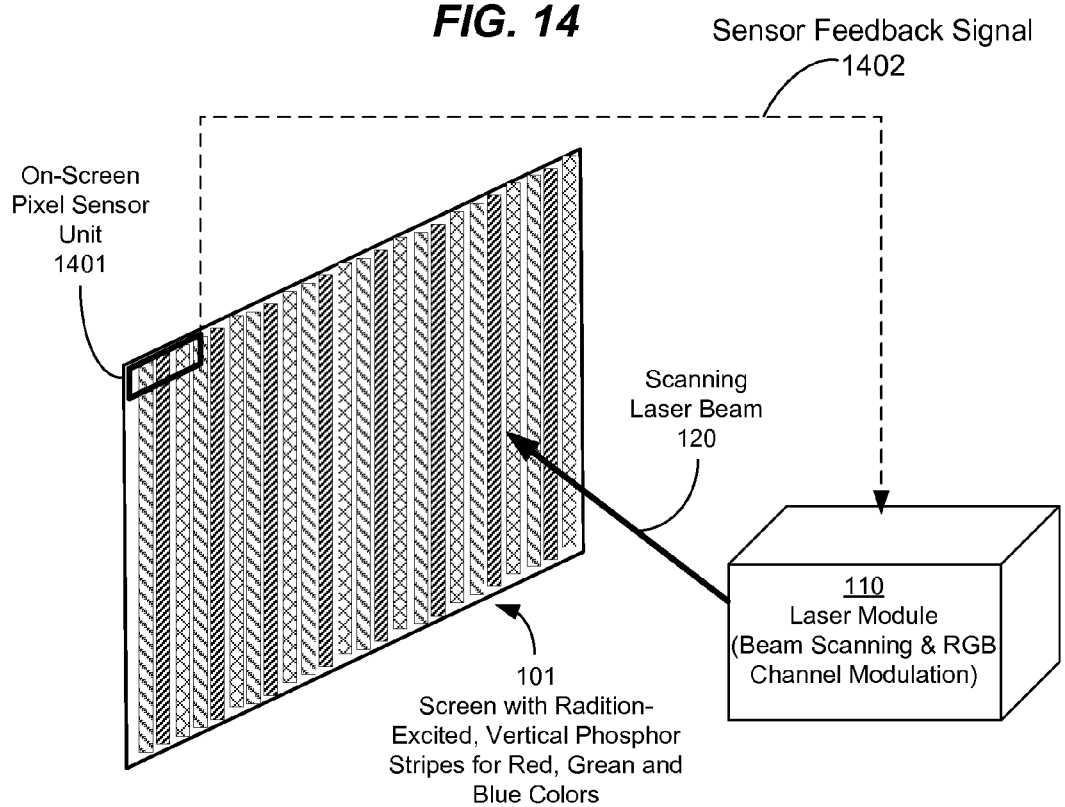
FIG. 14 shows an implementation of an on-screen pixel sensor unit and the associated sensor feedback for controlling timing of the image pulses in the scanning laser beam to correct a spatial misalignment of the scanning laser beam with respect to the colored phosphor stripes on the screen.

To mitigate this horizontal misalignment, a sensing mechanism may be built in the screen 101 as a pixel sensor unit to detect the horizontal misalignment and a feedback control may be used to correct the misalignment. FIG. 14 shows a display system with an on-screen sensing unit 1401 for optically measuring the responses of color pixels on the screen 101 to produce a sensor feedback signal 1402 to the laser module 110 and a feedback control to allow the laser module 110 to correct the misalignment in response to the feedback signal 1402 from the screen 101.

The on-screen pixel sensor unit 1401 may include three optical detectors PD1, PD2 and PD3 that are located on the screen 101 and are respectively configured to respond to red, green and blue light. Each optical detector is only responsive to its designated color and not to other colors. Hence, as an example, the red optical detector PD1 responds to the red light but is not responsive to green and blue light. This may be achieved by, e.g., using red, green and blue optical bandpass filters in front of the optical detectors PD1, PD2 and PD3, respectively. Assume the adjacent color phosphor stripes are arranged in the order of red, green and blue from the left to the right in the horizontal direction of the screen 101. If a red image is generated by the display processor in the laser module 110 but the red detector PD1 does not respond while either the blue detector PD3 or the green detector PD2 produces an output, the horizontal alignment is out of order by one sub pixel.

One way to correct this horizontal misalignment is to program the display processor in the laser module 110 to delay the modulated image signal carried by the modulated laser beam 120 by one sub color pixel time slot if the green detector PD2 has an output and red and blue detectors PD1 and PD3 have no output, or by two sub color pixel time slots if the blue detector PD3 has an output and red and green detectors PD1 and PD2 have no output. This correction by time delay may be achieved digitally within the display processor in the laser module 110. No physical adjustment in the optical scanning and imaging units in the laser module 110 is needed. Alternatively, the imaging unit in the laser module 110 may be adjusted to shift the laser position on the screen 101 horizontally to the left or right by, e.g., one sub pixel, to correct the horizontal misalignment as indicated by the sensor feedback signal 1402.

Figure 14A:
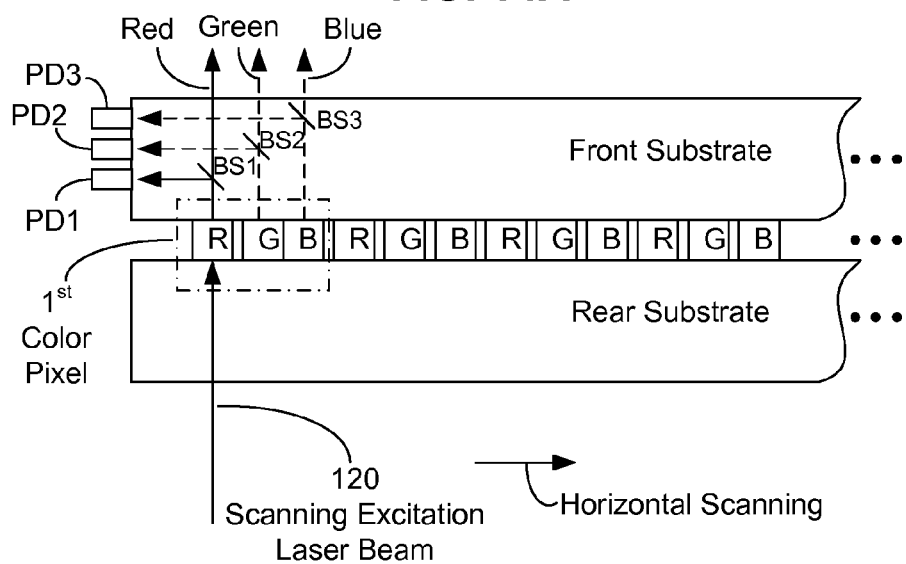

The above red, green and blue optical detectors PD1, PD2 and PD3 may be positioned to receive light from multiple pixels on the screen 101. A test pattern may be used to check the alignment. For example, a frame of one of the red, green and blue colors may be used as a test pattern to test the alignment. Alternatively, the red, green and blue optical detectors PD1, PD2 and PD3 may be embedded in the screen 101 to receive color light from different color sub pixels. FIG. 14A shows a design where three beam splitters BS1, BS2 and BS3 are used to split small fractions of red, green, and blue light beams from the color sub pixels of a color pixel to three detectors PD1, PD2 and PD3 formed on the front substrate of the screen 101. A testing bit pattern may be used to address that particular pixel to check the horizontal alignment.

FIG. 15 shows a test pattern for the color pixel embedded with the detectors PD1, PD2 and PD3. When the horizontal alignment is proper, the responses of the three detectors PD1, PD2 and PD3 are shown as illustrated. Otherwise, different responses will be generated and the responses may be used to either use the time-delay technique or the adjustment of the beam imaging optics to correct the horizontal misalignment.

Figure 16:
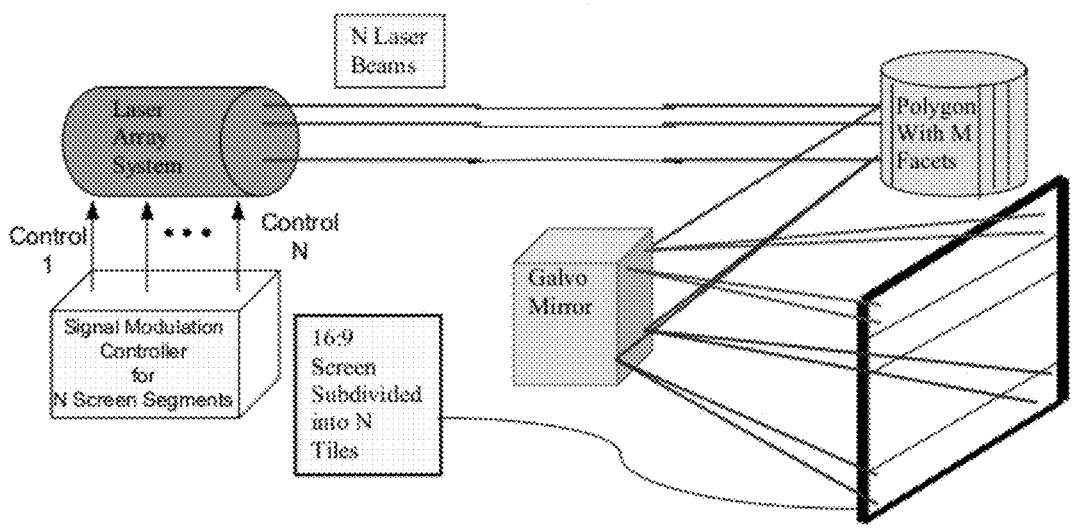
FIGS. 16 and 17 shows implementations of the laser display systems in FIGS. 4 and 5, respectively, that use a polygon and a galvo mirror as part of the laser scanning module and simultaneously scanning multiple screen segments with multiple scanning laser beams.
Figure 17:
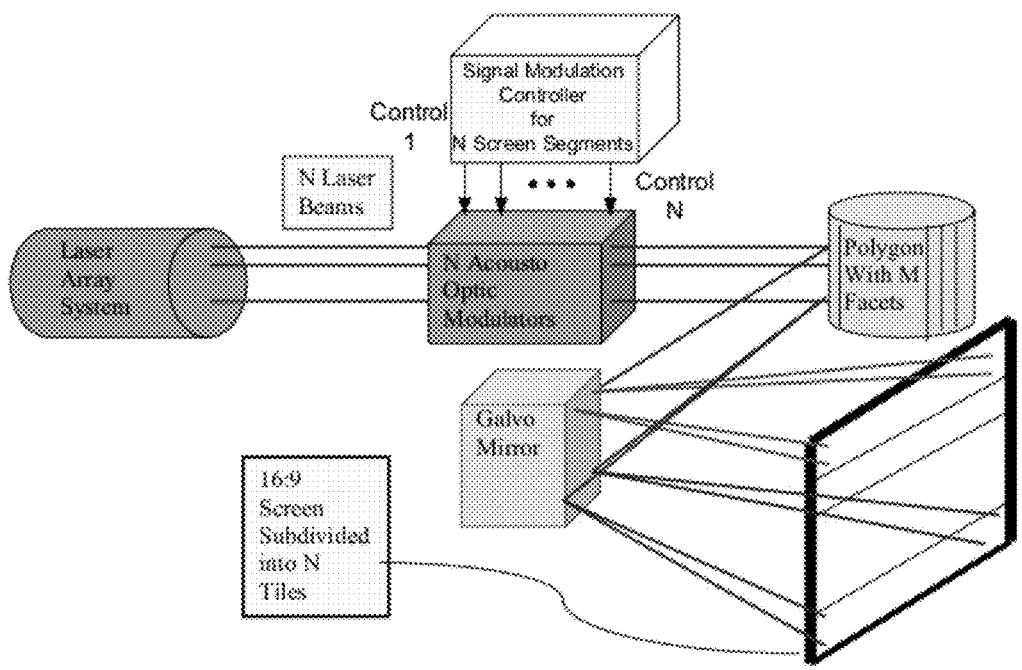

The present display systems may use a single scanning laser beam 120 to scan one horizontal line at a time to scan through the entire screen 101. Alternatively, multiple lasers may be used to produce multiple parallel scanning beams 120 to divide the screen 101 into N segments along the vertical direction so that one scanning beam 120 is designated to scan one segment and N scanning beams 120 are scanning N different segments at the same time. FIGS. 16 and 17 illustrate two display systems with different modulation methods based on the design in FIG. 1 that use multiple scanning laser beams to excite the color phosphor stripes on the screen.

As an example, the horizontal scanning may be achieved with a rotating polygon mirror with M facets and the vertical scanning may be achieved with a galvo mirror. For a screen for HDTV 16:9 aspect ratio, the angular ranges for horizontal and vertical scans are similar. For 16 degrees horizontal scan or +/−8 degrees, a mirror on the polygon needs to have a subtended angle of 8 degrees. Therefore, the number M of mirrors per 360 degrees is M=360/8=45 mirrors per revolution. Assuming 1080 interlaced lines or 540 odd lines followed by 540 even lines in 1/60 of a second, the number N of the scanning beams is equal to 540/M=12. Each beam scans 1/12 of the screen using a galvo mirror moving 9 degrees/12=0.75 degrees or 13 mrad. The segment of 1/12 of a screen is a sub-screen or a screen segment. Under this design, each sub-screen is traced in 1/60 of a second. The RPM of the disk is 3600 RPM with each mirror scan time equal to 1/60/45=370 usecs (ignoring retrace time). Each M facet moves at a speed of 370 usec. In each 370 usec slot the galvo mirror steps by increments of 0.75 degrees/45=0.3 mrad. Each sub-screen is scanned twice, one for odd lines and one for even lines in 1/60th second each, this means the galvo mirror moves by discrete steps of 0.3 mrad as shown below:

Line 1 odd is 0 mrad
Line 2 odd is 0.3 mrad
Line 3 odd is 0.6 mrad
. . . .
Line 45 odd is 13 mrad
Flightback to
Line 1 even at 0.15 mrad
Line 2 even at 0.45 mrad
. . . .
Line 45 even at 13.15 mrad In this particular example, the video bandwidth can be determined as follows. Each horizontal scan takes 370 usec to complete. Time for each pixel=370 usec/1920=192 nsec or 5.2 Mhz. Typically one needs 3× the pixel time for proper video BW which means about 15 MHz 3 dB point. This type of modulation frequency is easily attained by AO modulation. A total of 12×3 UV diode lasers each at about 50-100 mW each may be used to generate the scanning beams.

Figure 18:
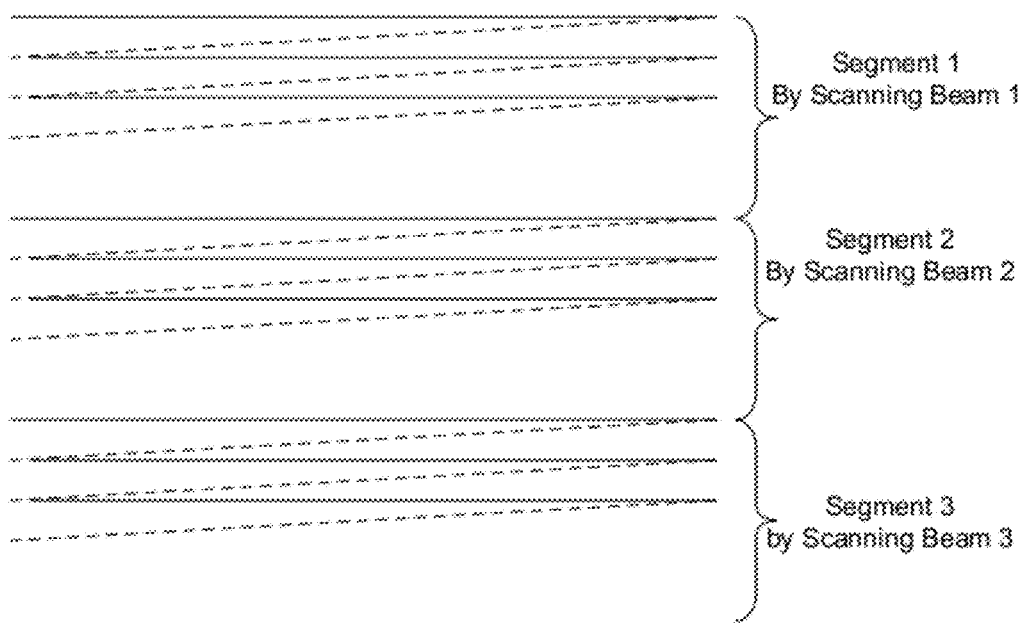
FIGS. 18 and 19 illustrate two exemplary implementations of the simultaneous scanning of multiple screen segments with multiple scanning laser beams.
Figure 19:
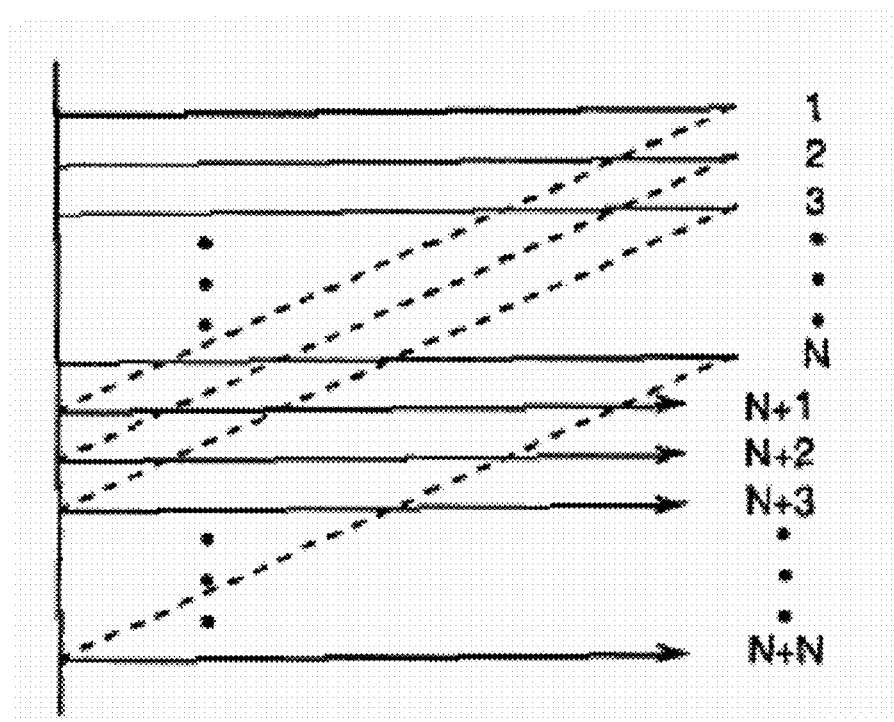

FIG. 18 shows one mode of simultaneous scanning of N segments or tiles. FIG. 19 shows an alternative scanning with N scanning laser beams that is described in the attached U.S. Pat. No. 5,920,361 and can be used with the present display systems. Polygons with reflective facets at different angles described in U.S. Pat. No. 5,920,361 can also be used in the present systems.

In implementing the above and other display designs, there can be a vertical misalignment between the multiple segments comprising the full screen. This misalignment can be digitally corrected with a means similar to that of the horizontal correction. Each segment of the screen can be driven with a scan engine capable of generating more horizontal lines than actually required for display in that segment (eg. 4 extra lines). In perfectly aligned situation, there are an equal number of extra (unused) lines above and below the segment image. If vertical misalignment exists, the control electronics may shift the segment image upwards or downwards by utilizing these extra lines in place of normal lines. For example, if the image needs to be moved upwards one line, the controller moves each line upwards to the previous one, utilizing one of the extra lines above the normal image and adding an extra unused line at the bottom. If this adjustment is desired to take place automatically during startup or normal operation, a sensor is required to provide feedback in real time. Such a sensor could be a position sensing diode located to either side of the viewable area of the segment to be controlled. The line would overscan onto this sensor when required. Alternatively a beam splitter could be used to provide feedback during the viewable portion of the scan.

One of the advantages of the above method is to reduce or simplify the requirement for accurate optical alignment because the electronic adjustment, when properly implemented, is simpler to implement and can reduce cost of the device.

The above described method allows adjustment with a resolution of only one line. To accomplish sub-line (sub-pixel) adjustment, the scan engine can be rotated slightly. This produces slightly diagonal horizontal scan lines. The adjacent screen segments would have scan engines slightly rotated on the opposite direction. Under this condition, to create a straight horizontal line, portions of at least two scan lines are used depending on the amount of rotation. This may provide a less noticeable junction between the screen segments.

Another method to reduce the visible junction artifact between two adjacent screen segments is to overlap the colors from each segment at the junction. For example the last blue line of segment #1 might be painted by one of the extra lines from the top of segment #2. Likewise, the first red line of segment #2 might be painted be one of the extra lines at the bottom of segment #1. This could further visually spread any junction artifacts.

Figure 20A:
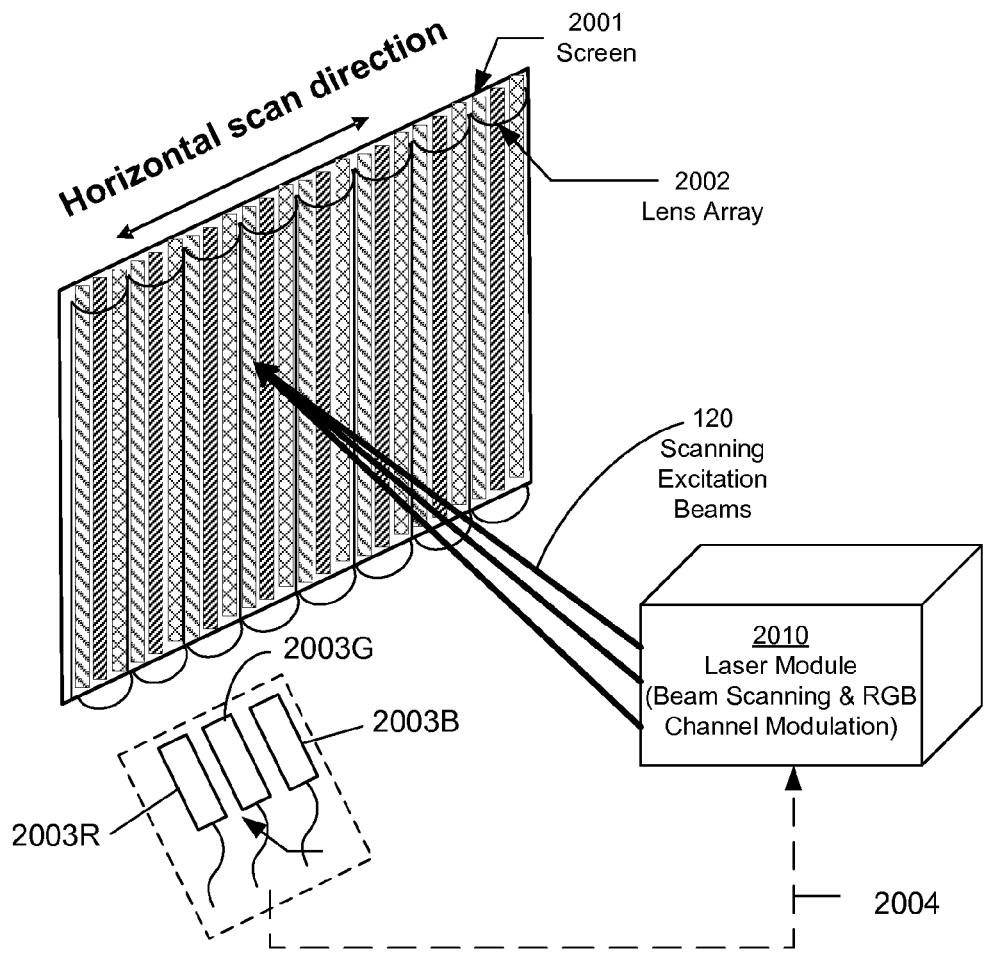
FIGS. 20A and 20B illustrate a different screen design with colored phosphor stripes where three or more different scanning beams are directed to each color pixel to produce different constituent colors of the color pixel, respectively.
Figure 20B:
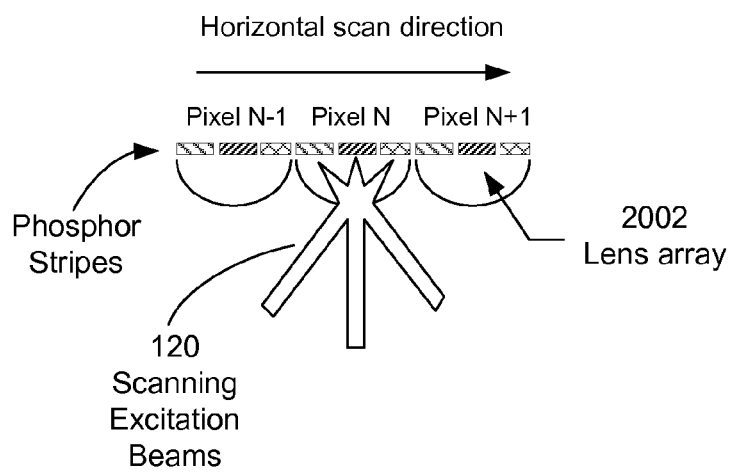

In the above display systems with color phosphor screens, the same scanning beam is used to address all three color sub pixels within each pixel on the screen. Alternatively, three different scanning beams may be used to respectively address the three color sub pixels in each color pixel. FIGS. 20A and 20B show one example of such a system.

More specifically, FIG. 20A shows that the screen 2001 with parallel vertical color phosphor stripes includes an array of cylindrical lenses 2002 that are respectively formed over the individual color phosphor stripes. A laser module 2010 produces three different scanning beams at the same wavelength to excite the phosphors on the screen 2001. The three laser beams can be directed to enter the screen 2001 with angular separations. Each cylindrical lens 2002 covers three adjacent phosphor stripes that respectively emit three different colors and focuses light of each scanning beam on a respective phosphor. Referring to FIG. 20B, the three separate scanning beams are directed at three different angles to address three different color sub pixels in each pixel via each of the cylindrical lenses 2002. The lenses 2002 at different horizontal positions may be tilted and such tilting may increase progressively from the center towards the edge of the screen to compensate for beam spot elongation that occurs with the increasing incidence angle of the input excitation light. The three scanning beams may be scanned together or independently to address all pixels. Three separate lasers may be used to generate the three scanning laser beams. In addition, N sets of the three laser beams may be used to simultaneously scan the screen 2001 in a similar manner as illustrated in FIGS. 16-19. Furthermore, red, green and blue optical sensors 2003R, 2003G and 2003B in an optical sensor module 2003 may be used to monitor the horizontal alignment between the scanning laser beams and the pixel positions on the screen and a feedback loop 2004 may be used to correct the misalignment via either the time delay technique or the adjustment of the imaging optics in the laser module 2010. The optical sensors 2003R, 2003G and 2003B may be wide area detectors and detect light emitted by the phosphors. One optical sensor is used to sense only one color of the three colors emitted by the screen 2001: the red optical sensor 2003R senses the red light, the green optical sensor 2003G senses the green light, and the blue optical sensor 2030B senses the blue light. The optical sensors 2003R, 2003G and 2003B are used in connection with the feedback loop 2003 and the laser module 2010 for closed-loop synchronization of the modulated laser beam to the phosphor stripes on the screen 2001.

Figure 21A:
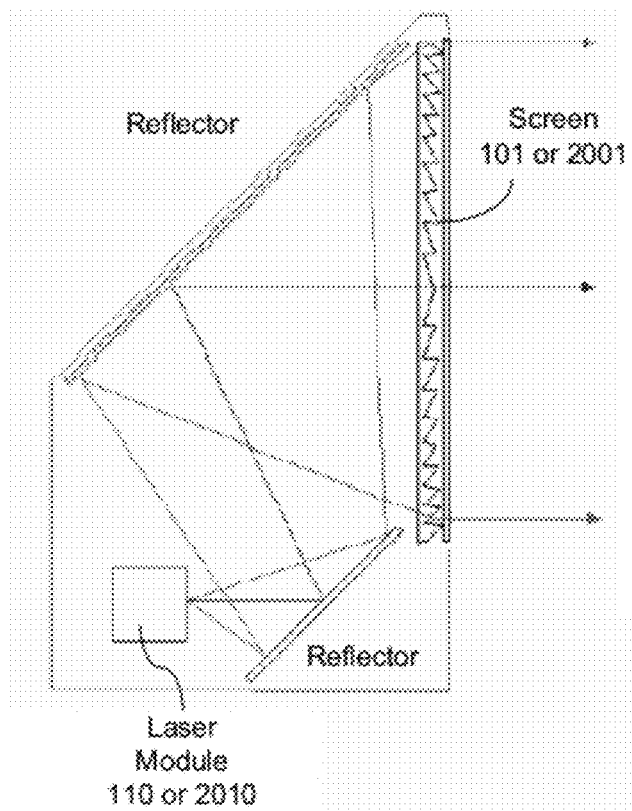
FIGS. 21A and 21B shows two examples of folded optical paths for directing a scanning laser beam to a screen with phosphors in rear projection configurations.
Figure 21B:
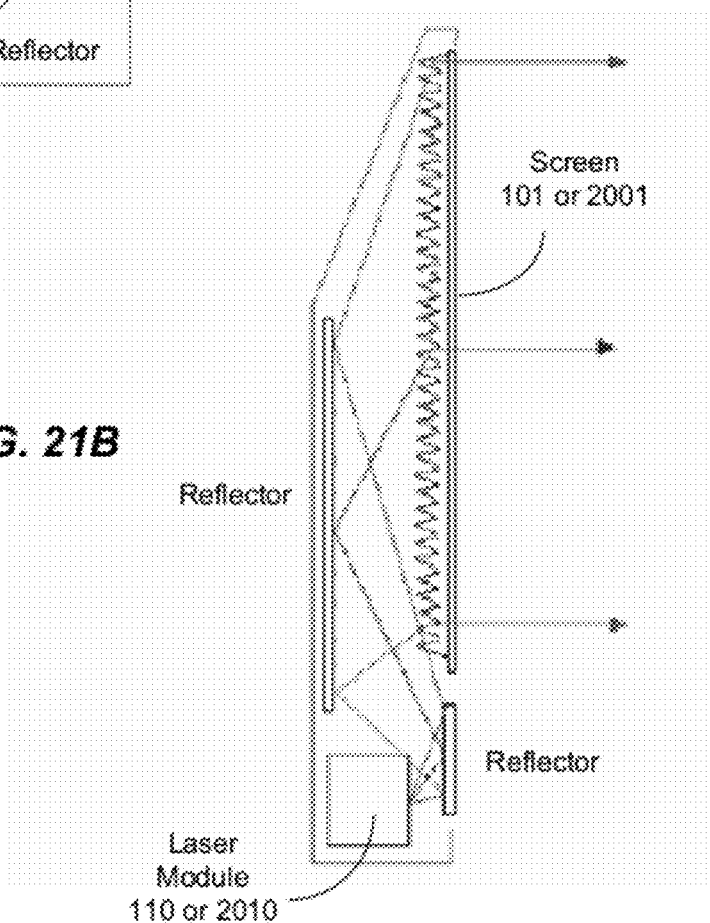

FIGS. 21A and 21B further show two folded optical designs that direct the output scanning laser beam from the laser module 110 or 2010 to a phosphor color screen in rear projection configurations. Such folded designs reduce the space of the systems.

As illustrated in FIGS. 16 and 17, laser scanning may be achieved by using a combination of a polygon for the horizontal scan and a galvo mirror for the vertical scan. A scanning device may be designed to integrate the functions of the polygon and the galvo mirror into a single device.

FIG. 22 shows one example of such an integrated scanner. The scanner includes multiple reflecting facets 2210 around a rotation axis 2230. Each facet 2210 is engaged to a base 2200 via a flexure joint 2220. An actuator 2240 is placed near the top end of each reflecting facet and rotates around the same axis 2230 with its corresponding reflecting facet. The actuator is controlled to apply an adjustable force onto the reflect facet to change its titling around the flexure 2220. The actuators 2240 and their corresponding reflecting facets 2210 can now individually controlled to scan the laser beam in the vertical direction while the reflecting facets 2210 rotating around the axis 2230 scan the laser beam in the horizontal direction. Two or more actuators 2240 may be provided for each reflecting facet and positioned at different heights along the reflecting surface to gradually tilt the reflecting facet in position for the vertical scanning.

In an alternative implementation, a single stationary actuator 2240 may be used to control tilting of different reflecting facets 2210. As each facet 2210 rotates around the axis 2230 and passes by the stationary actuator 2240, the facet is tilted by the operation of the actuator 2240 to perform the vertical scanning of the beam. Similarly, two or more stationary actuators may be used and placed at different heights of the facets.

The above scanning-laser display systems with screens having laser-excitable light-emitting materials may be used to form a monochromatic display module by having only one phosphor material on the screen. Hence, such a red monochromatic display module can be implemented by replacing the green and blue phosphor stripes with red phosphor stripes on the screen 101 in FIG. 1. Accordingly, the scanning laser beam is modulated within the laser module 110 by a monochromatic image signal. As a result, the image on the screen is red. In comparison to the same screen with three color phosphor stripes, the display resolution of the monochromatic display is tripled. Such monochromatic displays can be used to form a color display by combining three monochromatic displays in red, green an blue and projecting the red, green, and blue images to a common screen to form the final color images. The stripes are used here to provide a spatial mask on the phosphor screen to avoid blooming between adjacent pixels. Other spatial patterns for the single color phosphor may also be used. In addition, the monochromatic screen may be have a continuous layer of a single color phosphor and use an optional mask on top of the phosphor layer.

Figure 23:
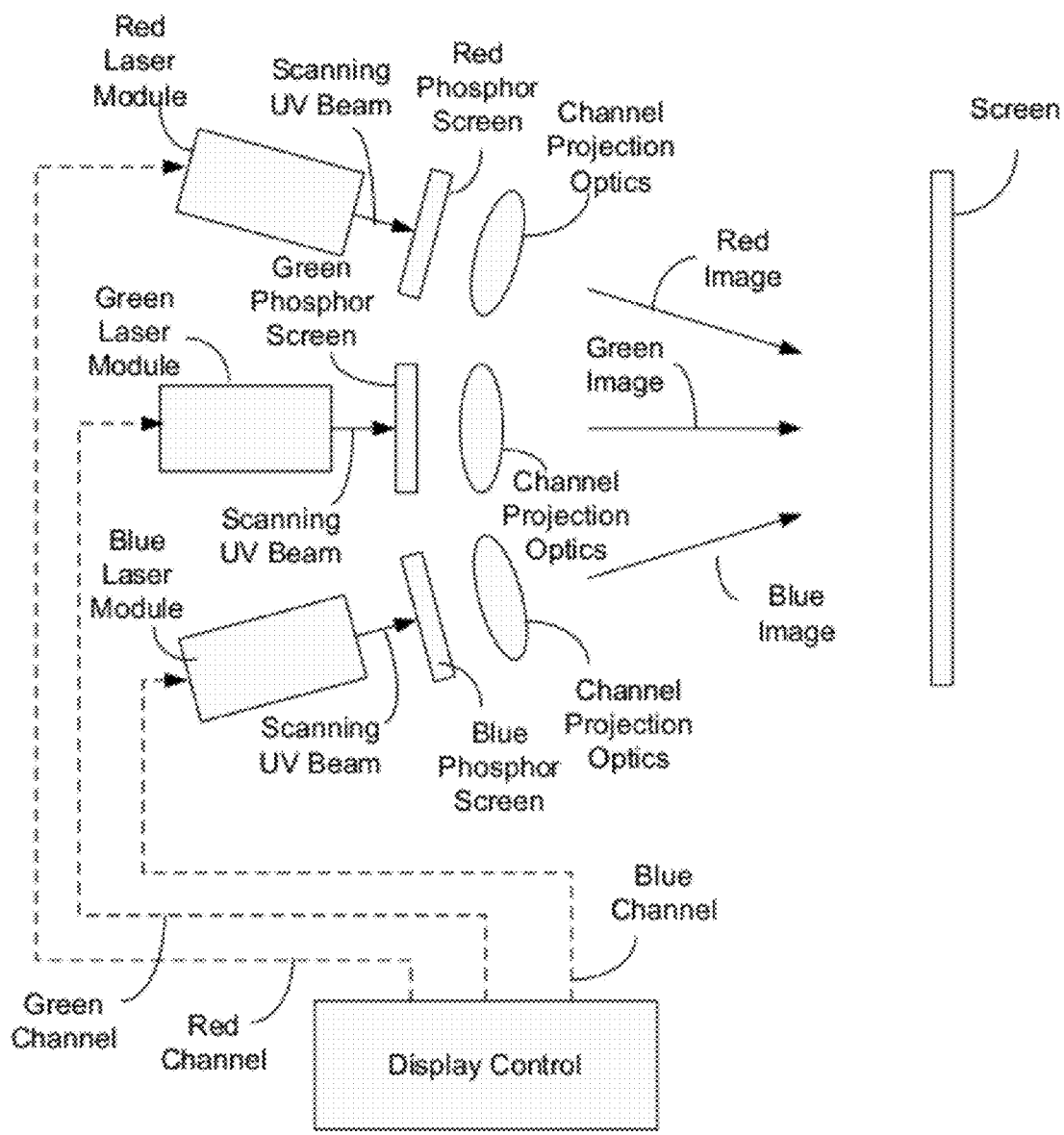
FIGS. 23, 24 and 25 show examples of laser display systems having three or more monochromatic projectors to project images of different colors on a common screen to produce a final color image via mixing of different colored images, where at least one monochromatic projector is based on the laser display system in FIG. 1 or 2 to create the monochromatic image from a projection screen with phosphor stripes.

FIG. 23 shows one example of a color laser projector based on the above design. Red, green, and blue monochromatic display modules are arranged to project red, green, and blue monochromatic images onto and overlap at a common display screen to produce the final color images. As illustrated, the optic axes of the red, green, and blue monochromatic display modules are arranged relative to one another to converge to the common display screen. Each monochromatic display module includes a laser module producing the UV laser beam, modulating the UV laser beam, and scanning the modulated UV laser beam on the corresponding monochromatic phosphor screen to produce images for that color channel. The designs in FIGS. 1 and 20A may be used. A channel projection optical module may be used to image of the monochromatic phosphor screen onto the common display screen. A display control is provided to produce the three color channel control signals to the three laser modules.

Figure 24:
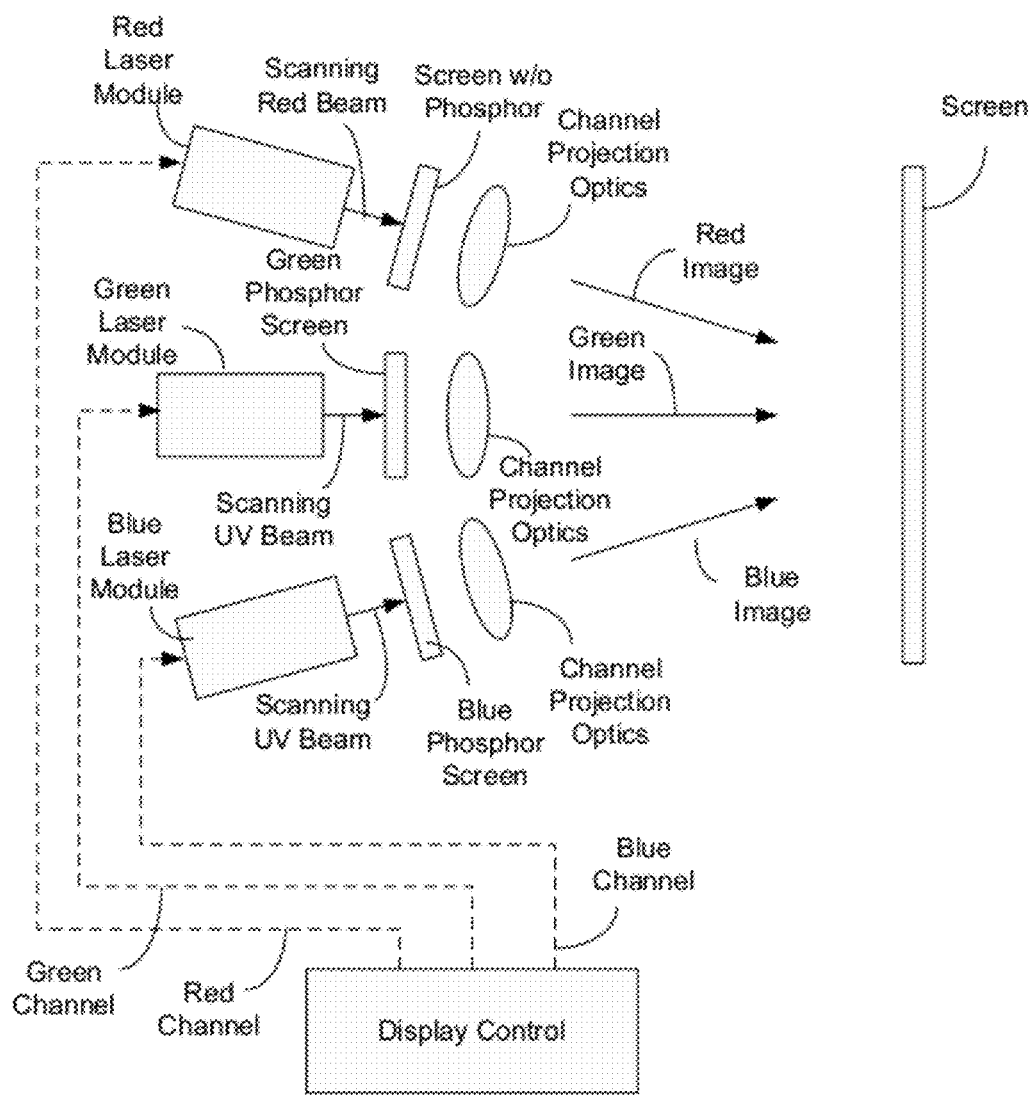

FIG. 24 shows another example of a color laser projector where only the green and blue monochromatic display modules are based on the scanning-laser display systems with screens having laser-excitable light-emitting materials. The red display module, however, produces a modulated red laser beam and directly scans the modulated laser beam on a screen without the phosphor material. Hence, the red laser module is different from the green and blue laser modules in this design. Similar to the blue and green channels, the red image on the screen in the red display module is projected via its projection optics to the common display screen for displaying the final images. Therefore, the color images on the common display screen are results of mixing phosphor-generated blue and green images with direct red laser images. This design addresses the current lack of powerful, reliable, efficient, compact, and low cost green and blue solid-state lasers.

Figure 25:
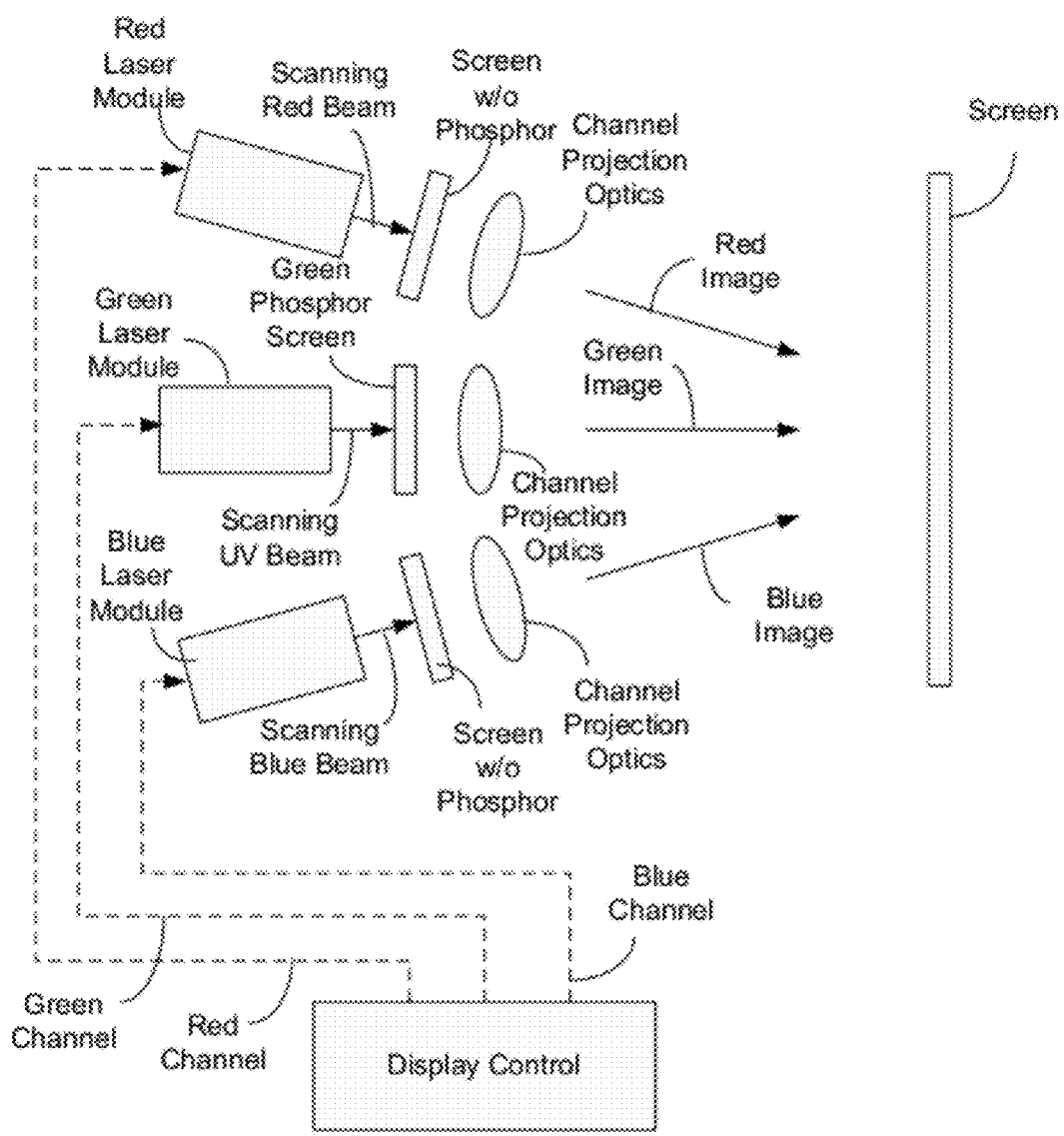

In general, the design of mixing phosphor-generated colors with direct laser colors can be applied to other color arrangements. FIG. 25 shows another example based on the same 3-gun design where both the red and the blue display modules directly scan modulated red and blue laser beams, respectively, on their corresponding projection screens without phosphors to produce red and blue images to be projected onto the final common display screens and the green display module uses the scanning UV laser design with phosphor-based monochromatic screens based on the designs in, e.g., FIGS. 1 and 20A.

Furthermore, a monochromatic laser display module in the above color mixing designs where three or more separate monochromatic laser display modules with different colors may directly project its scanning laser beam at a desired color to the common display screen for display the final images. Accordingly, each projection screen without the phosphor material in FIGS. 24 and 25 can be eliminated. On the common display screen, one or more monochromatic images projected from one or more phosphor projection screens are mixed with one or more monochromatic images directly formed by one or more scanning laser beams at different colors to produce the final images.

Figure 26A:
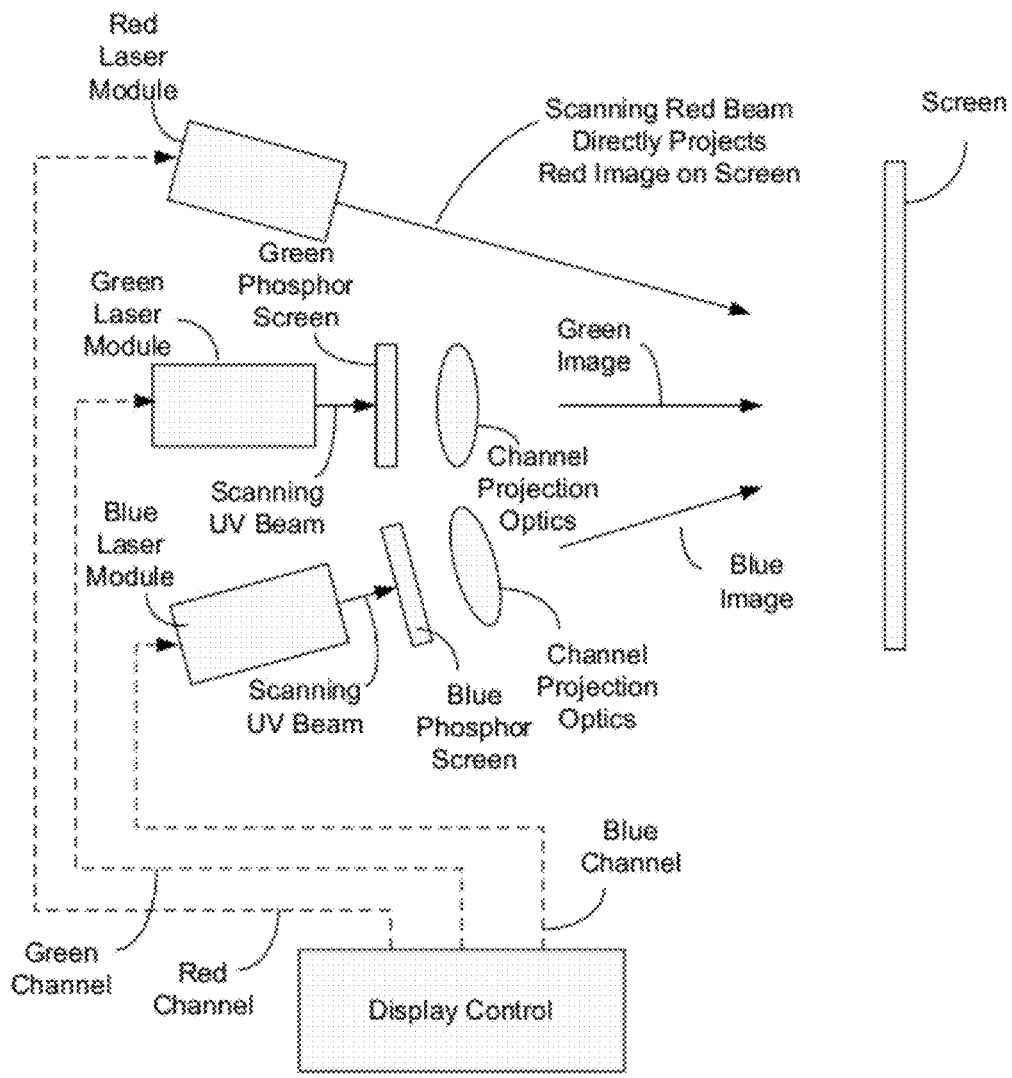
FIGS. 26a & 26b show 2 examples of laser displays that mix direct laser color with phosphor colors on a final display screen.
Figure 26B:
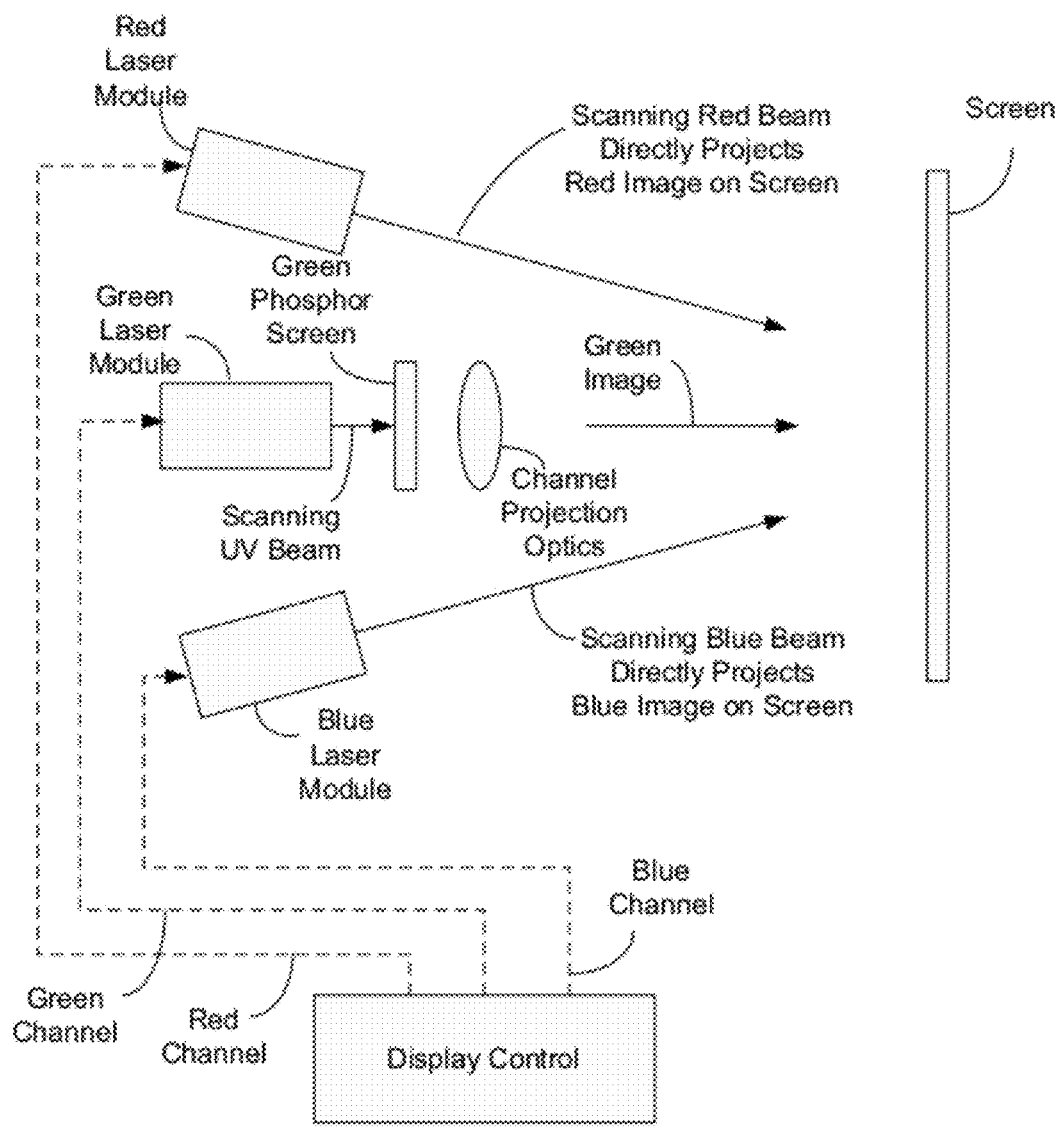

FIGS. 26A and 26B show two examples for this design by modifying the systems in FIGS. 24 and 25, respectively. In FIG. 26A, a red scanning laser beam is directly produced and projected by the red laser module on to the common screen on which the red image scanned out by the red laser is mixed with green and blue images projected from the green and blue phosphor projection screens to produce the final images. In FIG. 26B, a red scanning laser beam is directly produced and projected by the red laser module on to the common screen and a blue scanning laser beam is directly produced and projected by the blue laser module on to the common screen. The green image projected from the green phosphor projection screen is mixed with the direct-scanning laser red and blue images to produce the final images.

UV-excitable phosphors suitable of color or monochromatic screens described in this application may be implemented with various material compositions. Typically, such phosphors absorb excitation light such as UV light to emit photons in the visible range at wavelengths longer than the excitation light wavelength. For example, red, green, and blue fluorescent materials may be ZnCdS:Ag, ZnS:Cu, and ZnS:Ag, respectively.

TABLE 1 lists some examples of phosphors that emit visible color light when excited by excitation light in the wavelength range from 380 nm to 415 nm described in various published patent documents. Various phosphors listed in TABLE 1 can also be excited by light from 450 nm to 470 nm. These and other phosphors can be used to implement the phosphor-based laser displays described in this application.

TABLE 1

Examples of Phosphors

| Patent Publications # | Phosphor System(s) |
| --- | --- |
| WO 02/11173 A1 | MS: Eu; M = Ca, Sr, Ba, Mg, Zn |
|  | $M^*N^*_2S_4$: Eu, Ce; $M^*$ = Ca, Sr, Ba, Mg, Zn; $N^*$ = Al, Ga, In, Y, La, Gd |
| US6417019B1 | $(Sr_{1-u-v-x}Mg_uCa_vBa_x)(Ga_{2-y-z}Al_yIn_zS_4)$: $Eu^{2+}$ |
| US2002/0185965 | YAG: Gd, Ce, Pr, SrS, $SrGa_2S_4$ |
| WO 01/24229 A2 | CaS: $Eu^{2+}/Ce^{3+}$, SrS: $Eu^{2+}/Ce^{3+}$ |
|  | $SrGa_2S_4$: $Eu^{2+}/Ce^{3+}$ |

TABLE 1-continued

Examples of Phosphors

| Patent Publications # | Phosphor System(s) |
|---|---|
| US Application 20040263074 | $SrS:Eu^{2+}$; $CaS:Eu^{2+}$; $CaS:Eu^{2+}$, $Mn^{2+}$; $(Zn, Cd)S:Ag^+$; $Mg_4GeO_{5.5}F:Mn^{4+}$; $ZnS:Mn^{2+}$. |
| WO 00/33389 | $Ba_2MgSi_2O_7:Eu^{2+}$; $Ba_2SiO_4:Eu^{2+}$; $(Sr, Ca, Ba)(Al, Ga)_2S_4:Eu^{2+}$ |
| US20010050371 | $(Li, K, Na, Ag)Eu_{(1-x)}(Y, La, Gd)_x(W, Mo)_2O_8$; $Y_xGd_{3-x}Al_5O_{12}$: Ce |
| US6252254 B1 | $YBO_3:Ce^{3+}, Tb^{3+}$; $BaMgAl_{10}O_{17}:Eu^{2+}, Mn^{2+}$; $(Sr, Ca, Ba)(Al, Ga)_2S_4:Eu^{2+}$; $Y_3Al_5O_{12}:Ce^{3+}$ $Y_2O_2S:Eu^{3+}, Bi^{3+}$; $YVO_4:Eu^{3+}, Bi^{3+}$; $SrS:Eu^{2+}$; $SrY_2S_4:Eu^{2+}$; $CaLa_2S_4:Ce^{3+}$; $(CaSr)S:Eu^{2+}$ |
| US2002/0003233 | Y—Al—O; (Y, Ln)—Al—O; (Y, Ln)—(Al, Ga)—O $SrGa_2S_4$; SrS M—Si—N [Ce, Pr, Ho, Yb, Eu] |
| EP 1150361 A1 | $(Sr, Ca, Ba)S:Eu^{2+}$ ($SrS:Eu^{2+}$) |
| US 20020145685 | Display device using blue LED and red, green phosphors $SrS:Eu^{2+}$ and $SrGa_2S_4:Eu^{2+}$ |
| US 20050001225 | $(Li, Ca, Mg, Y)_xSi_{12-(m+n)}Al_{(m+n)}O_nN_{16-n}$: Ce, P, Eu, Tb, Yb, Er, Dy |
| U.S. Pat. No. 5,998,925 | (Y, Lu, Se, La, Gd, Sm) (Al, Ga)O: Ce |
| U.S. Pat. No. 6,765,237 | $BaMg_2Al_{16}O_{27}:Eu^{2+}$ (BAM) and $(Tb_{1-x-y}(Y, La, Gd, Sm)_x(Ce, Pr, Nd, Sm, Eu, Gd, Dy, Ho, Er, Tm, Yb, Lu)_y)_3(Al, Ga, In)_zO_{12}$ (TAG) |
| US Application 20040227465 | $Sr_xBa_yCa_zSiO_4:Eu^{2+}$, Ce, Mn, Ti, Pb, Sn |
| US Application 20050023962 | $ZnSe(x) S (1-x)$: (Cu, Ag, Al, Ce, Tb, Cl, I, Mg, Mn) |
| US Application 20050023963 | (Be, Mg, Ca, Sr, Ba, Zn) (Al, Ga, In, Y, La, and Gd)$_2$ $(S_xSe_y)_4$: Eu, Ce, Cu, Ag, Al, Tb, Cl, Br, F, I, Mg, Pr, K, Na, Mn |

The examples of phosphors described in the published PCT application No. WO 02/11173 A1 are "Type I" phosphors with compositions of Eu-doped photoluminescent metal sulfides in form of MS:Eu where M is at least one of Ca, Sr, Ba, Mg and Zn, and "Type II" phosphors with compositions of metal thiometallate photoluminescent materials in form of $M^*N^*_2S_4$:Eu, Ce where $M^*$ is at least one of Ca, Sr, Ba, Mg and Zn, and $N^*$ is at least one of Al, Ga, In, Y, La and Gd. A photoluminescent metal sulfide MS (Type I phosphor) may include at least one of Ba, Mg, and Zn alone or in combination with at least one of Sr and Ca. A metal thiometallate photoluminescent material $M^*N^*_2S_4$ (type II phosphor) may include at least one element selected from the group $M^*$=Mg and Zn alone for $M^*$ or in combination with at least one of Ba, Sr and Ca and the element $N^*$ may be Al or Ga alone or in further combination with In, Y, La, Gd. A metal thiometallate photoluminescent material may be activated with at least one of europium (Eu) and cerium (Ce). Two or more of type I and type II phosphors may be combined, or one or more phosphors of type I and type II phosphors may be combined with other phosphors different from phosphors of type I and type II to form a phosphor blend to generate a color that may not be available from individual type I and type II phosphors.

Specific examples of the phosphor compositions for the type I phosphors for emitting red colors include $(Sr_{1-x-y}M_x$-$Eu_y)S$ with M is at least one of Ba, Mg, Zn alone or in combination with Ca and $0<x\leqq=0.5$ and $0<y\leqq=0.10$, $(Sr_{1-x-y}Ba_xEu_y)$ S with $x\leqq0.25$, $(Sr_{1-x-z-y}Ca_xBa_zEu_y)S$ with $x+y+z\leqq=0.35$ which exhibit a high quantum efficiency of 65-80%, high absorbance in the range from 370 nm to 470 nm of 60-80% and low loss, below 10%, of the luminescent lumen output from room temperature to 100° C. due to thermal quenching. Specific examples of type II phosphor compositions are $M^*N^*_2S_4$:Eu, Ce (type II phosphor) where $M^*$ is at least one of $M^*$=Mg, Zn alone or together with at least one of Ba, Sr, Ca, and $N^*$ is at least one of $N^*$=Al, Ga, alone or together with small amounts (below 20%) of In, Y, La, Gd. Such type II phosphors emit light in the blue, green or green-yellow spectral range of the visible spectrum. Specific compositions for the type II phosphors include $(M^{**}_{1-u}Mg_u)(Ga_{1-v}N^*_v)_2S_4$:Ce with $u\leqq0.75$ and $v\leqq0.10$, and $M^{}$ is at least one of $M^{}$=Ba, Sr, Ca, Zn, $(M^{**}_{1-s-t}Eu_sCe_t)(Ga_{1-v}N^*_v)_2S_4$ with $M^{**}$ is at least one of =Mg, Zn alone or in combination with Sr, Ba, Ca, and $N^*$=Al, In, Y, La, Gd and $0<s\leqq=0.10$ and $0\leqq t:s<0.2$ with $v\leqq0.10$, $((Ba_{1-u}Mg_u)_{1-s-t}Eu_sCe_t)(Ga_{1-v}N^*_v)_2S_4$ with $u\leqq0.75$ and $v\leqq0.10$ and $0<s\leqq0.10$ and $0s\leqq t:s<0.2$, $(((Ba_{1-w}Ca_w)_{1-u}Mg_u)_{1-s-t}Eu_sCe_t)(Ga_{1-v}N^*_v)_2S_4$ with $u<0.75$ and $w\geqq0.10$ and $v<0.10$ and $0<s\leqq0.10$ and $0\leqq t:s<0.2$, $(((Ba_{1-r}Sr_r)_{1-u}Mg_u)_{1-s-t}Eu_sCe_t)(Ga_{1-v}N^*_v)_2S_4$ with $u<0.75$ and $r\geqq0.10$ and $v\leqq0.10$ and $0<s\leqq0.10$ and $0\leqq t:s<0.2$, $(((Sr_{1-w}Ca_w)_{1-u}Mg_u)_{1-s-t}Eu_sCe_t)(Ga_{1-v}N^*_v)_2S_4$ with $u\leqq0.75$ and $w\geqq0.10$ and $v\leqq0.10$ and $0<s\leqq0.10$ and $t:s<0.2$, and $(((Sr_{1-p}Zn_p)_{1-u}Mg_u)_{1-s-t}Eu_sCe_t)(Ga_{1-v}N^*_v)_2S_4$ with $u<0.75$ and $p\leqq0.35$ and $v\leqq0.10$ and $0<s\leqq0.10$ and $0\leqq t:s<0.2$.

The examples of phosphors described in U.S. Pat. No. 6,417,019 include $(Sr_{1-u-v-x}Mg_uCa_vBa_x)(Ga_{2-y-z}AlIn_zS_4)$:$Eu^{2+}$, $(Sr_{1-u-v-x}Mg_uCa_vBa_x)(Ga_{2-y-z}Al_yIn_zS_4)$:$Eu^{2+}$. The phosphor particles may be dispersed in a host material which is selected from, for example, materials including but not limited to epoxies, acrylic polymers, polycarbonates, silicone polymers, optical glasses, and chalcogenide glasses. Alternatively, such phosphors may be deposited on substrate surfaces as phosphor films.

The examples of phosphors described in U.S. Patent Application Publication No. 2002/0185965 include the phosphor powder mixed with the conventional curable silicone composition is a powder of $(Y,Gd)_3Al_5O_{12}$:Ce (gadolinium and cerium doped yttrium aluminum garnet) particles available as product number QUMK58/F from Phosphor Technology Ltd., Nazeing, Essex, England. Particles of this phosphor material have a typical diameter of about 5 microns (μm), range from 1 to 10 μm, absorb light of wavelengths from about 430 nm to about 490 nm, and emit light in a broad band from about 510 nm to about 610 nm. The color of light emitted by an LED having a stenciled phosphor layer is determined, in part, by the concentration of phosphor particles in the luminescent stenciling composition. The phosphor particles may be mixed with the curable silicone polymer composition at concentrations ranging from about 20 grams of phosphor particles per 100 grams of silicone polymer composition to about 120 grams of phosphor particles per 100 grams of silicone polymer composition. In some implementations, the titanium dioxide particles may also be used as additives and dispersed in the silicone polymer composition at a concentration of about 1.5 grams of titanium dioxide per 100 grams of silicone polymer composition to about 5.0 grams of titanium dioxide per 100 grams of silicone polymer composition. The titanium dioxide particles, which are approximately the same size as the phosphor particles, increase the scattering of excitation light and thus increase the absorption of that light by the phosphor particles. Next, after the phosphor particles and optional titanium dioxide particles are mixed with the curable silicone composition, finely divided silica particles are dispersed in the mixture to form a thixotropic gel. A thixotropic gel exhibits thixotropy, i.e., an apparent drop in viscosity when subjected to shear and a return to the original viscosity level when the shear force is removed. Consequently, a thixotropic gel behaves as a fluid when shaken, stirred, or otherwise disturbed and sets again to a gel when allowed to stand. The silica particles may be, e.g., particles of fumed silica, a colloidal form of silica made by combustion of chlorosilanes in a hydrogen-oxygen furnace. Fumed silica is chemically and physically stable at temperatures exceeding 120° C., transparent to visible light, and will impart satisfactory thixotropic properties to the luminescent stenciling composition at comparatively low concentrations. The grade of fumed silica used is chosen to be compatible with non-polar materials. In one implementation, the fumed silica is M-5P grade CAB-O-SIL®. untreated amorphous fumed silica obtained from Cabot Corporation of Boston, Mass. This grade of fumed silica is hydrophobic and has an average surface area per unit mass of $200\pm15$ m$^2$/g. The M-5P grade fumed silica particles are dispersed in the mixture of phosphor particles and silicone polymer composition with a conventional three roll mill at concentrations of about 1.5 grams of fumed silica per 100 grams of silicone polymer composition to about 4.5 grams of fumed silica per 100 grams of silicone polymer composition. As the concentration of fumed silica is increased, the stenciling composition becomes more thixotropic, i.e., more solid-like as an undisturbed gel.

Other implementations use fumed silica having a surface area per unit mass either greater than or less than $200\pm15$ m$^2$/g. For fixed concentrations of fumed silica, stenciling compositions become more thixotropic as the surface area per unit mass of the fumed silica is increased. Thus, fumed silicas having lower surface area per unit mass must be used at higher concentrations. The required high concentrations of low surface area per unit mass fumed silicas can result in stenciling compositions having viscosities that are too high to be easily stenciled. Consequently, the fumed silica preferably has a surface area per unit mass greater than about 90 m$^2$/g. In contrast, as the surface area per unit mass of the fumed silica is increased, the required concentration of fumed silica decreases, but the fumed silica becomes more difficult to disperse in the silicone polymer composition.

The examples of phosphors described in the PCT Patent Application Publication No. WO 01/24229 include host materials and dopant ions. The host material may have an inorganic, ionic lattice structure (a "host lattice") in which the dopant ion replaces a lattice ion. The dopant is capable of emitting light upon absorbing excitation radiation. Suitable dopants strongly absorb excitation radiation and efficiently convert this energy into emitted radiation. As an example, the dopant may be a rare earth ion which absorbs and emits radiation via 4f-4f transitions, i.e. electronic transitions involving f-orbital energy levels. While f-f transitions are quantum-mechanically forbidden, resulting in weak emission intensities, it is known that certain rare earth ions, such as $Eu^{2+}$ or $Ce^{3+}$, strongly absorb radiation through allowed 4f-5df transitions (via d-orbital/f-orbital mixing) and consequently produce high emission intensities. The emissions of certain dopants can be shifted in energy depending on the host lattice in which the dopant ion resides. Certain rare earth dopants efficiently convert blue light to visible light when incorporated into an appropriate host material. In some implementations, the first and second phosphors comprise a host sulfide material, i.e. a lattice which includes sulfide ions. Examples of suitable host sulfide materials include CaS, SrS and a thiogallates such as $SrGa_2S_4$. A phosphor mixture may be formed by different rare earth ions that are excitable by one common blue energy source of a relatively narrow linewidth to emit light at two different energy ranges (e.g. red and green). As an example for such a phosphor mixture, the dopant is the same in the first and second phosphors with different host materials. The red and green emissions of the two phosphors can be tuned by selecting an appropriate host material. In one embodiment, the green phosphor is $SrGa_2S_4$:Eu. In another embodiment, the red phosphor is selected from the group consisting of SrS:Eu and CaS:Eu.

The examples of phosphors described in U.S. Patent Application Publication No. 2004/0263074 include particles which are characterized as being capable of down-conversion, that is, after being stimulated (excitation) by relatively shorter wavelength light, they produce longer wavelength light (emission). The phosphor composition comprises at least one, typically at least two (or three, or four) types of phosphor particles, which each have their own emission characteristics. In an embodiment having at least two different types of phosphor particles, the first type of phosphor particle emits red light upon excitation, and the second type of phosphor particle emits green light upon excitation. For red emission, typical phosphor particles suitable for use in the phosphor composition may comprise a material selected from SrS: $Eu^{2+}$; CaS:$Eu^{2+}$; CaS:$Eu^{2+}$,$Mn^{2+}$; (Zn, Cd)S:$Ag^+$; $Mg_4GeO_{5.5}F$:$Mn^{4+}$; $Y_2O_2S$:$Eu^{2+}$, ZnS:$Mn^{2+}$, and other phosphor materials having emission spectra in the red region of the visible spectrum upon excitation. For green emission, typical phosphor particles suitable for use in the phosphor composition may comprise a material selected from $SrGa_2S_4$:$Eu^{2+}$; ZnS:Cu,Al and other phosphor materials having emission spectra in the green region of the visible spectrum upon excitation. In some implementations, blue emitting phosphor particles may be included in the phosphor composition in addition to the red- and green-emitting phosphors; suitable blue emitting phosphor particles may comprise, e.g. $BaMg_2Al_{16}O_{27}$:$Eu^{2+}$,Mg or other phosphor materials having emission spectra in the blue region of the visible spectrum upon excitation. In other implementations, the phosphor composition may comprise a type of phosphor particles that is selected to produce yellow light upon excitation. For yellow emission, phosphor particles suitable for use in the phosphor composition may include a material selected from $(Y,Gd)_3Al_5O_{12}:Ce,Pr$ and other phosphor materials having emission spectra in the yellow region of the visible spectrum upon excitation.

Some suitable red-emitting phosphor particles may have a peak emission wavelength in the range of about 590 nm to about 650 nm. In particular embodiments, the phosphor particles have a peak emission wavelength in the range of about 620 nm to about 650 nm, typically in the range of about 625 nm to about 645 nm, more typically in the range of about 630 nm to about 640 nm. In other embodiments, the phosphor particles have a peak emission wavelength in the range of about 590 nm to about 625 nm, typically in the range of about 600 nm to about 620 nm. In yet other embodiments, the phosphor particles may emit light having a wavelength in the range of about 600 nm to about 650 nm, typically in the range of about 610 nm to about 640 nm, more typically in the range of about 610 nm to about 630 nm.

Some suitable green-emitting phosphor particles may have a peak emission wavelength in the range of about 520 nm to about 550 nm. In particular embodiments, the phosphor particles have a peak emission wavelength in the range of about 530 nm to about 550 nm, typically in the range of about 535 nm to about 545 nm. In other embodiments, the phosphor particles have a peak emission wavelength in the range of about 520 nm to about 535 nm. In yet other embodiments, the phosphor particles emit light having a wavelength in the range of about 520 nm to about 550 nm, typically in the range of about 535 nm to about 550 nm, or in the range of about 520 nm to about 535 nm.

Some suitable blue-emitting phosphor particles typically have a peak emission wavelength in the range of about 440 nm to about 490 nm. In particular embodiments, the phosphor particles have a peak emission wavelength in the range of about 450 nm to about 470 nm, typically in the range of about 455 nm to about 465 nm. In other embodiments, the phosphor particles have a peak emission wavelength in the range of about 440 nm to about 450 nm, typically in the range of about 435 nm to about 445 nm. In yet other embodiments, the phosphor particles emit light having a wavelength in the range of about 440 nm to about 480 nm, typically in the range of about 450 nm to about 470 nm.

Some suitable yellow-emitting phosphor particles typically have a peak emission wavelength in the range of about 560 nm to about 580 nm. In particular embodiments, the phosphor particles have a peak emission wavelength in the range of about 565 nm to about 575 nm. In other embodiments, the phosphor particles have a peak emission wavelength in the range of about 575 nm to about 585 nm. In yet other embodiments, the phosphor particles emit light having a wavelength in the range of about 560 nm to about 580 nm, typically in the range of about 565 nm to about 575 nm.

The exact wavelength range for each of the above described type of phosphor particles may be determined by selection from available sources of phosphors, desired color attributes of the light emitting device (e.g. the 'correlated color temperature' of the emitted white light), choice of the excitation light such as the excitation wavelength, and the like. Useful phosphor materials and other information may be found in Mueller-Mach et al., "High Power Phosphor-Converted Light Emitting Diodes Based on III-Nitrides", IEEE J. Sel. Top. Quant. Elec. 8(2):339 (2002).

The examples of phosphors described in the published PCT Application No. PCT/US99/28279 include $Ba_2MgSi_2O_7:EU^{2+}$; $Ba_2SiO_4:Eu^{2+}$; and $(Sr, Ca,Ba)(Al,Ga)_2S_4:EU^{2+}$, where the element following the colon represents an activator. The notation (A,B,C) signifies $(A_x, B_y, C_z)$ where $0 \leq x \leq 1$ and $0 \leq y \leq 1$ and $0 \leq z \leq 1$ and $x+y+z=1$. For example, (Sr,Ca,Ba) signifies $(Sr_x,Ca_y,Ba_z)$ where $0 \leq x \leq 1$ and $0 \leq y \leq 1$ and $0 \leq z \leq 1$ and $x+y+z=1$. Typically, x, y, and z are all nonzero. The notation (A,B) signifies $(A_x, B_y)$ where $0 \leq x \leq 1$ and $0 \leq y \leq 1$ $x+y=1$. Typically, x and y are both nonzero. Examples of green emitting phosphors may have peak emissions between about 500 nm and about 555 nm. For example, $Ba_2MgSi_2O_7:Eu^{2+}$ has a peak emission at about 495-505 nm, typically about 500 nm, $Ba_2SiO_4:Eu2+$ has a peak emission at about 500-510 nm, typically about 505 nm, and $(Sr,Ca,Ba)(Al,Ga)_2S_4:Eu^{2+}$ has a peak emission at about 535-545 nm, typically about 540 nm.

The examples of phosphors described in U.S. Patent Application Publication No. 2001/0050371 include fluorescent materials that include a CaS phosphor activated by Eu, phosphors represented by $AEu_{(1-x)}Ln_xB_2O_8$ where A is an element selected from the group consisting of Li, K, Na and Ag; Ln is an element selected from the group consisting of Y, La and Gd; and B is W or Mo; and x is number equal to or larger than 0, but smaller than 1. A CaS phosphor activated by Eu or a phorsphor of $AEu_{(1-x)}Ln_xB_2O_8$ may be mixed with a base polymer to form a transparent resin. As an example, a red phosphor that emits red light may be CaS activated by Eu or a compound expressed by a general formula $AEu_{(1-x)}Ln_xB_2O_8$. CaS activated by Eu is excited by light of 420 to 600 nm and emits light of 570 to 690 nm which peaks at 630 nm. $AEu_{(1-x)}Ln_xB_2O_8$ is a phosphor which emits light near 614 nm by $^5D_0 \rightarrow ^7F_2$ transition of $Eu^{3+}$ ions. Although an excitation wavelength and an emission wavelength differ depending on the kinds of elements A and B of the phosphor, the red phosphors can be excited by light near 470 nm (blue) and or 540 nm (green) and can emit light near 620 nm (red). When x is zero, the phosphor $AEuB_2O_8$ is formed and exhibits the highest emission intensity near 615 nm (red). $AEu_{(1-x)}Ln_xB_2O_8$ (A=Li, K, Na, Ag; Ln=Y, La, Gd; B=W, Mo) may be obtained by mixing oxides, carbonate and the like of elements which constitute the phosphor at a desired stoichiometric ratio. In addition to the above red phosphors, a yttrium aluminate phosphor (so-called YAG) can be a stable oxide having a garnet structure in which Y-atoms of $Y_3Al_5O_{12}$ are substituted by Gd at part of their positions, particularly a phosphor which is excited by blue light (400 to 530 nm) to emit light of yellow to green region centering 550 nm. Activating elements to be added to the yttrium aluminate phosphor include, for example, cerium, europium, manganese, samarium, terbium, tin, chromium, etc. For example, $Y_xGd_{3-x}Al_5O_{12}$ activated by Ce may be used. In implementations, one, two or more kinds of such YAG phosphors may be mixed together to form a desired phosphor material.

The examples of phosphors described in U.S. Pat. No. 6,252,254 include $YBO_3:Ce^{3+},Tb^{3+}$; $BaMgAl_{10}O_{17}:Eu^{2+}, Mn^{2+}$; $(Sr, Ca,Ba)(Al,Ga)_2S_4:Eu^{2+}$; and $Y_3Al_5O_{12}:Ce^{3+}$; and at least one of: $Y_2O_2S:Eu^{3+},Bi^{3+}$; $YVO_4:Eu^{3+},Bi^{3+}$; $SrS:Eu^{2+}$; $SrY_2S_4:Eu^{2+}$; $SrS:Eu^{2+},Ce^{3+}, K^+$; $(Ca,Sr)S:Eu^{2+}$; and $CaLa_2S_4:Ce^{3+}$, where the element following the colon represents an activator. As an example, the $SrS:Eu^{2+},Ce^{3+},K^+$ phosphor, when excited by blue light, emits a broadband spectrum including red light and green light. These phosphor compositions can be used to produce white light with pleasing characteristics, such as a color temperature of 3000-4100° K, a color rendering index of greater than 70, typically greater than 80, for example about 83-87, and a device luminous efficacy of about 10-20 lumens per watt of input electric power when blue LED is used as the excitation source.

The examples of phosphors described in U.S. Patent Application Publication No. 2002/0003233 include a single crystal Cerium-doped Yttrium-Aluminum-Garnet ($Y_3Al_5O_{12}:Ce^{3+}$) compound as a yellowish-light-emitting phosphor. Yttrium-Aluminum-Oxides which do not have garnet structures, such as monoklinic YalO and YalO-perovskite, may also be used as the host materials for the phosphors. Several lanthanides (Ln) may partly replace the Yttrium, such as in (Y,Ln)AlO, (Y,Ln)(Al,Ga)O. The lanthanide may be, for example Lutethium (Lu). These host materials may be doped with single dopants such as Cerium (Ce), Praseodymium (Pr), Holmium (Ho), Ytterbium (Yb), and Europium (Eu), or with double dopants such as (Ce,Pr), (Ce, Ho), and (Eu,Pr) to form various phosphors. $Y_3Al_5O_{12}:Ho^{3+}$, and $Y_3Al_5O_{12}:Pr^{3+}$ are examples of single crystal phosphor materials. In one embodiment, a phosphor listed above emits yellowish light by absorbing either bluish light or ultraviolet light having a wavelength that is shorter than or equal to about 460 nm. In one example, a YAG substrate doped with 4 mol % Cerium ($Ce^{3+}$) can absorb light having a wavelength of about 410-460 nm and emit yellowish light having a peak wavelength of about 550-570 μm. any. Part of the Yttrium in YAG may be substituted by a lanthanide element such as Gadolinium (Gd). For example, a phosphor may be $(Y_{0.75}Gd_{0.25})$ AG:Ce.

The examples of phosphors described in European Patent Application No. 1,150,361 include a resin comprising a phosphor selected from the phosphor family chemically identified as $(Sr, Ca, Ba)S:Eu^{2+}$. One phosphor selected from this family is strontium sulfide doped with europium, which is chemically defined as $SrS:Eu^{2+}$ and has a peak emission at 610 nm. Rather than using phosphor-converting resins, dyes or epoxies, other types of phosphor converting elements may also be used, including phosphor-converting thin films, phosphor-converting substrates, or various combinations of these elements.

The examples of phosphors described in U.S. Patent Application Publication No. 2002/0145685 include a red phosphor $SrS:Eu^{2+}$and a green phosphor $SrGa_2S_4:Eu^{2+}$. These phosphors are excitable by the 460 nm blue light.

The examples of phosphors described in U.S. Patent Application Publication No. 2005/0001225 include rare-earth element doped oxide nitride phosphor or cerium ion doped lanthanum silicon nitride phosphor. A rare-earth element doped oxide nitride in the following examples is a crystalline material, not including a glass material such as oxynitride glass. However, it may include a small amount of glass phase (e.g., less than 5%). A cerium ion doped lanthanum silicon nitride in the following examples is a crystalline material, not including a glass material.

One example of a first phosphor is single-phase α-sialon phosphor that is represented by: $Me_xSi_{12-(m+n)}Al_{(m+n)}OnN_{16-n}$: $Re1_yRe2$. Part or all of metal (Me) (Me is one or more of Li, Ca, Mg, Y and lanthanide metals except for La and Ce) dissolved into the α-sialon is replaced by lanthanide metal (Re1) (Re1 is one or more of Ce, Pr, Eu, Tb, Yb and Er) as luminescence center or lanthanide metal (Re1) and lanthanide metal (Re2) (Re2 is Dy) co-activator. In this case, Me may be one or more of Ca, Y and lanthanide metals except for La and Ce. In some implementations, Me may be Ca or Nd. The lanthanide metal (Re1) used for replacing may be Ce, Eu or Yb. In case of using two kinds of metals for replacing, for example, a combination of Eu and Er may be used. In case of using three kinds of metals for replacing, for example, a combination of Eu, Er and Yb may be used.

Also, the metal (Me) may be replaced by lanthanide metal Re1 and lanthanide metal Re2 as co-activator. The lanthanide metal Re2 is dysprosium (Dy). In this case, the lanthanide metal Re1 may be Eu. Meanwhile, if part or all of metal (Me) replaced by one or more of Ce, Pr, Eu, Tb. Yb and Er (lanthanide metal (Re1)), or one or more of Ce, Pr, Eu, Tb, Yb and Er (lanthanide metal (Me) (Re1)) and Dy (lanthanide metal (Re2)), then the metal is not necessarily added and may be replaced by another metal.

A-sialon (α-sialon) has a higher nitrogen content than oxynitride glass and is represented by: $N_xSi_{12-(m-n)}Al_{(m+n-)}O_nN_{16-n}$ where x is a value obtained dividing (m) by a valence of metal (M). Meanwhile, oxynitride glass is as described in prior art 3, such a phosphor that serves to shift the position of excitation/emission peak of conventional oxide system phosphors to the longer wavelength side by replacing oxygen atom surrounding the rare-metal element as luminescence center by nitrogen atom to relax the influence of surrounding atoms to electron of rare-metal element, and that has an excitation spectrum extending until visible region ($\leq 500$ μm).

Also, in the single-phase α-sialon phosphor, the metal (Me) is dissolved in the range of, at the minimum, one per three unit cells of α-sialon including four mass weights of $(Si, Al)_3(N,O)_4$ to, at the maximum, one per one unit cell thereof. The solid solubility limit is generally, in case of bivalent metal (Me), $0.6<m<3.0$ and $0\leq n<1.5$ in the above formula and, in case of trivalent metal (Me), $0.9<m<4.5$ and $0\leq n<1.5$. It is estimated that, in a region except for those regions, single-phase α-sialon phosphor is not obtained.

The interionic distance of lanthanide metal Re1 as luminescence center to replace part or all of metal (Me) and to serve as activator is about 5 angstroms at the minimum. It is significantly greater than 3 to 4 angstroms in phosphor known thus far. Therefore, it can prevent a significant reduction in emission intensity due to concentration quenching generated when a high concentration of lanthanide metal as luminescence center is included in matrix material.

Further in the single-phase α-sialon phosphor, the metal (Me) is replaced by lanthanide metal (Re2) as α-activator as well as lanthanide metal (Re1) as luminescence center. It is assumed that lanthanide metal (Re2) has two co-activation effects. One is sensitizer function and the other is to newly generate a carrier trap level to develop or improve the long persistence or to improve the thermal luminescence. Since the lanthanide metal Re2 is co-activator, it is suitable that the replacement amount thereof is generally $0.0\leq z<0.1$ in the earlier formula.

The single-phase α-sialon phosphor has α-sialon as a matrix material, and is essentially different in composition and crystal structure from a phosphor having β-sialon as matrix material.

Namely, β-sialon is represented by: $Si_{6-z}Al_zO_zN_{8-z}$ ($0<z<0.2$), and it is solid solution of β-type silicon nitride where part of Si sites is replaced by Al and part of N sites is replaced by O. In contrast, α-sialon is represented by: $Me_xSi_{12-(m+n)}Al_{(m+n)}O_nN_{16-n}$, and it is a solid solution of α-type silicon nitride, where part of Si—N bonds is replaced by Al—N bond and a specific metal (Me) (Me is one or more of Li, Ca, Mg, Y and lanthanide metals except for La and Ce) invades between lattices and is dissolved therein. Thus, both are different in state of solid solution and, therefore, the β-sialon has a high oxygen content and the α-sialon has a high nitrogen content. So, if a phosphor is synthesized using β-sialon as matrix material and adding one or more of rare-earth oxides of Ce, Pr, Eu, Tb, Yb and Er as luminescence center, it becomes a mixed material that has a compound including a rare-earth metal between β-sialon particles since the β-sialon does not dissolve metal.

In contrast, if α-sialon is used as matrix material, the metal (Me) (Me is one or more of Li, Ca, Mg, Y and lanthanide metals except for La and Ce) is taken and dissolved in the crystal structure and the metal (Me) is replaced by rare-earth metal, Ce, Pr, Eu, Tb, Yb and Er as luminescence center.

Therefore, the oxide nitride phosphor composed of single-phase α-sialon structure can be obtained.

Accordingly, the composition and crystal structure of phosphor drastically changes by whether to use β-sialon or α-sialon as matrix material. This is reflected in emission characteristics of phosphor.

In case of using β-sialon as matrix material, for example, a phosphor that is synthesized adding Er oxide to β-sialon radiates a blue luminescent light (410-440 nm). In α-sialon, as described later, rare-earth element doped oxide nitride phosphor radiates orange to red light (570-590 nm) due to the activation of Er. Viewing from this phenomenon it is assumed that Er is taken in the crystal structure of α-sialon and, thereby, Er is influenced by nitrogen atom composing the crystal and, therefore, the elongation of light source wavelength, which is very difficult to realize in phosphor with oxide as matrix material, can be easily generated.

In case of using α-sialon as matrix material, the rare-earth element doped oxide nitride phosphor also has the advantages of matrix material, α-sialon. Namely, α-sialon has excellent thermal and mechanical properties and can prevent the thermal relaxation phenomenon that causes a loss in excitation energy. Therefore, in the rare-earth element doped oxide nitride phosphor, a ratio of reduction in emission intensity according to rise of temperature becomes small. Thus, the temperature range available can be broadened as compared to the conventional phosphor.

Furthermore, α-sialon has an excellent chemical stability. Therefore, the phosphor has an excellent heat resistance. The rare-earth element doped oxide nitride phosphor can be excited by ultraviolet rays to X-rays further electron beam, according to O/N ratio in its composition, selection of lanthanide metal Re1 to replace metal (Me), and existence of lanthanide metal Re2 as α-activator.

Especially, of rare-earth element doped oxide nitride phosphor, in $Me_xSi_{9.75}Al_{2.25}O_{0.75}N_{15.25}:Re1_yRe2_z$ (m=1.5, n=0.75), one that satisfies 0.3<x+y<0.75 and 0.01<y+z<0.7 (where y>0.01, $0.0 \leq z<0.1$) or 0.3<x+y+z<1.5, 0.01<y<0.7 and $0.0 \leq z<0.1$, and metal (Me) is Ca offers an excellent emission characteristic and can have great potential in applications not only as ultraviolet-visible light excitation phosphor but also as electron beam excitation phosphor.

Different from the above first phosphor, an example of a second phosphor is a rare-earth element doped oxide nitride phosphor that contains α-sialon as main component (hereinafter referred to as mixture α-sialon phosphor). This second phosphor includes α-sialon, which dissolves a rare-earth element allowing an increase in brightness of a white LED using blue LED chip as light source, β-sialon, and unreacted silicon nitride. As the result of researching a composition with high emission efficiency, a mixture material with a property equal to single-phase α-sialon phosphor is found that is composed of α-sialon that part of Ca site in α-sialon stabilized by Ca is replaced by one or more of rare-earth metal (M) (where M is Ce, Pr, Eu, Tb, Yb or Er), β-sialon and unreacted silicon nitride. In some implementations, M is preferably Ce, Eu or Yb and further preferably Ce or Eu.

The mixture α-sialon phosphor can be produced adding less rare-earth element than the single-phase α-sialon phosphor. Thus, the material cost can be reduced. Further, since the mixture α-sialon phosphor also has α-sialon as matrix material like the single-phase α-sialon phosphor, it can have the advantages of matrix material α-sialon, i.e. good chemical, mechanical and thermal properties. Thus, it offers a stable and long-lifetime phosphor material. Due to these properties, it can suppress thermal relaxation phenomenon causing a loss in excitation energy. Therefore, in α-sialon with dissolved rare-earth element as well as Ca in this embodiment, a ratio of reduction in emission intensity according to rise of temperature becomes small. Thus, the temperature range available can be broadened as compared to the conventional phosphor.

Furthermore, the mixture α-sialon phosphor can be excited by ultraviolet rays to X-rays further electron beam, according to O/N ratio in its composition and selection of metal (M).

The mixture α-sialon phosphor offers a material that has an emission property equal to the single-phase α-sialon phosphor even when reducing the amount of rare-earth metal added. In order to stabilize the α-sialon structure, it is necessary to dissolve more than a certain amount of element. When amounts of Ca and trivalent metal dissolved are given x and y, respectively, a value of (x+y) is needed to be greater than 0.3 in thermodynamic equilibrium.

The mixture α-sialon phosphor includes an organ with β-sialon and unreacted silicon nitride remained other than single-phase α-sialon phosphor because of less addition amount and not reaching the thermodynamic equilibrium.

The amount of added metal in the mixture α-sialon phosphor is in the range of 0.05<(x+y)<0.3, 0.02<x<0.27 and 0.03<y<0.3 in chemical composition of powder. If the amount of added metal is less than the lower limit, the amount of α-sialon lowers and the emission intensity lowers. If the amount of added metal is greater than the upper limit, only α-sialon remains. Therefore, the object of high brightness can be completed. In the range defined above, the mixture α-sialon phosphor can be obtained that is composed of: α-sialon of 40 weight % or more and 90 weight % or less; β-sialon of 5 weight % or more and 40 weight % or less; and unreacted silicon nitride of 5 weight % or more and 30 weight % or less. The reason why the emission intensity is high even with the unreacted silicon nitride included is that α-sialon epitaxially grows on unreacted silicon nitride and its surface portion mainly responds to excitation light to offer an emission property substantially equal to only α-sialon.

The range may be 0.15<(x+y)<0.3, 0.10<x<0.25 and 0.05<y<0.15. In this range, the mixture α-sialon phosphor can be obtained that is composed of: α-sialon of 50 weight % or more and 90 weight % or less; β-sialon of 5 weight % or more and 30 weight % or less; and unreacted silicon nitride of 5 weight % or more and 20 weight % or less.

The mixture α-sialon phosphor can be obtained by, e.g., heating $Si_3N_4$-$M_2O_3$—CaO—AlN—$Al_2O_3$ system mixed powder at 1650 to 1900° C. in inert gas atmosphere to get a sintered body, then powdering it. Since CaO is so instable that it easily reacts with moisture vapor in the air, it is generally obtained by adding in the form of calcium carbonate or calcium hydroxide, then making it CaO in the process of heating at high temperature.

The chemical composition of mixture α-sialon phosphor can be defined using the composition range of M-α-sialon, Ca-α-sialon and β-sialon. Namely, in the range of three composition lines of $Si_3N_4$-a($M_2O_3$.9AlN), $Si_3N_4$-b(CaO.3AlN) and $Si_3N_4$-c(AlN.$Al_2O_3$), it is defined $4 \times 10^{-3} < a < 4 \times 10^{-2}$, $8 \times 10^{-3} < b < 8 \times 10^{-2}$ and $10^{-2} < c < 8 \times 10^{-1}$.

An example of a third phosphor is a cerium ion doped lanthanum silicon nitride phosphor: $La_{1-x}Si_3N_5:xCe$ (doping amount x is 0<x<1), where lanthanum site is replaced in solid dissolution by cerium ion activator. If the doping amount is 0.1<x<0.5, it is ultraviolet light excitation phosphor and, if the doping amount is 0.0<x<0.2, it is electron beam excitation phosphor.

Lanthanum silicon nitride ($LaSi_3N_5$) has an excellent thermal stability and serves to suppress the thermal relaxation phenomenon in the process of phosphor emission. Therefore, a loss in excitation energy can be reduced and a ratio of reduction in emission intensity according to rise of temperature becomes small. Thus, in the cerium ion doped lanthanum silicon nitride phosphor, the temperature range available can be broadened as compared to the conventional phosphor. Also, the lanthanum silicon nitride ($LaSi_3N_5$) has excellent chemical stability and is light resistance.

The cerium ion doped lanthanum silicon nitride phosphor satisfies a blue chromaticity value and has excellent thermal stability, mechanical property and chemical stability. Therefore, it can have great potential in applications for fluorescent character display tube (VFD), field emission display (FED) etc. that may be used in severe environment.

The examples of phosphors described in U.S. Pat. No. 5,998,925 include a garnet fluorescent material comprising 1) at least one element selected from the group consisting of Y, Lu, Sc, La, Gd and Sm, and 2) at least one element selected from the group consisting of Al, Ga and In, and being activated with cerium. $Y_3Al_5O_{12}$:Ce and $Gd_3In_5O_{12}$:Ce are two examples. The presence of Y and Al enables a phosphoer to increase the luminance. For example, in a yttrium-aluminum-garnet fluorescent material, part of Al may be substituted by Ga so that the proportion of Ga:Al is within the range from 1:1 to 4:6 and part of Y is substituted by Gd so that the proportion of Y:Gd is within the range from 4:1 to 2:3. Other examples of phosphor include $(Re_{1-r}Sm_r)_3(Al_{1-s}Ga_s)_5O_{12}$:Ce, where $0 \leq r < 1$ and $0 \leq s \leq 1$ and Re is at least one selected from Y and Gd, $(Y_{1-p-q-r}Gd_pCe_qSm_r)_3(Al_{1-s}Ga_s)_tO_{12}$ as the phosphor, where $0 \leq p \leq 0.8$, $0.003 \leq q \leq 0.2$, $0.0003 \leq r \leq 0.08$ and $0 \leq s \leq 1$. In some implementations, a phosphor may include two or more yttrium-aluminum-garnet fluorescent materials, activated with cerium, of different compositions including Y and Al to control the emission spectrum of the phosphor. In other implementations, a phosphor may include a first fluorescent material represented by general formula $Y_3(Al_{1-s}Ga_s)_5O_{12}$:Ce and a second fluorescent material represented by the formula $Re_3Al_5O_{12}$:Ce, where $0 \leq s \leq 1$ and Re is at least one selected from Y, Ga and La. In addition, two or more fluorescent materials of different compositions represented by a general formula $(Re_{1-r}Sm_r)_3(Al_{1-s}Ga_s)_5O_{12}$:Ce, where $0 \leq r < 1$ and $0 \leq s \leq 1$ and Re is at least one selected from Y and Gd may be used as the phosphor in order to control the emitted light to a desired wavelength.

The examples of phosphors described in U.S. Pat. No. 6,765,237 include phosphors that absorb UV light from about 380 to about 420 nm and emit visible light of different colors. For example, a phosphor blend may include a first phosphor comprising $BaMg_2Al_{16}O_{27}$:$Eu^{2+}$ (BAM) and a second phosphor comprising $(Tb_{1-x-y}A_xRE_y)_3D_zO_{12}$(TAG), where A is a member selected from the group consisting of Y, La, Gd, and Sm; RE is a member selected from the group consisting of Ce, Pr, Nd, Sm, Eu, Gd, Dy, Ho, Er, Tm, Yb, and Lu; D is a member selected from the group consisting of Al, Ga, and In; x is in the range from 0 to about 0.5, y is in the range from about 0 to about 0.2, and z is in the range from about 4 to about 5. As another example, a phosphor blend may include a first phosphor comprising $Tb_3Al_{4.9}O_{12}$:Ce and a second phosphor selected from the group consisting of $BaMg_2Al_{16}O_{27}$:$Eu^{2+}$ (BAM) and $(Sr,Ba,Ca,Mg)_5(PO_4)_3Cl$:$EU^{2+}$ The phosphors described in U.S. Patent Application Publication No. 2004/0227465 include various phosphor compositions as follows.

1. A rare earth element activated complex halide phosphor represented by the formula: $BaF_2$.a$BaX_2$.b$MgF_2$.c$BeF_2$.d$Me^{II}F_2$:eLn, where X is at least one halogen selected from the group consisting of chlorine, bromine and iodine; $Me^{II}$ is at least one divalent metal selected from the group consisting of: calcium and strontium; Ln is at least one rare earth element selected from the group consisting of: divalent europium ($Eu^{2+}$), cerium ($Ce^{3+}$) and terbium ($Tb^{3+}$), and a is in the range between 0.90 and 1.05, b is in the range of 0 to 1.2; c is in the range of between 0 and 1.2, and d is defined by the sum of c+d being in the range of between 0 and 1.2, and $BeF_2$ is present in an amount sufficient to effect a phosphor exhibiting a higher luminance than said phosphor absent $BeF_2$ when stimulated by light of a wavelength ranging from 450 to 800 nm after exposure to X-rays. See U.S. Pat. No. 4,512,911 for additional details.

2. A cerium activated rare earth halophosphate phosphor having the formula: $LnPO_4$.a$LnX_3$:$xCe^{3+}$ in which Ln is at least one rare earth element selected from the group consisting of Y, La, Gd and Lu; X is at least one halogen selected from the group consisting of F, Cl, Br and I; and a and x are numbers satisfying the conditions of $0.1 < a < 10.0$ and $0 < x < 0.2$, respectively and exhibiting a higher stimulated emission upon excitation with a He—Ne laser of a wavelength 632.8 nm after exposure to X-rays at 80 KVp, than the phosphor wherein a is less than 0.1. See U.S. Pat. No. 4,661,419 for additional details.

3. A mixed single-phase strontium and lanthanide oxide with a magnetolead type crystalline structure having the formula (I): $Sr_xLn1_{y1}Ln2_{y2}Ln3_{y3}M_zA_aB_bO_{19-k(I)}$ in which Ln1 represents at least one trivalent element selected from lanthanum, gadolinium and yttrium; Ln2 represents at least one trivalent element selected from neodymium, praseodymium, erbium, holmium and thulium; Ln3 represents an element selected from bivalent europium or trivalent cerium with retention of electric neutrality by virtue of oxygen holes; M represents at least one bivalent metal selected from magnesium, manganese, and zinc; A represents at least one trivalent metal selected from aluminum and gallium; B represents at least one trivalent transition metal selected from chromium and titanium; x, y1, y2, y3, z, a, b and k represent numbers so that $0 < x < 1$, $0 < y1 < 1$, $0 < y2 < 1$, $0 < y3 < 1$, $0 < z < 1$, $10.5 < a < 12$, $0 < b < 0.5$ and $0 < k < 1$ provided that $0 < x + y1 + y2 + y3 < 1$ and that $11 < z + a + b < 12$. See U.S. Pat. No. 5,140,604 for additional details.

4. A divalent europium activated alkaline earth metal halide phosphor having the formula: $M^{II}X_2$.a$M^{II}X'_2$.bSiO:x$Eu^{2+}$ in which $M^{II}$ is at least one alkaline earth metal selected from the group consisting of Ba, Sr and Ca; each of X and X' is at least one halogen selected from the group consisting of Cl, Br and I, and X is not the same as X'; a and x are numbers satisfying the conditions of $0.1 < a < 10.0$ and $0 < x < 0.2$, respectively; and b is a number satisfying the condition of $0 < b < 3 \times 10^{-2}$. See U.S. Pat. No. 5,198,679 for additional details.

5. A bright, short wavelength blue-violet phosphor for electro luminescent displays comprising an alkaline-based halide as a host material and a rare earth as a dopant. See U.S. Pat. No. 5,602,445. The host alkaline chloride can be chosen from the group II alkaline elements, particularly $SrCl_2$ or $CaCl_2$, which, with a europium or cerium rare earth dopant, electroluminesces at a peak wavelength of 404 and 367 nanometers respectively. The resulting emissions have CIE chromaticity coordinates which lie at the boundary of the visible range for the human eye thereby allowing a greater range of colors for full color flat panel electroluminescent displays.

6. An inorganic thin film electroluminescent device, comprising an inorganic light emission layer, a pair of electrodes and a pair of insulating layers, at least one of the electrodes being optically transparent, the light emission layer being positioned between the pair of insulating layers, each insulating layer being formed on an opposite side of the light emission layer, the pair of insulating layers being positioned between a light emission layer and the pair of electrodes, the light emission layer consisting essentially of inorganic material comprising a matrix of lanthanum fluoride doped with at least one member selected from the group consisting of: rare earth element metals and compounds thereof. See U.S. Pat. No. 5,648,181 for additional details.

7. A radiographic phosphor screen comprising a support and, coated on the support, at least one layer forming a luminescent portion and an overcoat layer, the luminescent portion and overcoat layer including a binder that is transparent to X-radiation and emitted light and said luminescent portion including phosphor particles in a weight ratio of phosphor particles to binder of 7:1 to 25:1. The phosphor comprises oxygen and a combination of species characterized by the relationship: $(Ba_{1-q}M_q)$ $(Hf_{1-z-e}Zr_zMg_e)$: yT wherein M is selected from the group consisting of Ca and Sr and combinations thereof; T is Cu; q is from 0 to 0.15; z is from 0 to 1; e is from 0 to 0.10; z+e is from 0 to 1; an y is from $1\times10^{-6}$ to 0.02. See U.S. Pat. No. 5,698,857 for additional details.

8. A garnet fluorescent material comprising: 1) at least one element selected from the group consisting of Y, Lu, Se, La, Gd and Sm; and 2) at least one element selected from the group consisting of Al, Ga and In, and being activated with cerium. One example is cerium-doped yttrium aluminum garnet $Y_3Al_5O_{12}$:Ce (YAG:Ce) and its derivative phosphors. See U.S. Pat. No. 5,998,925 for additional details.

9. A wavelength-converting casting composition, for converting a wavelength of ultraviolet, blue or green light emitted by an electroluminescent component, comprising: a) a transparent epoxy casting resin; b) an inorganic luminous substance pigment powder dispersed in the transparent epoxy resin, the pigment powder comprising luminous substance pigments from a phosphorus group having the general formula: $A_3B_5X_{12}$:M, where A is an element selected from the group consisting of Y, Ca, Sr; B is an element selected from the group consisting of Al, Ga, Si; X is an element selected from the group consisting of O and S; and M is an element selected from the group consisting of Ce and Tb. The luminous substance pigments have grain sizes <20 µm and a mean grain diameter $d_{50}$<5 µm. See U.S. Pat. No. 6,066,861 for additional details.

10. Phosphors $Ba_2$ $(Mg,Zn)Si_2O_7$: $Eu^{2+}$ and $(Ba_{1-x-y-z}, Ca_x, Sr_y, Eu_z)_2$ $(Mg_{1-w}, Zn_w)$ $Si_2O_7$, where X+Y+Z=1; Z>0; and 0.05<W<0.50 in some implementations, X+Y+Z=1; $0.01 \leq Z \leq 0.1$; and $0.1 \leq W<0.50$. X and Y can be zero or a non-zero number. Examples of UV-excitable phosphors for emitting green, red, and blue colors are $Ca_8Mg(SiO_4)_4Cl_2$:$EU^{2+}$, $Mn^{2+}$; $Y_2O_3$:$Eu^{3+}$, $Bi^{3+}$; and $Ba_2(Sr, Ba, Ca)_5(PO_4)_3Cl$:$Eu^{2+}$ (or $BaMg_2Al_{16}O_{27}$: $EU^{2+}$); respectively. See U.S. Pat. No. 6,255,670 for additional details.

The U.S. Patent Application Publication No. 2004/0227465 also discloses phosphors represented by $Sr_xBa_y, Ca_zSiO_4$:$Eu^2$ in which x, y, and z are each independently any value between 0 and 2, including 0 and 2. In some implementations, divalent Eu, which serves as an activator, is present in any amount between 0.0001% and about 5% in mole percent based on the total molar weight of said composition. Thus, the activator, Eu, may be present in any amount between 0.0001% and 5.00% in mole percent based on the total molar weight of the composition, including every thousandth percentage therebetween. In other implementations, the parameters x, y and z are $0.5 \leq x \leq 1.5$; $0 \leq y \leq 0.5$; and $0.5 \leq z \leq 1.5$ in the above formula. In yet other implementations, the parameters x, y and z are $1.5 \leq x \leq 2.5$; $0 \leq y \leq 0.5$; and $0 \leq z \leq 0.5$ in the above formula. The parameters x, y and z may also be $1.0 \leq x \leq 2.0$; $0 \leq y \leq 1.0$; and $0 \leq z \leq 0.5$ in the above formula.

The above phosphor $Sr_xBa_yCa_zSiO_4$:$Eu^{2+}$ may further include at least one additional element selected from the group consisting of: Ce, Mn, Ti, Pb, and Sn. In some implementations, such an additional element is present in the phosphor in any amount between 0.0001% and 5.00% in mole percent based upon the total molar weight of the phosphor.

The examples of phosphors described in U.S. Patent Application Publication No. 2005/0023962 include $ZnS_xSe_y$:Cu,A in which x and y are each independently any value between 0 and 1 and A is at least one of Ag, Al, Ce, Tb, Cl, I, Mg, Mn. The monovalent Cu, which serves as the main activator, may be present in any amount between 0.0001% and about 5% in mole percent based on the total molar weight of said composition. Thus, the activator, Cu, may be present in any amount between 0.0001% and 5.00% in mole percent based on the total molar weight of the composition, including every thousandth percentage therebetween. In some implementations, the parameters x, y and z are $0.5 \leq x \leq 1$ and $0 \leq y \leq 0.5$ in the above formula. In other implementations, the parameters x, y and z are $0 \leq x \leq 0.5$ and $0 \leq y \leq 0.5$ in the above formula. The parameters x, y and z may also be $0 \leq x \leq 0.5$ and $0.5 \leq y \leq 1.0$ in the above formula.

The examples of phosphors described in U.S. Patent Application Publication No. 2005/023963 include thioselenide and/or selenide-based fluorescent materials which are capable of absorbing with high efficiency blue, violet, or ultraviolet (UV) light and emitting light of a wavelength longer than that absorbed from the light source. Such phosphor materials may be manufactured to emit broad color spectra that can be tuned from blue to green to yellow and red emissions. Two or more phosphors may be mixed in order to achieve a specific, desired white color performance. One example is $MA_2(S_xSe_y)_4$:B in which x and y are each independently any value between about 0.01 and about 1; M is at least one of Be, Mg, Ca, Sr, Ba, Zn; and A is at least one of Al, Ga, In, Y, La, and Gd; and the activator B is at least one of Eu, Ce, Cu, Ag, Al, Tb, Cl, F, Br, I, Pr, Na, K, Mg, and Mn. The divalent Eu, which can serve as the main activator, may be present in any amount between 0.0001% and about 10% in mole percent based on the total molar weight of said composition. Thus, the activator, Eu, may be present in any amount between 0.0001% and 10.00% in mole percent based on the total molar weight of the composition, including every thousandth percentage therebetween. In some implementations, the parameters x, y, and z are $0.5 \leq x \leq 1$ and $0 \leq y \leq 0.5$ in the above formula. In other implementations, the parameter x, y and z are $0 \leq x \leq 0.5$ and $0.5 \leq y \leq 1.0$ in the above formula. In yet other implementations, x is about 0 and y is about 1 in the above formula, or x is about 1 and y is about 0 in the above formula.

Another example is $M_2A_4(S_xSe_y)_7$:B in which x and y are each independently any value between about 0.01 and about 1, M is at least one of Be, Mg, Ca, Sr, Ba, Zn; and A is at least one of Al, Ga, In, Y, La, and Gd; and B is at least one of Eu, Ce, Cu, Ag, Al, Tb, Cl, Br, F, I, Pr, K, Na, Mg, and Mn. The divalent Eu, which can serve as the main activator, may be present in any amount between 0.0001% and about 10% in mole percent based on the total molar weight of said composition. Thus, the activator, Eu, may be present in any amount between 0.0001% and 10.00% in mole percent based on the total molar weight of the composition, including every thousandth percentage there between. In some implementations, the parameters x and y are $0.5 \leq x \leq 1$ and $0 \leq y \leq 0.5$ in the above formula. In other implementations, the parameters x and y are $0 \leq x \leq 0.5$ and $0 \leq y \leq 0.5$ in the above formula. In yet other implementations, x is about 1 and y is about 0 in the above formula, or x is about 0 and y=1 in the above formula, or $0 \leq x \leq 0.5$ and $0.5 \leq y \leq 1.0$ in the above formula, or x is about 0.75 and y is about 0.25 in the above formula.

Yet another example described in U.S. Patent Application Publication No. 2005/023963 is $(M1)_m(M2)_nA_2(S_xSe_y)_4$:B in which: M1 comprises an element selected from the group consisting of: Be, Mg, Ca, Sr, Ba, Zn; M2 comprises an element selected from the group consisting of: Be, Mg, Ca, Sr, Ba, Zn; A comprises one or more elements selected from the group consisting of: Al, Ga, In, Y, La, and Gd; and B comprises one or more elements selected from the group consisting of: Eu, Ce, Cu, Ag, Al, Tb, Cl, Br, F, I, Mg, Pr, K, Na, and Mn. B may be present in any amount between 0.0001% and about 10% in mole percent based on the total molar weight of said composition, and wherein x and y are each independently any value between 0 and 1, subject to the provisos that the sum of x and y is equal to any number in the range of between about 0.75 and about 1.25, the sum of m and n is about 1, and M1 is different than M2. In some implementations, the parameters x and y are $0.5 \leq x \leq 1$ and $0 \leq y \leq 0.5$ in the above formula. In other implementations, the parameters x and y are $0 \leq x \leq 0.5$ and $0 \leq y \leq 0.5$, or $0 \leq x \leq 0.5$ and $0.5 \leq y \leq 1.0$, or x is about 0.75 and y is about 0.25, or x is about 0 and y is about 1, or x is about 1 and y is about 0 in the above formula.

Yet another example described in U.S. Patent Application Publication No. 2005/023963 is: $(M1)_m(M2)_nA_4(S_xSe_y)_7$:B in which M1 comprises an element selected from the group consisting of: Be, Mg, Ca, Sr, Ba, Zn; M2 comprises an element selected from the group consisting of: Be, Mg, Ca, Sr, Ba, Zn; A comprises one or more elements selected from the group consisting of: Al, Ga, In, Y, La, and Gd; and B comprises one or more elements selected from the group consisting of: Eu, Ce, Cu, Ag, Al, Th, Cl, Br, F, I, Mg, Pr, K, Na, and Mn. B may be present in any amount between 0.0001% and about 10% in mole percent based on the total molar weight of said composition, and wherein x and y are each independently any value between 0 and 1, subject to the provisos that the sum of x and y is equal to any number in the range of between about 0.75 and about 1.25, the sum of m and n is about 2, and M1 is different than M2. In some implementations, the parameters x and y are $0.5 \leq x \leq 1$ and $0 \leq y \leq 0.5$ in the above formula. In other implementations, the parameters are $0 \leq x \leq 0.5$ and $0 \leq y \leq 0.5$, or $0 \leq x \leq 0.5$ and $0.5 \leq y \leq 1.0$, or x is about 0.75 and y is about 0.25, or x is about 0 and y is about 1, or x is about 1 and y is about 0 in the above formula.

In the above examples, the color generation is based on mixing of three primary colors of red, green, and blue. The described devices, systems, and techniques, however, may use mixing of four or more colors to generate the desired colors. For example, four different colors may be used. Accordingly, the screens shown in FIGS. 1 and 2 use four different color phosphor stripes and each color pixel includes four sub color pixels. The display systems in FIGS. 23-25 under this 4-color scheme can use four monochromatic laser display modules in four different colors to produce the final color images on the common display screen.

A phosphor screen, which may be used as either a projection screen as shown in FIGS. 23-26B or a final viewing screen as shown in FIGS. 1-5, 14, 20A, 20B, 21A and 21B, may be fabricated by various techniques. Examples of fabrication techniques include, among others, the following: painting, gravity settling, settling with compression, slurry, slurry with segregation, dusting, photo-tacky dusting, thin screen evaporation and sputtering, screen printing, pressed printing, pulsed laser deposition, centrifugal deposition, electrophoretic deposition, spraying, electrostatic dusting, tape transfer, reactive deposition, reactive evaporation, RF sputtering with ion implantation of activators, metal organic chemical vapor deposition (MOCVD), and atomic layer epitaxy.

1. Painting

The painting techniques apply luminescent paints on a substrate, such as fluorescent, phosphorescent and self-luminous painting materials. Paints can be organic or inorganic in nature and are used with a vehicle such as lacquers or oils. Paints can be applied with a brush, roller or a spraying device. Stencils may be used to obtain detailed spatial patterns. Paints can also be applied via off-set printing methods. These fluorescence and phosphorescent paints can be excited via IR, visible or UV radiation. In the self luminous paints the source of the excitation is a radioactive material (ex. Radium) mixed with the paint.

2. Settling by Gravity

Settling is a well known method and is documented in the literature. See, e.g., Pringsheim & Vogel, Luminescence of Liquids and Solids, Interscience Publishers, 1946, NY, pp 144& 145; Hopkinson R.G., An Examination of Cathode Ray tube characteristics, Journal of the Institute of Electrical Engineers, Vol. 13, Part IIIa, No. 5 1946, pp. 779-794; Donofrio & Rehkopf, Screen Weight Optimization, Journal of the Electrochemical Society, Vol. 126, No. 9, September 1979, pp. 1563-1567; and Technical Information Booklet CM-9045, Method of Settling Phosphor Slides, GTE Sylvania, 3/82. For example, settling of phosphor slides may be achieved with a mixture of phosphor, a 1% barium acetate solution (in water), PS-6 potassium silicate and deionized water in a settling chamber. One recipe is to add 34 ml of the 1% barium acetate to the settling chamber. N. Yocom in the 1996 SID Seminar on Phosphor Screening discussed nine steps for settling and aluminizing a phosphor screen which are 1. settle phosphor on a face plate, 2. a liquid cushion is decanted and siphoned off, 3. dry the settled screen, 4. bake the screen, 5. rewet the screen, 6. apply a filming material on top of water, 7. remove water, 8. evacuate and evaporate the aluminum layer, 9. bake the screen.

3. Slurry

The slurry methods use a phosphor-containing slurry to form a phosphor layer over a screen surface. See, e.g., Tatayama, Yamazaki, Kato & Tashima, European Patent Application #86302192.9, filed Mar. 25, 1986 by Sony. One of his recipes is to use 100 g of phosphor, 0.6 g of Aerosil, with 5 g of PVA and 0.5 g of ADC (ammonium dichromate) and 100 g of water to form the slurry. This slurry is then deposited near the center of the face of a CRT screen panel and the panel is rotated and tilted to spread the slurry over the inside of the face plate. A cascaded slurry system may be used an aging effect where the silicate concentration is set to be higher on the glass substrate side than that on the electron gun side.

4. Dusting

Various dusting methods are known for forming phosphor screens. Hopkinson R.G. in "An Examination of Cathode Ray tube characteristics," Journal of the Institute of Electrical Engineers, Vol. 13, Part IIIa, No. 5 1946, pp. 779-794 describes a dusting method where the phosphor is sprayed into a wet or dry binder. In another implementation, dusting can be done by allowing the phosphor to fall on or to be projected on a prepared surface. In yet another implementation of the dusting approach, the phosphor material may be agitated through a sieve or muslin gauze upon the screen plate coated with a suitable binder such as sodium silicate. The U.S. Pat. No. 3,025,161 entitled "Method of Forming Patterns" and issued Mar. 13, 1962 discloses a dusting method where the phosphor is dusted more vigorously via a dry powder spray system onto a wet photo-resist prior to exposure. In addition, phosphors are dusted on photo-tacky, coated dry surface and are exposed UV to allow the coating to become tacky. This tacky nature of the surface coating causes the phosphor in the exposed areas to be attached to the surface. See, Nonogaki, Tomita, Nishizawa, Akagi & Kohasji, "Dry Process for Phosphor Screen Fabrication of Multicolored Cathode Ray Tubes," Research & Development in Japan, 1984, pp. 50-55.

5. Settling with Compression

Phosphor screens can also be made by settling the phosphors with compression. See, e.g., Oki K. & Ozawa L., A phosphor screen for high-resolution CRTs, Journal of the SID, Vol. 3, No. 2, September 1995, pp. 51-57 which describes settling with normal sedimentation techniques and a use of a mechanical press machine to reduce the voids in the screen for high resolution uses.

6. Thin Film Screens Evaporation or Sputtering

High resolution screens can be made by evaporating or sputtering the phosphor on the substrate. For example, magnetron sputtering of $ZnGa_2O_4$ onto $BaTiO_3$ ceramic sheets have been used in thin film Electro-luminescent devices. Vacuum evaporation methods have been used to deposit a thin layer of phosphor on a substrate such as a SrS:Ce, Cl, Ag, Mn layer.

7. Screen Printing

Phosphor screens can also be made by screen printing techniques. In some implementations, a tight but spring-like cloth or metal mesh is used with areas blocked by a lacquer and aligned above a substrate to be coated. The slurry mix is then mechanically pressed through the selected areas of the mesh on to the substrate and the mesh springs back to its original position after the phosphor paste is applied. By photographic printing of patterns on a mesh, very fine patterns can be screen printed. In 1992 Morikawa et al discussed a method to achieve a smoother and better aging screen using a printing method plus screen compression. This compression method allows the manufacturer to achieve higher packing densities. See, Morikawa, Seko, Kamogawa & Shimojo, Study to Improve Flood Beam CRT for Giant Screen Display, Japan Display '92, pp 385-388.

8. Pulsed Laser Deposition

Laser pulses can be directed to target materials and deposit the target materials on a screen. Greer et al in 1994 reported a Pulsed Laser Deposition (PLD) of phosphor screens used in helmet mounted displays (HMD). See, Greer, J.A. et al., P-53 Thin Film Phosphors Prepared by Pulsed—Laser Deposition, SID 94 Digest, pp. 827-830. A rastered laser with a wavelength of 248 nm was used to scan targets of Yttrium Aluminum Gallium Garnet phosphors and to deposit these materials on to sapphire substrates by ablation. A screen growth rate of one micron per hour and screens of a thickness up to 8 microns were reported.

9. Centrifugal Deposition

A phosphor suspension in a solution can be deposited on a screen by using a centrifugal action. See, e.g., Mezner, L.Z., Zumer, M., Nemanic, V., Centrifugal Settling of High Resolution 1-in CRT Screens, SID Digest 1994, pp 520-522. CRT screens have been made by this method where a stable phosphor suspension is made with a fine grain (less than 5 micron particle size) phosphor, a binder, electrolyte and in some cases a dispersing agent. In some implementations, the settling in the centrifuge may be set at 3000 rpm for 2 minutes to 4000 rpm for 3 minutes. Screens of optimum screen weight of about $0.6$ mg/cm$^2$ for 5 KV electrons was found using P20 phosphor with an average particle size of 1.9 microns. In a publication entitled "Preparation of P43 Suspension and Screen-Quality Evaluation in CRTs" (SID '97 vol 28, pp 440-443), it is reported that a suspension containing (1.8 micron) P43 phosphor, Barium Acetate, Potassium silicate and a surfactant was used in a centrifugal deposition process to achieve good electron aging with a screen weight of 1.0 mg/cm$^2$ at a screen thickness of approximately five particle diameters and an anode voltage of 5 KV.

10. Electrophoretic and Cataphoretic Coating

Electrophoretic or Cataphoretic phosphor coatings can be used to make high resolution phosphor screens. Schesinger described an electrophoretic coating process where a conductive coated glass face plate is put in a solution of a phosphor and electrolyte and a metallic anode (situated about two inches from the face plate). Sclesinger et al., Design Development and Fabrication of Ultra High-Resolution Cathode Ray tube. Technical Report ECOM-00476-February 1969, pp 64-72. When a DC electric current of 20 ma is passed through the solution the phosphor screen is deposited on the cathode. In May 1997, Schermerhorn, Sweeney & Wang from Electro Plasma and Park, Park and Kim from Samsung discussed the use of electrophoretic deposition of color phosphors for Plasma Display screens through the use of metalized recessed regions or cavities. J.M. Kim et al. Development of 4-in. Full Color FED, Devices SID97 Digest, pp 56-59; J.D. Schemerhorn et al. A Groved Structure for a Large High, Resolution Color ACPDP SID97 Digest, pp 229-232.

11. Spraying

Wet or dry phosphors can be sprayed on a substrate to form a phosphor screen. The nozzle of the spray gun can be changed to spray at various spray angles depending on the distance from the substrate and other constraints. A pressure pot is used just in any spray system to keep the pressure constant to the spray gun. In the dry system, the dry phosphor is sprayed on the screen face whose surface is coated with an adhesive binder. wet binders and dry binders can be used. In wet spraying, an organic binder such as nitrocellulose or PVA may be used. A binder which becomes tacky under UV radiation bombardment may also be used.

11. Electrostatic Spray/Dust

Phosphor screens can also be made by using a phosphor spray or dusting process in which the phosphor is charged and blown against a charged screen surface. The phosphors are then fixed to allow further processing. The U.S. Pat. No. 5,477,285 entitled "CRT developing apparatus" and issued Dec. 19, 1995 describes a process where a tribo-electric gun is used to charge the phosphor, and the phosphor is fed to the panel using a hopper, an auger to transfer the material from the hopper to the venturi chamber. The venturi chamber dispenses the charged phosphor to the latent image on the panel.

12. Transfer Tape

In a transfer tape method, the phosphor is coated on a tape base with a layer to contain phosphor. Under the phosphor layer is a release layer and the phosphor and binder are pressed onto a substrate. The base tape is removed leaving the phosphor and binder. See, N. Yocom—1996 SID Seminar on Phosphor Screening.

13. Reactive Deposition

Vapor reaction processes can be used for fabricating phosphor layers such as ZnS phosphor layers. See, e.g., D.A. Cusano, Cathodo-, Photo-, and D.C—, Electro-luminescence in Zinc Sulfide Layers. Luminescence of Organic and Inorganic Materials Edited by Kallman & Spruch Wiley & Sons 1962, pp 494-522. The substrate to be coated can be heated to temperatures from 400-700 deg C. For example, in making the phosphor screen based on ZnS:Mn, materials Zn, $ZnCl_2$, $MnCl_2H_2S$ are continuously present during the formation of the phosphor layer. This process can also be used for fabricating electroluminescent screens.

14. Reactive Evaporation

Reactive evaporation methods have been reported for making screens. Transparent thin films of $Y_2O_2S$:Eu have been formed by a reactive evaporation process where the Yttrium metal is evaporated onto a substrate using an electron beam gun and excited $SO_2$ is introduced while simultaneously heating a crucible of $EuCl_2$ powder. Daud, Futaki, Ohmi, Tanaki & Kobayashi, Transparent Y2020S:Eu 3+ phosphor thin films grown by reactive evaporation and their luminescent properties, Journal of the Society for Information Display, Vol 4, No 3 1996, pp 193-196.

15. RF Sputtering and Ion Implantation

In RF sputtering and ion implantation for forming phosphor screens, the activator ion is implanted. In N. M. Kalkhoran et al., Luminescence Study of Ion-Implanted, $ZnGa_2O_4$ Thin Films on Flexible Organic Substrates, SID '97 Digest, pp 623-626, RF sputtering was used to form thin film electroluminescent screens where $ZnGa_2O_4$ thin films were implanted on a flexible polyimide substrate with Mn, Eu to get green and red phosphor screens. The un-doped host material was used for the blue screen.

16. Metal Organic Chemical Vapor Deposition

In a 1995 publicatin by Smith et al, it was reported that screens with the $CaGa_2S_4$:Ce phosphor were made by the MOCVD process. Smith, Samuels, Espinoza, Apen, Peachy, Dye, Tuenge, Schaus & King, Crystalline-As-Deposited CaGa2S4:Ce via Low Temperature Metal Organic Chemical Vapor Deposition SID Digest 1995, Vol. XXVI pp 728-731. Calcium metal-organics were used in the form of Ca(2,2,6,6-tetramethyl-3,5-heptanedionate)$_2$ called Ca(thd)$_2$. The CaS was deposited using Ca(thd)2 in an argon carrier gas and $H_2S$. with reactor pressures from 1 to 10 Torr. Substrates were glass, silicon and coated EL substrates at temperatures from 400-600 deg C. The $Ga_2S_3$ and CaS formation was combined with the use of Ce(thd)$_4$ to obtain the $CaGa_2S_4$:Ce phosphor.

17. Atomic Layer Epitaxy

Atomic layer epitaxy has been used to form luminescent screens for alternating current thin film electroluminescent displays. See, Lindsay McDonald and Anthony Lowe, Display Systems, Publisher John Wiley & Sons 1997 pp. 195 & 196. A substrate was heated to a high temperature (500° C.) and was exposed to low pressure chemical precursors for forming the screen layers. As an example, Zn and Mn can be used as part of the precursors for forming a ZnS:Mn layer. The reactor is evacuated and Sulfur is introduced. The epitaxy cycle is then started to form the layers.

In summary, only a few implementations are disclosed. However, it is understood that variations and enhancements may be made.

What is claimed is:

1. A display system, comprising:
a screen that comprises a substrate and parallel phosphor stripes formed on the substrate, wherein adjacent phosphor stripes are made of different phosphors that emit colored light of different colors by absorbing light at an excitation wavelength;
a laser module to project and scan a laser beam at the excitation wavelength onto the screen to convert an image carried by the laser beam via an optical modulation into a color image produced by the phosphor stripes on the screen;
an optical sensor module positioned to receive and detect colored light emitted from the phosphor stripes as a result of absorbing light at the excitation wavelength;
a feedback mechanism that directs an electrical output of the optical sensor module to the laser module; and
an alignment control mechanism in the laser module to respond to alignment information contained in the electrical output of the optical sensor module and to control a timing of image data modulated on the laser beam to correct an alignment of the laser beam with respect to the phosphor stripes.

2. The system as in claim 1, wherein:
the optical sensor module is located off the screen.

3. The system as in claim 1, wherein:
the optical sensor module is located on the screen.

4. The system as in claim 1, wherein:
the optical sensor module comprises an optical sensor that detects colored light emitted from the phosphor stripes on the screen in only one color.

5. The system as in claim 4, wherein:
the optical sensor detects light of one color selected from light of different colors emitted by the phosphor stripes without detecting light in other colors.

6. The system as in claim 1, wherein:
the optical sensor module comprises different optical sensors that detect colored light in different colors emitted from the phosphor stripes on the screen, respectively.

7. The system as in claim 1, wherein:
the laser module modulates the laser beam at the excitation wavelength to carry a test pattern that tests the alignment of the laser beam with respect to the phosphor stripes, and the alignment control mechanism corrects the alignment of the laser beam based on the electrical output of the optical sensor module corresponding to the test pattern.

8. The system as in claim 7, wherein:
the test pattern includes an image frame in one color to test the alignment of the laser beam.

9. The system as in claim 1, wherein:
the feedback mechanism and the alignment control mechanism in combination dynamically correct an alignment error of the laser beam on the screen during displaying an image on the screen for viewing by a viewer.

10. The system as in claim 1, wherein:
the laser module projects and scans at least a second laser beam at the excitation wavelength, in addition to the laser beam, onto the screen.

11. A method for displaying images on a screen, comprising:
providing a screen that comprises a substrate on which parallel phosphor stripes are formed and adjacent phosphor stripes are made of different phosphors that emit colored light of different colors by absorbing light at an excitation wavelength;
scanning at least one laser beam at the excitation wavelength onto the screen to convert an image carried by the laser beam via an optical modulation into a color image produced by the phosphor stripes on the screen;
using an optical sensor module to receive and detect colored light emitted from the phosphor stripes to produce an electrical sensor signal containing alignment information of the laser beam on the screen; and
using the alignment information in the electrical sensor signal to control either a timing of image data modulated on the laser beam or a direction of the laser beam projected onto the screen to correct an alignment of the laser beam with respect to the phosphor stripes.

12. The method as in claim 11, comprising:
modulating the laser beam at the excitation wavelength to carry a test pattern to test the alignment of the laser beam with respect to the phosphor stripes; and controlling the laser beam to correct the alignment of the laser beam based on the electrical sensor signal of the optical sensor module corresponding to the test pattern.

13. The method as in claim 12, wherein:

the test pattern includes an image frame in one color to test the alignment of the laser beam.

14. The method as in claim 11, comprising:

dynamically correcting an alignment error of the laser beam on the screen during displaying an image for viewing by a viewer.

15. A display system, comprising:

a screen comprising a substrate and parallel phosphor stripes on the substrate, wherein two adjacent phosphor stripes are made of different phosphors that emit colored light of different colors by absorbing light at an excitation wavelength; and a laser module to project and scan a laser beam at the excitation wavelength onto the screen to convert an image carried by the laser beam via an optical modulation into a color image produced by colored light emitted by the phosphor stripes on the screen, the laser module comprising a mechanism to monitor image data bits to be modulated on the laser beam to produce a black pixel monitor signal; a diode laser to produce the laser beam; and a laser control coupled to receive the black pixel monitor signal and to (1) operate the diode laser at a driving current below a laser threshold current without turning off the driving current to produce a low light output representing a virtual black color on the screen when the black pixel monitor signal indicates a display time of a block of contiguous black pixels is less than a response delay time of the diode laser and (2) turn off the driving current to produce a true black color on the screen when the black pixel monitor signal indicates a display time of a block of contiguous black pixels is greater than the response delay time of the diode laser.

16. The system as in claim 15, wherein:

the laser module is configured such that after turning off the driving current to produce the true black color on the screen when the black pixel monitor signal indicates the display time of the block of contiguous black pixels is greater than the response delay time of the diode laser, the laser module, before the end of displaying the block of the contiguous black pixels, turns on the driving current of the diode laser to a value below the laser threshold current to produce the virtue black color for the remaining part of the block of the contiguous black pixels.

17. The system as in claim 15, comprising:

an optical sensor module positioned to receive and detect colored light emitted from the phosphor stripes as a result of absorbing light at the excitation wavelength; and a feedback control that responds to an electrical output of the optical sensor unit to obtain alignment information contained in the electrical output of the optical sensor module and controls at least one of a timing of image data modulated on the laser beam and a direction of the laser beam projected onto the screen to correct an alignment of the laser beam with respect to the phosphor stripes.

\* \* \* \* \*